United States Patent
Bayliss

(10) Patent No.: US 8,135,680 B2
(45) Date of Patent: *Mar. 13, 2012

(54) STATISTICAL RECORD LINKAGE CALIBRATION FOR REFLEXIVE, SYMMETRIC AND TRANSITIVE DISTANCE MEASURES AT THE FIELD AND FIELD VALUE LEVELS WITHOUT THE NEED FOR HUMAN INTERACTION

(75) Inventor: David Alan Bayliss, Delray Beach, FL (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/429,377

(22) Filed: Apr. 24, 2009

(65) Prior Publication Data

US 2009/0271405 A1    Oct. 29, 2009

Related U.S. Application Data

(60) Provisional application No. 61/047,570, filed on Apr. 24, 2008, provisional application No. 61/053,202, filed on May 14, 2008.

(51) Int. Cl.
    *G06F 17/30* (2006.01)
(52) U.S. Cl. ............ 707/688; 707/737; 707/749
(58) Field of Classification Search ........... 707/688–749
    See application file for complete search history.

(56) References Cited

U.S. PATENT DOCUMENTS

| | | |
|---|---|---|
| 4,543,630 A | 9/1985 | Neches |
| 4,769,772 A | 9/1988 | Dwyer |
| 4,860,201 A | 8/1989 | Stolfo et al. |
| 4,870,568 A | 9/1989 | Kahle et al. |
| 4,925,311 A | 5/1990 | Neches et al. |
| 5,006,978 A | 4/1991 | Neches |
| 5,146,590 A | 9/1992 | Lorie et al. |
| 5,251,131 A | 10/1993 | Masand et al. |
| 5,276,899 A | 1/1994 | Neches |
| 5,303,383 A | 4/1994 | Neches et al. |
| 5,392,430 A | 2/1995 | Chen et al. |
| 5,408,649 A | 4/1995 | Beshears et al. |
| 5,423,037 A | 6/1995 | Hvasshovd |
| 5,457,797 A | 10/1995 | Butterworth et al. |
| 5,471,622 A | 11/1995 | Eadline |
| 5,495,606 A | 2/1996 | Borden et al. |
| 5,551,027 A | 8/1996 | Choy et al. |
| 5,551,066 A | 8/1996 | Stillman et al. |

(Continued)

OTHER PUBLICATIONS

International Search Report and Written Opinion mailed Aug. 13, 2009, for International Application No. PCT-US09-41649.

(Continued)

*Primary Examiner* — Hanh Thai
(74) *Attorney, Agent, or Firm* — Ryan A. Schneider, Esq.; Trenton A. Ward, Esq.; Troutman Sanders LLP

(57) ABSTRACT

Disclosed is a system for, and method of, calculating parameters used to determine whether records and entity representations should be linked. The system and method use a symmetric, transitive and reflexive function to allow for linking records and entity representations whose field values differ. The system and method apply iterative techniques such that parameters from each linking iteration are used in the next linking iteration. The system and method need no human interaction in order to calibrate and utilize record matching formulas used for the linking decisions.

12 Claims, 14 Drawing Sheets

U.S. PATENT DOCUMENTS

| | | |
|---|---|---|
| 5,555,404 A | 9/1996 | Torbj.o slashed.rnsen et al. |
| 5,590,284 A | 12/1996 | Crosetto |
| 5,590,319 A | 12/1996 | Cohen et al. |
| 5,640,485 A | 6/1997 | Ranta |
| 5,655,080 A | 8/1997 | Dias et al. |
| 5,692,174 A | 11/1997 | Birely et al. |
| 5,694,593 A | 12/1997 | Baclawski |
| 5,715,469 A | 2/1998 | Arning |
| 5,732,400 A | 3/1998 | Mandler et al. |
| 5,745,746 A | 4/1998 | Jhingran et al. |
| 5,754,841 A | 5/1998 | Carino |
| 5,758,314 A | 5/1998 | Mckenna |
| 5,799,323 A | 8/1998 | Mosher et al. |
| 5,845,113 A | 12/1998 | Swami et al. |
| 5,857,180 A | 1/1999 | Hallmark et al. |
| 5,878,408 A | 3/1999 | Van Huben et al. |
| 5,884,299 A | 3/1999 | Ramesh et al. |
| 5,890,159 A | 3/1999 | Sealby et al. |
| 5,897,638 A | 4/1999 | Lasser et al. |
| 5,905,904 A | 5/1999 | Bird et al. |
| 5,970,495 A | 10/1999 | Baru et al. |
| 5,983,228 A | 11/1999 | Kobayashi et al. |
| 6,006,249 A | 12/1999 | Leong |
| 6,026,394 A | 2/2000 | Tsuchida et al. |
| 6,026,398 A | 2/2000 | Brown et al. |
| 6,081,801 A | 6/2000 | Cochrane et al. |
| 6,108,763 A | 8/2000 | Grondalski |
| 6,115,713 A | 9/2000 | Pascucci et al. |
| 6,192,391 B1 | 2/2001 | Ohtani |
| 6,199,069 B1 | 3/2001 | Dettinger et al. |
| 6,256,621 B1 | 7/2001 | Tsuchida et al. |
| 6,266,804 B1 | 7/2001 | Isman |
| 6,304,882 B1 | 10/2001 | Strellis et al. |
| 6,311,169 B2 | 10/2001 | Duhon |
| 6,330,552 B1 | 12/2001 | Farrar et al. |
| 6,374,241 B1 | 4/2002 | Lamburt et al. |
| 6,377,959 B1 | 4/2002 | Carlson |
| 6,389,429 B1 | 5/2002 | Kane et al. |
| 6,424,973 B1 | 7/2002 | Baclawski |
| 6,426,947 B1 | 7/2002 | Banker et al. |
| 6,427,148 B1 | 7/2002 | Cossock |
| 6,430,552 B1 | 8/2002 | Corston-Oliver |
| 6,510,428 B2 | 1/2003 | Tsuchida et al. |
| 6,523,019 B1 | 2/2003 | Borthwick |
| 6,523,041 B1 | 2/2003 | Morgan et al. |
| 6,546,403 B1 | 4/2003 | Carlson et al. |
| 6,567,806 B1 | 5/2003 | Tsuchida et al. |
| 6,658,412 B1 | 12/2003 | Jenkins et al. |
| 6,785,370 B2 | 8/2004 | Glowny et al. |
| 6,816,854 B2 | 11/2004 | Reiner et al. |
| 6,963,871 B1 | 11/2005 | Hermansen et al. |
| 6,968,335 B2 | 11/2005 | Bayliss et al. |
| 6,983,317 B1 | 1/2006 | Bishop et al. |
| 6,990,503 B1 | 1/2006 | Luo et al. |
| 7,152,060 B2 | 12/2006 | Borthwick et al. |
| 7,185,003 B2 | 2/2007 | Bayliss et al. |
| 7,240,059 B2 | 7/2007 | Bayliss et al. |
| 7,293,024 B2 | 11/2007 | Bayliss et al. |
| 7,333,998 B2 | 2/2008 | Heckerman et al. |
| 7,403,942 B1 | 7/2008 | Bayliss et al. |
| 7,752,064 B2 | 7/2010 | Kauffman |
| 7,912,842 B1 | 3/2011 | Bayliss |
| 2001/0013049 A1 | 8/2001 | Ellis, III |
| 2001/0014888 A1 | 8/2001 | Tsuchida et al. |
| 2002/0007284 A1 | 1/2002 | Schurenberg et al. |
| 2002/0065870 A1 | 5/2002 | Baehr-Jones et al. |
| 2002/0073099 A1 | 6/2002 | Gilbert et al. |
| 2002/0073138 A1 | 6/2002 | Gilbert et al. |
| 2002/0156793 A1 | 10/2002 | Jaro |
| 2002/0184222 A1 | 12/2002 | Kohut et al. |
| 2003/0013951 A1 | 1/2003 | Stefanescu et al. |
| 2003/0037048 A1 | 2/2003 | Kabra et al. |
| 2003/0065595 A1 | 4/2003 | Anglum |
| 2003/0093260 A1 | 5/2003 | Dagtas et al. |
| 2003/0126102 A1* | 7/2003 | Borthwick ............ 706/21 |
| 2003/0126156 A1 | 7/2003 | Stoltenberg et al. |
| 2003/0153299 A1 | 8/2003 | Perfit et al. |
| 2003/0154285 A1 | 8/2003 | Berglund et al. |
| 2003/0167253 A1 | 9/2003 | Meinig |
| 2004/0064447 A1 | 4/2004 | Simske et al. |
| 2004/0068339 A1 | 4/2004 | Cheetham et al. |
| 2004/0088322 A1 | 5/2004 | Elder et al. |
| 2004/0098359 A1 | 5/2004 | Bayliss et al. |
| 2004/0098371 A1 | 5/2004 | Bayliss et al. |
| 2004/0098372 A1 | 5/2004 | Bayliss et al. |
| 2004/0098373 A1 | 5/2004 | Bayliss et al. |
| 2004/0098374 A1 | 5/2004 | Bayliss et al. |
| 2004/0098390 A1 | 5/2004 | Bayliss et al. |
| 2004/0172393 A1 | 9/2004 | Kazi et al. |
| 2005/0071743 A1 | 3/2005 | Harrington et al. |
| 2005/0154664 A1 | 7/2005 | Guy et al. |
| 2006/0020611 A1 | 1/2006 | Gilbert et al. |
| 2006/0080283 A1 | 4/2006 | Shipman et al. |
| 2006/0116995 A1* | 6/2006 | Bloedorn .......... 707/3 |
| 2006/0184460 A1 | 8/2006 | Cleary |
| 2006/0213976 A1 | 9/2006 | Inakoshi et al. |
| 2007/0067304 A1* | 3/2007 | Ives .................. 707/10 |
| 2007/0179971 A1* | 8/2007 | Benson ............ 707/103 R |
| 2007/0208694 A1 | 9/2007 | Bayliss et al. |
| 2007/0271292 A1 | 11/2007 | Acharya et al. |
| 2007/0299697 A1 | 12/2007 | Friedlander et al. |
| 2008/0005106 A1* | 1/2008 | Schumacher et al. ...... 707/6 |
| 2008/0010296 A1 | 1/2008 | Bayliss et al. |
| 2008/0033951 A1* | 2/2008 | Benson .............. 707/8 |
| 2008/0077570 A1 | 3/2008 | Tang et al. |
| 2008/0208780 A1 | 8/2008 | Hoopes et al. |
| 2008/0226130 A1 | 9/2008 | Kansai et al. |
| 2008/0243885 A1 | 10/2008 | Harger et al. |
| 2008/0244008 A1 | 10/2008 | Wilkinson et al. |
| 2009/0012971 A1 | 1/2009 | Hunt et al. |
| 2009/0018996 A1 | 1/2009 | Hunt et al. |
| 2009/0089332 A1* | 4/2009 | Harger et al. .......... 707/104.1 |
| 2009/0089630 A1* | 4/2009 | Goldenberg et al. ....... 714/704 |
| 2009/0106245 A1 | 4/2009 | Salcedo |
| 2009/0271359 A1 | 10/2009 | Bayliss |
| 2009/0271363 A1 | 10/2009 | Bayliss |
| 2009/0271397 A1 | 10/2009 | Bayliss |
| 2009/0271404 A1 | 10/2009 | Bayliss |
| 2009/0271424 A1 | 10/2009 | Bayliss |
| 2009/0271694 A1 | 10/2009 | Bayliss |
| 2009/0287689 A1 | 11/2009 | Bayliss |
| 2009/0292694 A1 | 11/2009 | Bayliss |
| 2009/0292695 A1 | 11/2009 | Bayliss |
| 2011/0106807 A1* | 5/2011 | Srihari et al. .............. 707/739 |

OTHER PUBLICATIONS

Price et al., "Face Recognition Using Direct, Weighted Linear Discriminant Analysis and Modular Subspaces" [online]; Oak Ridge National Laboratory (2005).

Eike Schallehn et al., "Advanced Grouping and Aggregation for Data Integration," Department of Computer Science, Paper ID: 222, pp. 1-16 (2001).

Vincent Coppola, "Killer APP," Men's Journal, vol. 12, No. 3, Apr. 2003, pp. 86-90.

Eike Schallehn et al, "Extensible and Similarity-based Grouping for Data Integration," Department of Computer Science, pp. 1-17 (2002).

Rohit Ananthakrishna et al., "Eliminating Fuzzy Duplicates in Data Warehouses," 12 pages (2002).

Peter Christen et al., "Parallel Computing Techniques for High-Performance Probabilistic Record Linkage," Data Mining Group, Australian National University, Epidemiology and Surveillance Branch, Project web page: http:—datamining.anu.edu.au-linkage.html, pp. 1-11 (2002).

Peter Christen et al., "Parallel Techniques for High-Performance Record Linkage (Data Matching)," Data Mining Group, Australian National University, Epidemiology and Surveillance Branch, Project web page: http:—datamining.anu.edu.au-linkage.html pp. 1-27 (2002).

Peter Christen et al., "High-Performance Computing Techniques for Record Linkage," Data Mining Group, Australian National University, Epidemiology and Surveillance Branch, Project web page: http:—datamining.anu.edu.au-linkage.html, pp. 1-14 (2002).

William E. Winkler, "Matching and Record Linkage," U.S. Bureau of the Census, pp. 1-38 (1999).

Peter Christen et al., "High-Performance Computing Techniques for Record Linkage," Data Mining Group, Australian National University, Epidemiology and Surveillance Branch, Project web page: http:—datamining.anu.edu.au-linkage.html, pp. 1-11 (2002).

William E. Winkler, "The State of Record Linkage and Current Research Problems," U.S. Bureau of the Census, 15 pages (1999).

William E. Winkler, "Advanced Methods for Record Linkage," Bureau of the Census, pp. 1-21, (1994).

William E. Winkler, Frequency-Based Matching in Fellegi-Sunter Model of Record Linkage, Bureau of the Census Statistical Research Division, 14 pages, Oct. 4, 2000.

William E. Winkler, "State of Statistical Data Editing and Current Research Problems," Bureau of the Census Statistical Research Division, 10 pages (1999).

The First Open ETL-EAI Software for the Real-Time Enterprise, Sunopsis, A New Generation ETL Tool, "Sunopsis™ v3 expedites integration between heterogeneous systems for Data Warehouse, Data Mining, Business Intelligence, and OLAP projects," <www.suopsis.com>, 6 pages.

Alan Dumas, "The ETL Market and Sunopsis™ v3 Business Intelligence, Data Warehouse & Datamart Projects," Sunopsis, pp. 1-7 (2002).

Teradata Warehouse Solutions, "Teradata Database Technical Overview," pp. 1-7 (2002).

WhiteCross White Paper, "wx-des-Technical Information," pp. 1-36, May 25, 2000.

Teradata Affiance Solutions, "Teradata and Ab Initio," pp. 1-2 (2001).

Peter Christen et al., The Australian National University, "Febrl—Freely extensible biomedical record linkage," pp. 1-67, Oct. 2002.

William E. Winkler, "Using the EM Algorithim for Weight Computation in the Fellegi-Sunter Model of Record Linkage," Bureau of the Census Statistical Research Division, 12 pages, Oct. 4, 2000.

William E. Winkler et al., "An Application of the Fellegi-Sunter Model of Record Linkage to the 1990 U.S. Decennial Census," U.S. Bureau of the Census, pp. 1-22.

William E. Winkler, "Improved Decision Rules in the Fellegi-Sunter Model of Record Linkage," Bureau of the Census, pp. 1-13 (1993).

Fritz Scheuren et al., "Recursive Merging and Analysis of Administrative Lists and Data," U.S. Bureau of the Census, 9 pages.

William E. Winkler, "Record Linkage Software and Methods for Merging Administrative Lists," U.S. Bureau of the Census, Jul. 7, 2001, 11 pages.

Enterprises, Publishing and Broadcasting Limited, Acxiom-Abilitec, pp. 44-45.

TransUnion , Credit Reporting System, 4 pages, <http:--www.transunion.com-content-page.jsp?id=-transunion-general-data-business-BusCre . . . > Oct. 9, 2002.

TransUnion, ID Verification & Fraud Detection, Account Acquisition, Account Management, Collection & Location Services, Employment Screening, Risk Management, Automotive, Banking-Savings & Loan, Credit Card Providers, Credit Unions, Energy & Utilities, Healthcare, Insurance, Investment, Real Estate, Telecommunications, 46 pages, <http:--www.transunion.com> Oct. 9, 2002.

White Paper an Introduction to OLAP Multidimensional Terminology and Technology, 20 pages.

International Search Report and Written Opinion mailed Oct. 22, 2009, for International Application No. PCT/US09/49522.

* cited by examiner

STATISTICAL RECORD LINKAGE CALIBRATION FOR REFLEXIVE, SYMMETRIC AND TRANSITIVE DISTANCE MEASURES AT THE FIELD AND FIELD VALUE LEVELS WITHOUT THE NEED FOR HUMAN INTERACTION

CROSS REFERENCE TO RELATED APPLICATIONS

The present application claims priority to and hereby incorporates by reference in their entireties U.S. Provisional Patent Application No. 61/047,570 entitled "Database systems and methods" to Bayliss filed Apr. 25, 2008 and U.S. Provisional Patent Application No. 61/053,202 entitled "Database systems and methods" to Bayliss filed May 14, 2008. These applications are referred to herein as the "Second Generation Patents And Applications."

The following patents and patent applications are related to the present disclosure and are hereby incorporated by reference in their entireties:

- U.S. Pat. No. 7,293,024 entitled "Method for sorting and distributing data among a plurality of nodes" to Bayliss et al.;
- U.S. Pat. No. 7,240,059 entitled "System and method for configuring a parallel-processing database system" to Bayliss et al.;
- U.S. Pat. No. 7,185,003 entitled "Query scheduling in a parallel-processing database system" to Bayliss et al.;
- U.S. Pat. No. 6,968,335 entitled "Method and system for parallel processing of database queries" to Bayliss et al.;
- U.S. patent application Ser. No. 10/357,447 entitled "Method and system for processing data records" to Bayliss et al.;
- U.S. patent application Ser. No. 10/357,481 entitled "Method and system for linking and delinking data records" to Bayliss et al.;
- U.S. patent application Ser. No. 10/293,482 entitled "Global-results processing matrix for processing queries" to Bayliss et al.;
- U.S. patent application Ser. No. 10/293,475 entitled "Failure recovery in a parallel-processing database system" to Bayliss et al.;
- U.S. patent application Ser. No. 10/357,418 entitled "Method and system for processing and linking data records" to Bayliss et al.;
- U.S. patent application Ser. No. 10/357,405 entitled "Method and system for processing and linking data records" to Bayliss et al.;
- U.S. patent application Ser. No. 10/357,489 entitled "Method and system for associating entities and data records" to Bayliss et al.;
- U.S. patent application Ser. No. 10/357,484 entitled "Method and system for processing data records" to Bayliss et al.;
- U.S. patent application Ser. No. 11/671,090 entitled "Query scheduling in a parallel-processing database system" to Bayliss et al.;
- U.S. patent application Ser. No. 11/772,634 entitled "System and method for configuring a parallel-processing database system" to Bayliss et al.; and
- U.S. patent application Ser. No. 11/812,323 entitled "Multi-entity ontology weighting systems and methods" to Bayliss.

The above applications are referred to herein as the "First Generation Patents And Applications." This disclosure may refer to various particular features (e.g., figures, tables, terms, etc.) in the First Generation Patents And Applications. In the case of any ambiguity of what is being referred to, the features as described in U.S. patent application Ser. No. 11/772,634 entitled "System and method for configuring a parallel-processing database system" to Bayliss et al. shall govern.

FIELD OF THE INVENTION

The invention relates to database systems and methods. More particularly, the invention relates to a technique for linking records in a database. Certain embodiments allow for matches between non-identical field values.

SUMMARY OF THE CLAIMED INVENTION

Certain embodiments are disclosed herein. Such exemplary embodiments include a system, and computer implemented iterative process, for generating entity representations in a computer implemented database using a record matching formula and for generating parameters for the record matching formula. The database includes a plurality of records, each record including a plurality of fields, each field capable of containing a field value. The exemplary embodiments include that at least a portion of parameters for the record matching formula are configured for a particular field value associated with a selected field. The exemplary embodiments also provide for linking records or entity representations with non-identical field values. The exemplary embodiments include applying a symmetric, reflexive and transitive function to each field value in the selected field of each of a plurality of records in the database, such that applying the symmetric, reflexive and transitive function to each field value in the selected field of each of a plurality of records in the database defines a partition of the plurality of records, where the partition of the plurality of records includes a plurality of parts, each of the parts associated with at least one field value appearing in the selected field. The exemplary embodiments also include calculating a first probability, the first probability reflecting a likelihood that an arbitrary record in the database is in a part associated with the particular field value. The exemplary embodiments further include forming a plurality of entity representations in the database, each entity representation including at least two records linked using a first instance of the record matching formula, at least one entity representation including at least two records linked using a first instance of the record matching formula that includes a first parameter derived from the first probability. The exemplary embodiments further include calculating a second probability, the second probability reflecting a likelihood that an arbitrary entity representation in the database includes a record that is in the part associated with the particular field value. The exemplary embodiments further include linking at least two entity representations in the database based on a second instance of the record matching formula, where the second instance of the record matching formula includes a second parameter derived from the second probability, such that a number of entity representations in the database is reduced by the linking entity representations relative to a number of entity representations in the database prior to the linking at least two entity representations. The exemplary embodiments further include retrieving information from at least one record in the database.

According to further exemplary embodiments, a system, and a computer implemented iterative process, for generating entity representations in a computer implemented database using a record matching formula and for generating parameters for the record matching formula, are disclosed herein.

The database includes a plurality of records, each record including a plurality of fields, each field capable of containing a field value. According to such embodiments, at least a portion of parameters for the record matching formula are configured for a selected field and independent of any particular field value in the selected field. Such embodiments provide for linking records and entity representations with non-identical field values. The exemplary embodiments include applying a symmetric, reflexive and transitive function to each field value in the selected field of each of a plurality of records in the database, such that applying the symmetric, reflexive and transitive function to each field value in the selected field of each of a plurality of records in the database defines a partition of the plurality of records, where the partition of the plurality of records includes a plurality of parts, each of the parts associated with at least one field value appearing in the particular field. The exemplary embodiments also include calculating a first plurality of first probabilities, each of the plurality of first probabilities reflecting a likelihood that an arbitrary record in the database is in a different first part. The exemplary embodiments further include calculating a first parameter derived from a weighted sum of the plurality of first probabilities. The exemplary embodiments further include forming a plurality of entity representations in the database, each entity representation including at least two records linked using a first instance of the record matching formula, at least one entity representation including at least two records linked using a first instance of the record matching formula that includes the first parameter. The exemplary embodiments further include calculating a second plurality of second probabilities, each of the second plurality of second probabilities reflecting a likelihood that an arbitrary entity representation in the database includes a record that is in a different part. The exemplary embodiments further include calculating a second parameter derived from a weighted sum of the second plurality of second probabilities. The exemplary embodiments further include linking at least two entity representations in the database based on a second instance of the record matching formula, where the second instance of the record matching formula includes the second parameter, such that a number of entity representations in the database is reduced by the linking entity representations relative to a number of entity representations in the database prior to the linking at least two entity representations. The exemplary embodiments further include retrieving information from at least one record in the database.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION

Figure 1:
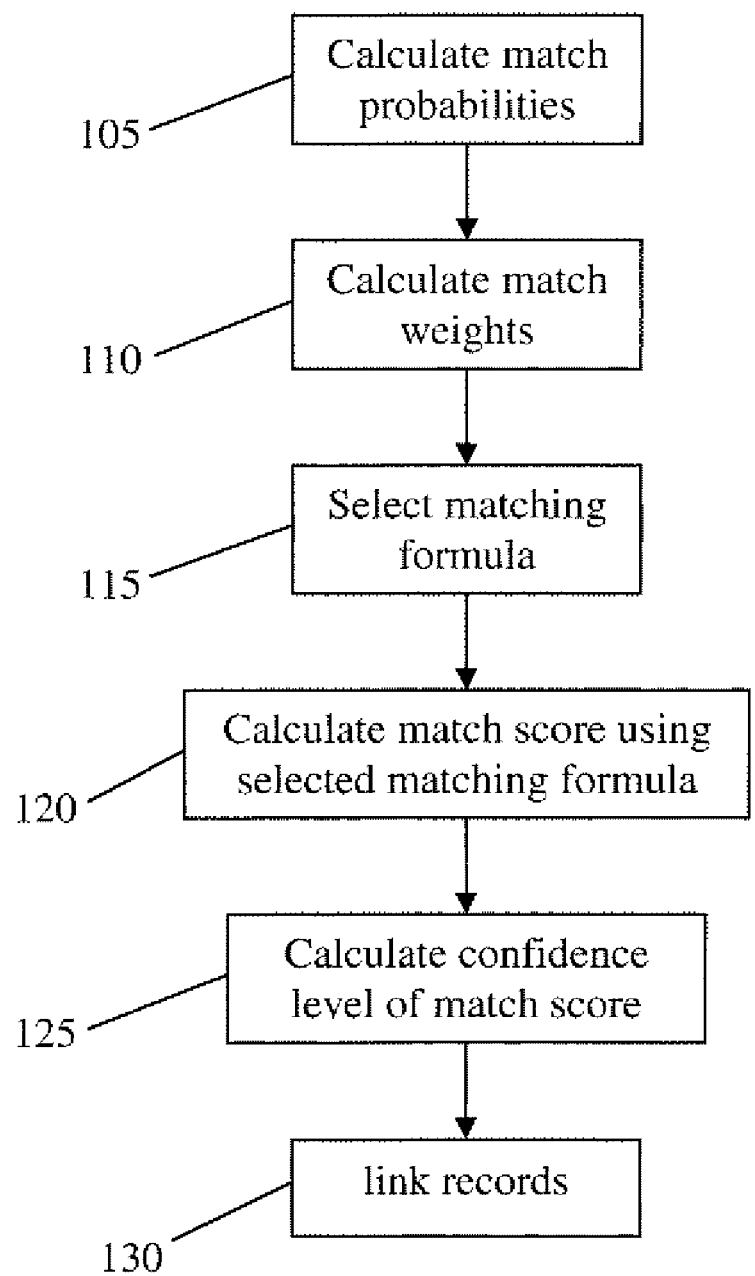
FIG. 1 is a flowchart depicting an embodiment of an invention of Section I.

The following detailed description presents several inventive concepts, which are inter-related.

The following Table of Contents summarizes the present disclosure.

| Table of Contents | Section |
|---|---|
| Techniques For Linking Records And Entity Representations | I |
| Statistical Record Linkage Calibration At The Field And Field Value Levels Without The Need For Human Interaction | II |
| Statistical Record Linkage Calibration For Reflexive And Symmetric Distance Measures At The Field And Field Value Levels Without The Need For Human Interaction | III |
| Statistical Record Linkage Calibration For Reflexive, Symmetric And Transitive Distance Measures At The Field And Field Value Levels Without The Need For Human Interaction | IV |
| Statistical Record Linkage Calibration For Interdependent Fields Without The Need For Human Interaction | V |
| Automated Detection Of Null Field Values And Effectively Null Field Values | VI |
| Adaptive Clustering Of Records And Entity Representations | VII |
| Automated Selection Of Generic Blocking Criteria | VIII |
| Automated Calibration Of Negative Field Weighting Without The Need For Human Interaction | IX |
| Statistical Record Linkage Calibration For Multi Token Fields Without The Need For Human Interaction | X |

| Table of Contents | Section |
|---|---|
| An Exemplary Embodiment | XI |
| Conclusion | XII |

Certain terms used herein are discussed presently. The term "entity representation" encompasses at least one record, and, more typically, a collection of linked records that refer to the same individual. This term is meant to embrace the computer implemented entities of the First Generation Patents And Applications. The term "field" encompasses any portion of a record into which a field value may be entered. The term "field value" encompasses means and manners used to represent information, not limited to numerical values. A "field value" may include other types of data values comprising one or more character types or combination of character types. This term is meant to embrace the "data field values" of the First Generation Patents And Applications. The term "token" encompasses any part of a field value, including the entirety of a field value. The term "individual" encompasses a natural person, a company, a body of work, and any institution. The term "probability" encompasses any quantitative measure of likelihood or possibility, not limited to numerical quantities between zero and one. The term "record" encompasses any data structure having at least one field. This term is meant to embrace the "entity references" of the First Generation Patents And Applications. The discussion in this paragraph is meant to provide instances of what is embraced by certain terms by way of non-limiting example and should not be construed as restricting the meaning of such terms.

The present document includes disclosures of several inventions, which are presented in the following Sections I-XII. Embodiments of these inventions may interact and work together with each other and with the systems and methods presented in the First Generation Patents And Applications. For example, parameters generated by an embodiment of an invention presented in one section may be used by an embodiment presented in another section or in the First Generation Patents And Applications. Exemplary details of such interaction are presented herein.

I. Techniques for Linking Records and Entity Representations

Embodiments of the techniques presented in this section may be used in a database to link records and entity representations. More particularly, this section includes disclosure of techniques that may be used to compare records and decide whether such records refer to the same individual and should be linked. The techniques presented in this section may be used and integrated with techniques of other sections.

FIG. 1 is a flowchart depicting an exemplary embodiment of an invention of Section I. In general, embodiments presented in this section may operate by comparing field values in common fields of two records. The comparisons may be performed in the context of a matching formula (e.g., Equations 2-5 below). Such comparisons may yield, for each field, a probability that the field values match. In some embodiments, a given probability may be one (1) if the fields exactly match and zero (0) otherwise. Other techniques for generating such probabilities are disclosed in the First Generation Patents And Applications, e.g., in the context of EQs 1 and 2. In general, embodiments of the inventions disclosed in this section may calculate, for two records, a weighted sum of such probabilities. That is, each such probability may be multiplied by a weight, and those products of probabilities and weights may then be summed. Certain embodiments of inventions disclosed in this document (e.g., in Sections II, III, IV, V and X) generate weights used in such weighted sums. That is, certain embodiments presented in this section may utilize weights generated by embodiments presented in other sections. If a weighted sum exceeds a threshold, the compared records may be linked.

Embodiments presented in this section may calculate matching formulas that utilize weighted sums that take into account existing fields (and field values) in two records under comparison. However, such embodiments are not limited to consideration of existing fields (and field values). Certain embodiments presented in this disclosure create new fields (and field values) that may be used in addition to or instead of existing fields (and field values). That is, the weighted sums presented in this section may range over existing record fields (or field values), newly added record fields (or field values), or a combination of both.

At block 105, the exemplary embodiment calculates match probabilities. The weights generated according to certain embodiments and utilized in the matching formula weighted sums presented in this section may be derived from certain probabilities, referred to herein as "field value probabilities," "field probabilities" and, collectively, as "match probabilities." For convenience, and throughout this disclosure, a probability associated with an individual field value will be referred to as a "field value probability." A probability associated with a field rather than a particular field value will be referred to herein as a "field probability." Both terms will be referred to collectively as "match probabilities." Exemplary embodiments may produce field value probabilities associated with every non-null field value in every record, as well as field probabilities associated with every field appearing in any record. Each field value probability may represent the probability that a record (or entity representation) chosen at random contains (respectively, contains a record that contains) the associated field value. Each field probability may represent the probability that two randomly chosen records (respectively, entity representations) share a common field value in the associated field (respectively, in the associated field in included records). In certain embodiments, the match probabilities may be produced using an iterative process. An exemplary, non-limiting process is discussed in Section II; note, however, that such process may be combined with other processes presented herein.

At block 110, the exemplary embodiment calculates match weights. In certain embodiments, the weights utilized in the matching formula weighted sums presented in this section may be derived from match probabilities. The field value probabilities may be converted to field value weights, and the field probabilities may be converted to field weights. As discussed in this section, these weights may be used in weighted sums in order to determine whether to link two records. A separate field value weight may be associated with each field value appearing in any record in the database; however, in some embodiments such field value weights may be associated with only a subset of the totality of field values appearing in any record in the database. A separate field weight may be associated with each field appearing in any record in the database; however, in some embodiments such field weights may be associated with only a subset of the totality of fields appearing in any record in the database. The terms "field value weights" and "field weights" are referred to collectively herein as "match weights." In certain embodiments that utilize an iterative process to generate match probabilities, which may be converted into match weights, each iteration of such process may produce increasingly accurate match probabilities and match weights.

Note that match probabilities, which may be used to derive match weights, should not be confused with the probabilities that may be weighted by the match weights. That is, the probabilities used to derive match weights generally referred to herein as $w_i$ should not be confused with the probabilities $p_i$, which appear in the matching formulas presented herein (and in EQs 1 and 2 of the First Generation Patents And Applications).

Deriving match weights from match probabilities may proceed as follows. Note that the match weights so produced may have the advantage of allowing for easier computer implementation. Certain computers and programming languages may be ill-adapted to handle small numbers (e.g., products of probabilities lying in the interval (0,1)), without the risk of introduced rounding error. Conversion to logarithms may avoid the problem of rounding error. For example, logarithms of products of numbers become sums of logarithms of the same numbers, using the formulas $\log_b(AB)=\log_b(A)+\log_b(B)$ and $\log_b(A^X)=X \log_b(A)$. Match probabilities may be converted to match weights and back using, by way of non-limiting example, the following formulas:

$$W = -\log(P); \text{ and} \qquad \text{Equation 1}$$

$$P = 2^{-W}. \qquad \text{Equation 2}$$

In the above formulas, W denotes a weight and P denotes a probability. Note that, in general, match probabilities may be inversely related to the match weights produced according to Equations 1 and 2. Thus, as a probability grows, the associated weight, and therefore significance of a match, decreases, and vice versa. The above formulas may be used for converting numbers in general, not limited to match probabilities and match weights. One of ordinary skill in the art will understand how to convert between standard form and logarithmic form and how to adapt the formulas herein in order to accommodate the different forms.

Match probabilities and match weights may be stored for later use. For example, these parameters may be stored in one or more lookup tables, alone or together with other relevant parameters. Alternately, or in addition, these parameters may be stored in one or more fields added to each record. By way of non-limiting example, field value weights may be stored in fields added to records in which the associated field values appear. The parameters may be updated with each iteration (per, for example Section II) by replacing parameters from prior iterations or by adding newly Generated parameters. In some embodiments, one or both of field value probabilities and field value weights may be stored in fields appended to records, while one or both of field probabilities and field weights may be stored in one or more lookup tables.

At block 115, a matching formula is selected according to the exemplary embodiment. Such a matching formula may be, by way of non-limiting example, as presented below in Equations 3-5. At block 120, a match score is calculated according to the matching formula selected at block 115. Details of such calculations are discussed below in relation to Equations 3-5.

An exemplary technique for using field weights to make record linking decisions is discussed presently. Such decisions may take into account some or all of the fields common to the records. For example, a likelihood that two records reference the same individual may be scored as:

$$S(r_1, r_2) = \sum_f p_f w_f. \qquad \text{Equation 3}$$

In the above record matching formula, $S(r_1, r_2)$ represents a score associated with records $r_1$ and $r_2$, the sum may be over all fields f common to both $r_1$ and $r_2$, and each $p_f$ may be a probability that the field values of $r_1$ and $r_2$ match in field f. In an exemplary, non-limiting embodiment, if the field value in field f is non-null and identical between records $r_1$ and $r_2$, then the corresponding probability $p_f$ may be set equal to one, otherwise, it may be set equal to zero. In another exemplary, non-limiting embodiment, if the field values in field f are non-null and an exact or near match between records $r_1$ and $r_2$, then the corresponding probability $p_f$ may be set equal to one, otherwise, it may be set equal to zero. Such embodiments are particularly suitable for implementing the techniques of Sections III and IV, where a near match is determined according to certain distance functions. Alternate techniques for determining the probabilities $p_f$ are disclosed in the First Generation Patents And Applications. Such techniques include those that assign nonzero probabilities $p_f$ to field values that are not exactly identical. Note that Equation 3 takes into account all fields common to both $r_1$ and $r_2$. In Equation 3, each $w_f$ may be a field weight associated with field f. Techniques for determining these quantities are disclosed herein (e.g., as discussed in detail in reference to Equations 7, 11 and 15 below). Note that each $w_f$ may be a field weight as computed at any stage of an iteration; that is, each $w_{f,v}$ as they appear in Equation 3 may be any of $w_f(1)$, $w_f(2)$, etc. In this technique, knowledge of the common field values is not required, rather, knowledge that the field values match suffices. Note that, if a field value weight lookup table is large in comparison to a field weight lookup table, then computers can generally detect whether two fields contain identical field values and then look up an associated field weight faster than they can detect that two fields contain the same field value and retrieve a field value weight associated with the specific field value. Note further that using field weights produces accurate results for any two records, regardless as to the contents of their fields.

The field value probabilities calculated by certain embodiments may be converted to field value weights and used in making record linking decisions. Such decisions may take into account some or all of the fields common to the records. For example, a likelihood that two records reference the same individual may be scored as:

$$S(r_1, r_2) = \sum_f p_f w_{f,v}. \qquad \text{Equation 4}$$

In the above record matching formula, $S(r_1, r_1)$ represents a score assigned to records $r_1$ and $r_2$, the sum may be over all fields f common to both $r_1$ and $r_2$, and each $p_f$ may be a probability that the field values of $r_1$ and $r_2$ match in field f. In an exemplary, non-limiting embodiment, if the field value in field f is non-null and identical between records $r_1$ and $r_2$, then the corresponding probability $p_f$ may be set equal to one, otherwise, it may be set equal to zero. In another exemplary, non-limiting embodiment, if the field values in field f are non-null and an exact or near match between records $r_1$ and $r_2$, then the corresponding probability $p_f$ may be set equal to one, otherwise, it may be set equal to zero. Such embodiments are particularly suitable for implementing the techniques of Sections III and IV, where a near match is determined according to certain distance functions, or according to the techniques of Section X, where blended weights are used. Alternate techniques for determining the probabilities $p_f$ are disclosed in the First Generation Patents And Applications. Such techniques include those that assign nonzero probabilities $p_f$ to field values that may not be exactly identical. Note that Equation 4 takes into account all fields common to both $r_1$ and $r_2$. Unlike Equation 3, however, Equation 4 also takes into account the particular field values v appearing in each field f common to records $r_1$ and $r_2$. In Equation 4, each $w_{f,v}$ may be a field value weight associated with field f and value v appearing in field f. Techniques for determining these quantities are disclosed herein (e.g., as discussed in detail in reference to Equations 8, 12 and 16 below). Note that each $w_{f,v}$ may be a field value weight as computed at any stage of an iteration; that is, each $w_{f,v}$ as they appear in Equation 4 may be any of $w_{f,v}(1)$, $w_{f,v}(2)$, etc. Using field value weights may require identifying the field values themselves. More particularly, using field value weights may involve using a look-up table that is larger than a look-up table associated with the field weights. However, Equation 4 in general produces more accurate results in comparison with Equation 3, as Equation 4 is tailored to the particular field values in the records being compared.

In some embodiments, a combination of field weights and field value weights may be used in a matching formula. That is, Equations 3 and 4 may be combined such that each term may contain the product of a probability $p_f$ and either a field value weight or a field weight. This technique may be useful, for example, when the field values are know for some fields but not for others. For the fields in which the field values are known, field value weights may be used, whereas for the fields in which the field values are not known, field weights may be used. Thus, Equations 3 and 4 may be mixed together.

In some embodiments, matching formulas as discussed in the First Generation Patents And Applications may be used instead of, or in addition to, the matching formulas presented herein. That is, the matching formulas presented in the First Generation Patents And Applications in reference to EQs 1-4 therein may be used in any embodiment disclosed in the present document that calls for a matching formula.

More generally, a generic matching formula may be employed. Such a generic matching formula may utilize multiple techniques presented in this document. For purposes of illustration and by way of non-limiting example, the generic matching formula may be expressed as:

$$S(r_1, r_2) = \sum_{i=1}^{I} p_i w_i. \qquad \text{Equation 5}$$

In Equation 5 above the index i may range over each field common to the records under comparison, from one (1) to I. That is, the index term i serves to enumerate such common fields. In some embodiments, as discussed below, the range of i may vary depending on the results of a particular comparison of a particular field using a particular technique. That is, some embodiments compare supplemental or proxy fields instead of an original field. In some embodiments, only terms that correspond to the technique that yields the highest match weight may be included in Equation 5. An overview of how Equation 5 may be used is presented immediately below.

In some embodiments, comparing two records for the purpose of deciding whether to link such records may proceed as follows. For each field common to the two records being compared, a term $p_i w_i$ in Equation 5 may be calculated as follows. The following discussion is relative to a field with index i common to the two records under comparison, with the understanding that this process may be repeated for each common field in order to generate a corresponding term $p_i w_i$ for each i less than I or as otherwise stated. First, a determination may be made as to whether the field at issue (having index i) is accounted for in a supplemental field (e.g., with index j) according to a technique of Section V. If so, then the comparison turns to the supplemental field with index j. If there is an exact match between the records in the supplemental field, then a term for that field may be included in the matching formula instead of a term for the original field with index i. Specifically, the term $p_j$ may be set to one (1) or a value as set forth in the First Generation Patents And Applications, and the weight $w_j$ may be set to any of, by way of non-limiting example, $w_j$, $w_{j,v}$, $w_j(n)$ for any n, or $w_{j,v}(n)$ for any n. (These terms are defined in the sections following. Note that, in general and throughout this document, the term "w" with a subscript of, for example, i, j, k, or l may be interpreted as any match weight discussed herein.) If there is not an exact match in the supplemental field (with index j), then the comparison may proceed as follows, with the understanding that any of the weights may be modified by multiplication by a supplemental weight W as discussed in Section V.

If the particular field is not accounted for in a matching supplemental field, then the field values with index i may be compared to detect if they are identical. If so, then a technique according to Section II may be employed. Specifically, the term $p_i$ may be set to one (1) or a value as set forth in the First Generation Patents And Applications, and the weight $w_i$ may be set to any of, by way of non-limiting example, $w_i$, $w_{i,v}$, $w_i(n)$ for any n, or $w_{i,v}(n)$ for any n.

If the field values are not identical, the comparison may proceed as follows. One or more of the techniques of Sections III, IV and X may be employed to detect a near match in the field. For the technique of Section III, an appropriate distance function D may be used to determine whether the field values are a near match with respect to a distance d (e.g., whether D as applied to the field values produces a result no greater than d). If so, $p_i$ may be set to one (1) or a value as set forth in the First Generation Patents And Applications, and $w_i$ may be set to $w_{i,v,D,d}$, $w_{i,D,d}$, $w_{i,v,D,d}(n)$ for any n or $w_{i,D,d}(n)$ for any n. In general, the weight having the least d may be used. For the technique of Section IV, instead of considering the original field (with index i) in which a non-exact match occurs, an alternate "proxy" field may be considered (with index k) in order to determine a near match according to an appropriate distance function D. If there is an exact match in the proxy field, then $p_k$ may be set to one (1) or a value as set forth in the First Generation Patents And Applications, and $w_k$ may be set to $w_k$, $w_{k,v}$, $w_k(n)$ for any n or $w_{k,v}(n)$ for any n. For the technique of Section X, $p_i$ may be set to one (1) or another value as set forth in the First Generation Patents And Applications, and $w_i$ may be set to any of the blended weights that are discussed in Section X. For example, such blended weights may be computed according to any of Equations 33-36, employing any of the techniques discussed in relation to Tables X.5, X.7 and X.8.

Typically, one of the techniques from Sections III, IV and X will produce a larger associated weight term $w_i$ (for the techniques of Sections III or X) or $w_k$ (for the technique of Section IV). The technique that produces the largest weight term may be employed for the near match term selection. Alternately, the technique that produces the largest term $p_iw_i$ (for the techniques of Sections III or X) or $p_kw_k$ (for the technique of Section IV) may be used. The technique selection may occur on a term-by-term basis.

The comparisons discussed above may be repeated for each field common to the records under comparison in order to calculate the score $S(r_1=r_2)$ of Equation 5. Once such a score is calculated, the following technique may be used to determine whether the score is sufficiently large to justify linking the records.

Thus, at block 125, the exemplary embodiment calculates a confidence level of the score produced by the matching formula. Exemplary confidence level calculation techniques are presented below in relation to Equation 6. If the confidence level is sufficiently high, the records are linked at block 130.

In certain embodiments, if a score $S(r_1=r_2)$ exceeds a threshold, the records may be linked. A technique for determining such a threshold is disclosed presently. More particularly, a threshold may be calculated as, by way of non-limiting example:

$$T = \log(N) - \log(1-P) - 1. \qquad \text{Equation 6}$$

In the Equation 6, the term N represents the total number of records in the database for the purpose of the first iteration of a process described in the sections below, or the total number of entity representations for the second, third and subsequent iterations. Thus, the value of N may depend on the particular stage in the iteration in which Equation 6 is being used. Alternately, if the number of actual individuals represented in the database is known (for example, if the database is meant to reflect a known population, such as undergraduates in a particular university), then that quantity may be used for N. The term P may be selected from the interval [0,1) (i.e., as a number both greater than or equal to zero and less than one) to establish a confidence level. More particularly, if a score $S(r_1, r_2)$ calculated according to Equations 3, 4 or 5 with respect to two records $r_1$, $r_2$ exceeds a threshold T calculated according to Equation 6, then the probability that $r_1$ and $r_2$ refer to the same individual and should be linked is at least P. Note that P may be selected from the interval between zero and one, inclusive, and may be converted to a percentage by multiplication by 100. For each additional unit (i.e., 1) added to T, the quantity (1−P) halves (for embodiments that utilize log base two; for other bases, the quantity (1−P) may decrease as a power of the base). In Equation 6, and throughout this disclosure, by way of non-limiting example, the log function has as its base two (2). Nevertheless, other bases may be used in embodiments of the present inventions, such as, by way of non-limiting example, 2, 3⅓, or 10. A table of thresholds computed for a variety of confidence levels appears below.

| P | T |
|---|---|
| 99% | log(N) + 5.64 |
| 99.9% | log(N) + 8.97 |
| 99.99% | log(N) + 12.28 |

As is apparent from the table, the threshold computed using Equation 6 may be dependent on the number of records in the database (for the first iteration) or the number of entity representations in the database (for subsequent iterations). If a score computed by Equations 3, 4 or 5 exceeds a threshold T computed using Equation 6, then the probability that the records should be linked is at least as great as the confidence level P. That is, the present technique allows records to be linked with a specified level of precision, i.e., a probability that a link between the records will not be erroneous. Put another way, the present technique allows records to be linked with a known probability (P) of avoiding false positives.

As discussed elsewhere herein, after the first iteration, with each iteration, the number of entity representations in the database may be expected to decrease until it reaches a stable number. Accordingly, the value log(N) in Equation 6 may be reduced with each iteration (up to a point) such that with each iteration, the threshold required for a given fixed confidence level may be reduced.

The above described embodiments are exemplary only and are not intended to limit the scope of the inventions disclosed herein.

II. Statistical Record Linkage Calibration at the Field and Field Value Levels Without the Need for Human Interaction In some embodiments, the techniques of this section provide one or more weights, which may be used in a record matching formula (e.g., Equations 3-5) to scale probabilities (e.g., $p_f$ or $p_i$) that two records contain a particular field value in a particular field. In such embodiments, a separate weight may be associated with each field value. Thus, certain embodiments associate to each field value a field value probability, which indicates the likelihood that a record or entity representation chosen at random contains the associated field value. Such field value probabilities may be converted to field value weights and used to make linking decisions as discussed above in Section I. That is, such field value weights may be used in conjunction with other weights in making matching decisions, e.g., based on Equations 3-6 above.

Certain embodiments associate a field probability to each field, independent of any particular field value. For a given field, the associated probability may be computed as a weighted average of the probabilities associated with each individual field value that may occur in the given field. Such computations are discussed in detail below in the context of Equations 9, 13 and 17. The field probabilities so produced may be converted to field weights and used to make linking decisions as discussed above in Section I. That is, such field value weights may be used in conjunction with other weights in making matching decisions, e.g., based on Equations 3-6 above.

Figure 2:
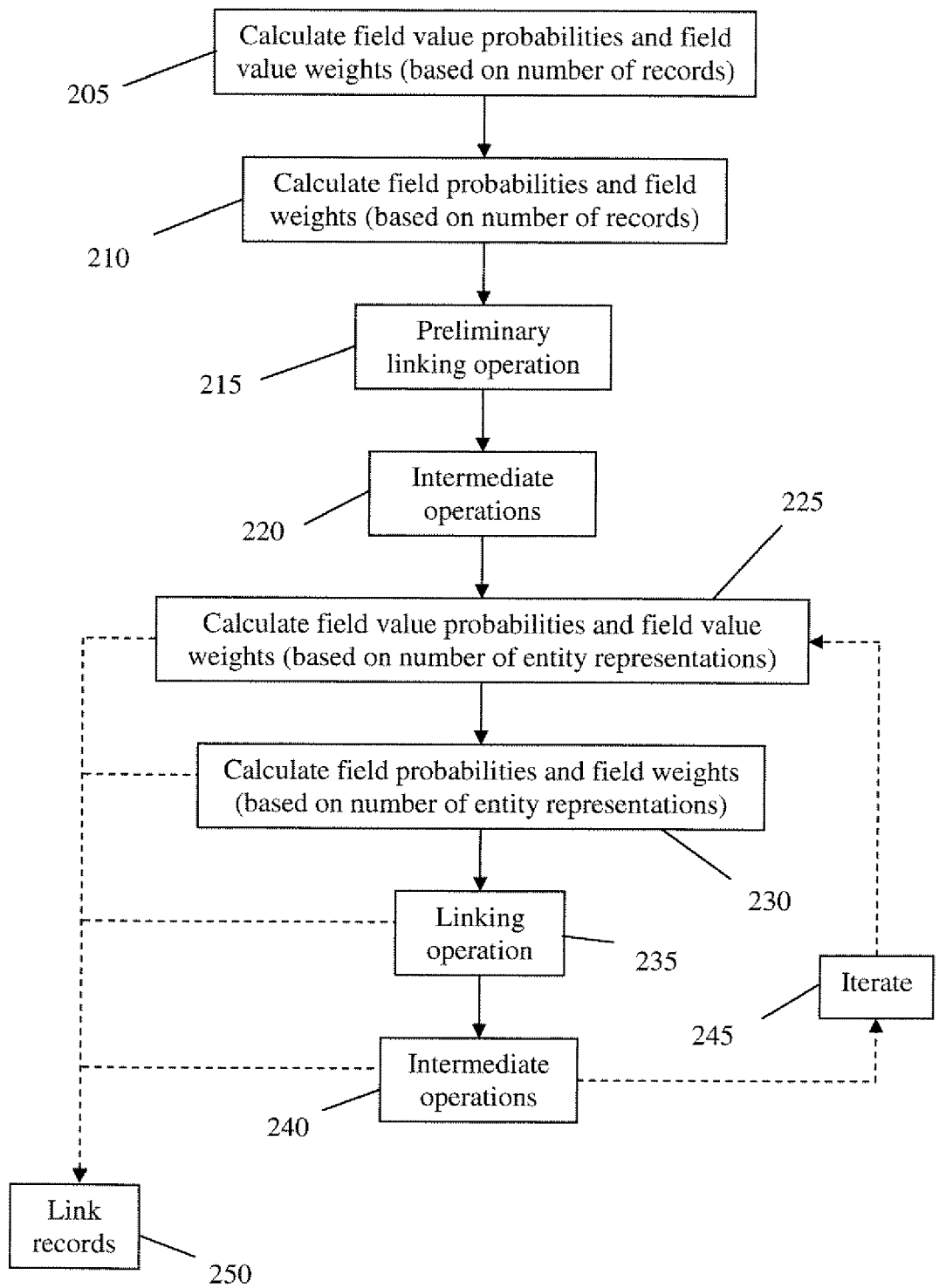
FIG. 2 is a flowchart depicting an embodiment of an invention of Section II.

FIG. 2 is a flowchart depicting an exemplary embodiment of an invention of Section II. An exemplary first iteration of the exemplary iterative match probability and match weight producing embodiment is discussed presently.

At block 205, the first iteration begins by calculating field value probabilities and field value weights. For every field value that appears in any field in any record in the database, the first iteration proceeds by determining the number of records in the database that include the field value in the associated field. That is, the first iteration counts the number of records that include a particular field value in a particular field, and this counting may be performed for every field value and field. At this point, every field value has an associated count. These counts may be then divided by the total number of non-null records in the database, yielding field value probabilities, each of which may be associated with a field value and the field in which the field value appears. That is, at the end of the first iteration, each field value and the field in which it appears may be associated with a field value probability, which may be calculated as the number of records that include the field value in the respective field divided by the total number of records. For a given field f and field value v, the associated field value probability may be calculated as, by way of non-limiting example:

$$p_{f,v}(1) = \frac{c_{f,v}}{c}.$$ Equation 7

In Equation 7, the term $p_{f,v}(1)$ represents the first iteration field value probability associated with field f and field value v appearing in field f. The term $c_{f,v}$ represents the number of records that include field value v in field f, and the term c represents the total number of records in the database. Accordingly, a given field value probability produced by the first iteration may be a probability that a record randomly chosen from the database contains the given field value in its associated field. The field value probabilities may be converted to field value weights according to, by way of non-limiting example:

$$w_{f,v}(1) = -\log p_{f,v}(1).$$ Equation 8

Thus, at the end of the first iteration, each field value and the field in which it appears may be associated with a field value weight, each of which may be calculated from a corresponding field value probability.

The field value probabilities and field value weights may be stored for later use. For example, these parameters may be stored in a lookup table, alone or together with other relevant parameters. Alternately, or in addition, these parameters may be stored in one or more fields added to each record. By way of non-limiting example, field value weights may be stored in fields added to records in which the associated field values appear. The parameters may be updated with each iteration by replacing parameters from prior iterations or by adding newly generated parameters. In some embodiments, one or both of field value probabilities and field value weights may be stored in fields appended to records, while one or both of field probabilities and field weights may be stored in one or more lookup tables.

Note that computation of each field value probability (or field value weight) may occur once for each distinct field value. In subsequent considerations of records with particular field values, the associated field value probability (or field value weight) may be retrieved from a storage location, such as a lookup table or a record itself.

At block 210, the exemplary first iteration may also produce field probabilities and field weights for every field that appears in any record in the database. The field probabilities may be calculated as weighted sums of field value probabilities. More particularly, for a given field f, the associated first iteration field probability may be calculated as, by way of non-limiting example:

$$p_f(1) = \sum_v (p_{f,v}(1))^2.$$ Equation 9

In Equation 9, $p_f(1)$ represents the first iteration field probability associated with field f. The sum may be over all field values v that appear in any record in field f. Each term $p_{f,v}(1)$ represents the first iteration field value probability associated with field value v of field f. The field probabilities may represent the likelihood that two records chosen at random will share a common field value in the associated field. Note that Equation 9 may be considered as a weighted sum, where the sum may be over all field value probabilities and the weights themselves are also field value probabilities (hence the squared term). Note further that Equation 9 may be considered as a weighted average of field value probabilities. The field probabilities may be converted to field weights according to, by way of non-limiting example:

$$w_f(1) = -\log p_f(1).$$ Equation 10

Thus, the first iteration may calculate field probabilities and field weights for every field in every record in the database according to Equations 9 and 10, concluding the first iteration. The field probabilities and field weights may be stored for later use as discussed above.

At block 215, between the first iteration and the second iteration, the database may undergo a preliminary linking operation, which may be based on the match weights generated by the first iteration. Such an exemplary linking operation is discussed presently. Each record may be compared to every other record in the database. Each such comparison may result in a link between the compared pair of records, depending on the results of the comparison. (In some embodiments, every record may be compared with a subset of other records in the database. Such a subset may be generated using blocking criteria as disclosed elsewhere herein.) In the exemplary linking operation, given records $r_1$ and $r_2$ and faced with a decision to link them, Equations 3, 4 or 5 may be used to calculate a score that the records reference the same individual. If the score exceeds a threshold, the records $r_1$ and $r_2$ may be linked. Such a threshold may be determined as discussed in relation to Equation 6.

In general, the actual linking of two records may be performed, by way of non-limiting example, as discussed in the First Generation Patents And Applications, e.g., by inserting a Definitive Identifier ("DID") in an appropriate field of both records. Note that the linking decision may be made for every pair of records in the database, or for pairs of records generated by blocking criteria. The result of the preliminary linking operation may be that the database now contains entity representations, that is, multiple sets of linked records, where each such linked set is meant to contain records that correspond to the same individual.

At block 220, intermediate operations may be performed. Exemplary such operations (e.g., transitional linking, propagation, delinking) are discussed presently.

The database may undergo a transitional linking process between the first iteration and the second iteration. Examples of suitable transitional linking processes are discussed in the First Generation Patents And Patent Applications. Another example of a suitable transitional linking process is disclosed in Section VII below. The transitional linking process may occur at any stage between iterations, e.g., before or after preliminary linking operation 215.

The database may undergo a propagation operation between the first iteration and the second iteration. Such a propagation operation may insert missing field values in recently linked records. For example, if the first iteration results in a first record and a second record being linked, and the first record contains a null value in a field in which the second record includes a non-null field value, then the non-null field value may be propagated to the first record.

Likewise, if the second record contains a null field value in a field in which the first record contains a non-null field value, than that value may be propagated to the second record. A specific example follows. Consider records $r_1$ and $r_2$ reflected below.

| Record | First Name | Last Name | Street Address | SSN | Gender |
|---|---|---|---|---|---|
| $r_1$ | John | Smith | 123 Fake St. | 999-99-999 | |
| $r_2$ | John | Smith | 123 Fake St. | | Male |

If the first iteration results in a link between these records, then the SSN of the first record may be propagated to the second record and the Gender of the second record may be propagated to the first record. The resulting records after the propagation step may appear as follows:

| Record | First Name | Last Name | Street Address | SSN | Gender |
|---|---|---|---|---|---|
| $r_1$ | John | Smith | 123 Fake St. | 999-99-999 | *Male* |
| $r_2$ | John | Smith | 123 Fake St. | *999-99-999* | Male |

In the above table, the field values propagated between linked records are italicized for purposes of illustration.

Note that it may be possible for two records linked in the same entity representation to have different field values in the same field. For purposes of the propagation operation, mechanisms for selecting the value to propagate to records having null in the associated field are discussed presently. In some embodiments, the field value that occurs most frequently in a given field in records linked to the same entity representation may be propagated to records linked to the same entity representation that contain a null value in the given field. In the case where two or more field values occur with the same frequency in a given field of records linked to the same entity representation, the field value with the most information (highest specificity) may be selected for propagation.

The database may undergo a delinking operation between the first iteration and the second iteration. Such a delinking operation may delink records that were incorrectly linked by the preliminary linking operation. Exemplary delinking operations are disclosed in the First Generation Patents And Applications.

Thus blocks 205, 210 and 215 represent a first iteration of the exemplary embodiment under discussion. The exemplary embodiment may further include block 220 in the first iteration. Subsequent iterations, as explained below, may include blocks 225, 230, 235, and may also include block 240.

A second exemplary iteration of the exemplary process is discussed presently. Like the first iteration, the second iteration produces match probabilities and match weights. However, the match probabilities and match weights produced by the second iteration may generally be more accurate than those produced by the first iteration. Furthermore, as discussed in detail below, iterations after the first iteration may take a number of entity representations into account.

At block 225, the second iteration begins by calculating field value probabilities and field value weights. After the first iteration, the database contains sets of linked records in the form of entity representations. The second iteration begins by counting, for each non-null field value that appears in an associated field in any record in the database, the number of entity representations that contain at least one record with that non-null field value in the associated field. Thus, the second iteration begins by associating to each field value the number of entity representations that include a record including such field value. Each of these counts may be then divided by the total number of entity representations in the database, resulting in field value probabilities. Thus, for a given field f and field value v, the associated field value probability may be calculated as, by way of non-limiting example:

$$p_{f,v}(2) = \frac{k_{f,v}}{k}.$$ Equation 11

In Equation 11, the term $p_{f,v}(2)$ represents the second iteration field value probability associated with field f and field value v appearing in field f. The term $k_{f,v}$ represents the number of entity representations that include a record that includes field value v in field f, and the term k represents the total number of entity representations in the database. Thus, the second iteration produces, for each field value, an associated field value probability, which may be calculated as the ratio of the number of entity representations containing a record containing the field value to the total number of entity representations in the database. Accordingly, a given field value probability produced by the second iteration may be a probability that an entity representation randomly chosen from the database contains a record with the given field value in its associated field. The second iteration field value probabilities may be converted to field value weights according to, by way of non-limiting example:

$$w_{f,v}(2) = -\log p_{f,v}(2).$$ Equation 12

Thus, at the end of the second iteration, each field value and the field in which it appears may be associated with a field value weight, each of which may be calculated from a corresponding field value probability. The field value probabilities and field value weights may be stored for later use as discussed above.

At block 230, the second iteration produces field probabilities and field weights associated with each field appearing in any record in the database. The field probabilities may be calculated as weighted sums of the field value probabilities produced by the second iteration. More particularly, for a given field f the associated field probability may be calculated as, by way of non-limiting example:

$$p_f(2) = \sum_v (p_{f,v}(2))^2.$$ Equation 13

In the Equation 13, $p_f(2)$ represents the second iteration field probability associated with field f. The sum may be over all field values v that appear in any record in field f. Each term $p_{f,v}(2)$ represents the second iteration field value probability associated with field value v of field f. Each field probability may represent the probability that two entity representations chosen at random will contain records that share a common field value in the associated field. Note that Equation 13 may be considered as a weighted sum, where the sum may be over all field value probabilities and the weights themselves are also field value probabilities (hence the squared term). Note further that Equation 13 may be considered as a weighted average of field value probabilities. The field probabilities may be converted to field weights according to, by way of non-limiting example:

$$w_f(2) = -\log p_f(2).$$ Equation 14

Thus, the second iteration may calculate field probabilities and field weights for every field in every record in the database according to Equations 13 and 14, concluding the second iteration. The field probabilities and field weights may be stored for later use as discussed above.

At block 235, between the second iteration and the third iteration, the database undergoes a linking operation, which may be based on the match weights generated by the second iteration. The linking operation between the second and third iterations may be essentially identical to the linking operation between the first iteration and the second iteration. Thus, each given record may be compared to every other record in the database (or to a set of records generated by blocking criteria) to which the given record is not already linked, and each such comparison may result in a link between the compared records and, therefore, the corresponding pair of entity representations. Each such comparison may result in a link between the compared pair of records, depending on the results of the comparison. (In some embodiments, every record may be compared with a subset of other records in the database. Such a subset may be generated using blocking criteria as disclosed elsewhere herein.) In the exemplary linking operation, given records $r_1$ and $r_2$ and faced with a decision to link them, Equations 3, 4 or 5 may be used to calculate a score that the records reference the same individual. If the score exceeds a threshold, the records $r_1$ and $r_2$ may be linked. Such a threshold may be determined as discussed in relation to Equation 6. Linking these records links, in turn, the entity representations to which the records may be linked.

It is likely that once the linking operation occurs between the second iteration and the third iteration, the number of unique entity representations in the database may be reduced in comparison with the number that existed after the second iteration.

At block 240, intermediate operations may be performed. Exemplary such operations (e.g., transitional linking, propagation, delinking) are discussed presently.

The database may undergo a transitional linking process between the second iteration and the third iteration. Examples of suitable transitional linking processes are discussed in the First Generation Patents And Patent Applications. Another example of a suitable transitional linking process is presented in Section VII. The transitional linking process may occur at any stage between iteration, e.g., before or after linking operation 235.

The database may undergo a propagation operation between the second iteration and third iteration. The propagation operation may be essentially the same as the propagation operation that may occur between the first iteration and the second iteration. That is, null field values in a first record may be replaced by non-null field values taken from a second record to which the first record may be linked. Likewise, null field values in the second record may be replaced by non-null field values taken from the first record.

The database may undergo a delinking operation between the second iteration and the third iteration. Such a delinking operation may delink records that were incorrectly linked by the preliminary linking operation. Exemplary delinking operations are disclosed in the First Generation Patents And Applications.

Block 245 indicates that one or more of blocks 225, 230, 235 and 240 may be iterated. Third, fourth and subsequent iterations of the exemplary process for generating match probabilities proceeds in a manner similar to that of the second iteration. Thus, the third iteration and subsequent iterations each produce field value probabilities, field value weights, field probabilities, and field weights. Moreover, the match probabilities and match weights produced by each successive iteration may generally be more accurate than those produced by the prior iteration.

In the third, fourth and subsequent iterations of the exemplary process, field value probabilities and field value weights may be calculated in the same manner as those of the second iteration (block 225). Namely, each field value probability may be calculated using a ratio of the number of entity representations containing a record containing the field value to the total number of entity representations in the database. Thus, for a given field f and field value v, the associated field value probability may be calculated as, by way of non-limiting example:

$$p_{f,v}(n) = \frac{k_{f,v}}{k}. \quad \text{Equation 15}$$

In Equation 15, the term $p_{f,v}(n)$ represents the n-th iteration field value probability associated with field f and field value v appearing in field f. The term $k_{f,v}$ represents the number of entity representations (existing at the time the n-th iteration is executed) that include a record that includes field value v in field f, and the term k represents the total number of entity representations in the database (again, existing at the time the n-th iteration is executed). Thus, the n-th iteration produces, for each field value, an associated field value probability, which may be calculated as the ratio of the number of entity representations containing a record containing the field value to the total number of entity representations in the database. Accordingly, a given field value probability produced by the second iteration may be a probability that an entity representation randomly chosen from the database contains a record with the given field value in its associated field. The n-th iteration field value probabilities may be converted to field value weights according to, by way of non-limiting example:

$$w_{f,v}(n) = -\log p_{f,v}(n). \quad \text{Equation 16}$$

Thus, at the end of the n-th iteration, each field value and the field in which it appears may be associated with a field value weight, each of which may be calculated from a corresponding field value probability. The field value probabilities and field value weights may be stored for later use as discussed above.

The field probabilities and field weights produced by the third, fourth and subsequent iterations may be calculated in essentially the same manner as in the second iteration (block 230). These may be calculated as weighted sums of the field value probabilities produced by the n-th iteration. More particularly, for a given field f, the associated field probability may be calculated as, by way of non-limiting example:

$$p_f(n) = \sum_v (p_{f,v}(n))^2. \quad \text{Equation 17}$$

In the Equation 17, $p_f(n)$ represents the n-th iteration field probability associated with field f. The sum may be over all field values v that appear in any record in field f. Each term $p_{f,v}(n)$ represents the n-th iteration field value probability associated with field value v of field f. Note that Equation 17 may be considered as a weighted sum, where the sum may be over all field value probabilities and the weights themselves are also field value probabilities (hence the squared term). Each field probability may represent the probability that two entity representations chosen at random will contain records that share a common field value in the associated field. Note further that Equation 17 may be considered as a weighted average of field value probabilities. The field probabilities may be converted to field weights according to, by way of non-limiting example:

$$w_f(n) = -\log p_f(n).$$ Equation 18

Thus, the n-th iteration may calculate field probabilities and field weights for every field in every record in the database according to Equations 17 and 18, concluding the n-th iteration. Note that the terms in Equations 17 and 18 for the n-th iteration may be determined by the prior (i.e., (n−1)-th) iteration and subsequent linking, delinking and propagation processes. The field probabilities and field weights may be stored for later use as discussed above.

Subsequent intermediate operations (e.g., linking, transition linking, propagation and delinking blocks, block 240) may follow each iteration. It may be expected that each iteration produces more accurate match probabilities (and match weights), converging to match probabilities (respectively, match weights) that may be highly accurate after a suitable number of iterations. Note that the terms $w_f$ and $w_{f,v}$ appearing in Equations 3, 4 and 5 may represent the results of any iteration. That is, the terms $w_f$, $w_{f,v}$ and $w_i$ appearing in Equations 3, 4 and 5 may represent $w_f(n)$ or $w_{f,v}(n)$ for any n. It may also be expected that each iteration results in fewer entity representations in the database, converging to a stable number of entity representations after a suitable number of iterations.

The iteration may halt after any number of iterations after any of blocks 225, 230, 235 or 240. At block 250, the match weights and match probabilities may be used to link records as discussed elsewhere herein.

Note that field weights produced according to certain embodiments of the present invention have several useful properties. More particularly, field weights may be calculated according to Equations 10, 14 and 18, and such weights have several useful properties. For the purposes of this disclosure, the term "cohort" means the set of entity records (for the first iteration) or entity representations (for second and subsequent iterations) that share a common field value. Thus, for example, after the first iteration, the collection of all entity representations that have "John" in the First Name field of an included record may be considered one cohort, and the collection of all entity representations that have "Mary" in the First Name field of an included record may be considered another cohort. Thus, a particular field may have many different cohorts associated with it. For example, the First Name field may be associated with cohorts that correspond to each unique first name that appears in any record in the database. Certain embodiments of the present invention produce field weights with the property that, the larger the weight associated with a field, the more significance may be accorded a match between two records in that field. Field weights calculated according to certain embodiments of the present invention may accord significance in a manner that takes into account both the number of cohorts and how the field values are distributed among the cohorts.

An example may help illustrate. Consider the First Name field, and suppose for purposes of illustration that there are exactly four first name field cohorts in the database: John, Mary, Dick and Jane. Suppose that the four cohorts are distributed exactly evenly; that is, each cohort occupies exactly 25% of the records (or the entity representations). Then the field probability for the first name field may be calculated according to Equations 9, 13 or 17 as:

$$(\tfrac{1}{4})^2 + (\tfrac{1}{4})^2 + (\tfrac{1}{4})^2 + (\tfrac{1}{4})^2 = \tfrac{1}{4}.$$

The corresponding field weight may be calculated according to Equations 10, 14 or 18 as:

$$-\log(\tfrac{1}{4}) = 2$$

Thus, a match between two records at the first name field may be accorded a weight, or significance, of two.

Now consider a database in which there are four First Name cohorts that are distributed unevenly. By way of example, consider a database in which 97% of the records (or entity representations) fall within the "John" first-name cohort, 1% of the records (or entity representations) fall within the "Mary" cohort, 1% fall within the "Dick" cohort, and 1% fall within the "Jane" cohort. Then the field probability for the first name field may be calculated according to Equations 9, 13 or 17 as:

$$(0.97)^2 + (0.01)^2 + (0.01)^2 + (0.01)^2 = 0.941.$$

The corresponding field weight may be calculated according to Equations 10, 14 or 18 as:

$$-\log(0.9412) = 0.0874.$$

Accordingly, a match between two records at the first name field may be accorded a weight, or significance, of 0.0874. Note that the significance accorded a match in this example is very close to zero, whereas a significance accorded a match in the previous example is much more significant. Thus, certain embodiments of the present invention produce matching formula weights that take into account both the number and the distribution of the cohorts in each field.

Note that in the above example, the field value weight associated with the cohort "John" (namely, 0.0439) is much less than the field value weight associated with any of the cohorts "Mary," "Dick," or "Jane" (namely 6.64).

Advantages of the iterative technique disclosed herein over the prior art include the following. Certain prior art techniques, such as those disclosed in U.S. Pat. No. 6,523,019 to Borthwick, require human intervention and manual entry or examination of linking decisions. For example, U.S. Pat. No. 6,523,019 to Borthwick requires a training step in which a human operator is required to analyze and make linking decisions for large sets of data. In contrast, certain embodiments of the present technique may be executed without any human decision making. While embodiments of the present invention may include manual entry or examination of linking decisions, these features are not required. Yet embodiments of the present invention still provide accurate matching formula coefficients or weights. Other advantages include improved accuracy and the ability to quickly recalculate match probabilities upon additional records being added to the database. In such instances, once additional records are added, the process may simply be iterated one or more times in order to assimilate the additional records into entity representations as appropriate.

According to an exemplary embodiment of a technique of this section, a method of utilizing a record matching formula weight, where the record matching formula weight is specific to a particular field value, is presented. The embodiment calculates a first probability that a record in the database includes the particular field value. The embodiment links records in the database based at least in part on the first probability, whereby a plurality of entity representations are generated. The embodiment calculates a second probability that an entity representation in the database includes the particular field value. The embodiment links entity representations in the database based at least in part on the second probability. And the embodiment allows a user to retrieve information from at least one record in the database.

Various optional features for the above-described exemplary embodiment include the following. The embodiment may further iterate calculating a second probability and linking entity representations at least once prior to the retrieving. The embodiment may further include calculating a probability that two records match using the record matching formula, where the record matching formula includes a weighted sum of probabilities that two records match, where the weights include the second probability.

According to an exemplary embodiment of a technique of this section, a method of using a record matching formula weight, where the record matching formula weight is specific to a particular field and independent of any particular field value in the particular field, is presented. The embodiment calculates a plurality of first probabilities, each of the plurality of first probabilities reflecting a likelihood that a record in the database includes a particular field value. The embodiment calculates a first weight comprising a weighted sum of the first probabilities. The embodiment links records in the database based at least in part on the first weight, whereby a plurality of entity representations are generated. The embodiment calculates a second plurality of probabilities, each of the second plurality of probabilities reflecting a likelihood that an entity representation in the database includes a particular field value. The embodiment calculates a second weight comprising a weighted sum of the second probabilities. The embodiment links entity representations in the database based at least in part on the second weight. And the embodiment allows a user to retrieve information from at least one record in the database.

The above described embodiments are exemplary only and are not intended to limit the scope of the inventions disclosed herein.

III. Statistical Record Linkage Calibration for Reflexive and Symmetric Distance Measures at the Field and Field Value Levels Without the Need for Human Interaction Embodiments of this technique may be implemented in its own iterative process or incorporated into the iterative process described above in Section II.

In some embodiments, the techniques of this section provide one or more weights, which may be used in a record matching formula (e.g., Equations 3-5) to scale probabilities (e.g., $p_f$ or $p_i$) that two records contain nearly matching field values in a particular field. Whether two field values qualify as nearly matching may be determined in part by a reflexive and symmetric distance function and a specified distance within which the two field values lie as determined by the function.

Thus, some embodiments provide field value probabilities associated with near matches. For a record that contains a particular field value in a particular field, certain embodiments provide a probability that a record or entity representation chosen at random contains a field value in the particular field that lies within a specified distance of the particular field value. In such embodiments, a separate probability may be associated with one or more distances and each field value. That is, certain embodiments of the present invention associate to each given field value and each chosen distance a probability that a record (or entity representation) chosen at random contains (respectively, contains a record that contains) a field value in the associated common field that lies within the chosen distance of the given field value, where the distance between field values may be determined by the reflexive and symmetric distance function. Such field value probabilities may be converted to field value weights and used to make linking decisions as discussed above in Section I.

That is, such field value weights may be used in conjunction with other weights in making matching decisions, e.g., based on Equations 3-6 above.

Certain embodiments associate a probability to each field and selected distance, independent of any particular field value. For a given field and distance, the associated probability may be computed as a weighted average of the probabilities associated with the distance and each individual field value that may occur in the given field. Such computations are discussed in detail below in the context of Equations 21 and 25. The field probabilities calculated by certain embodiments may be converted to field weights and used in making record linking decisions. Such decisions may take into account some or all of the fields common to the records. In this technique, knowledge of the common field values may not be required. Further, this technique produces accurate results for any two records, regardless as to the contents of their fields.

Figure 3:
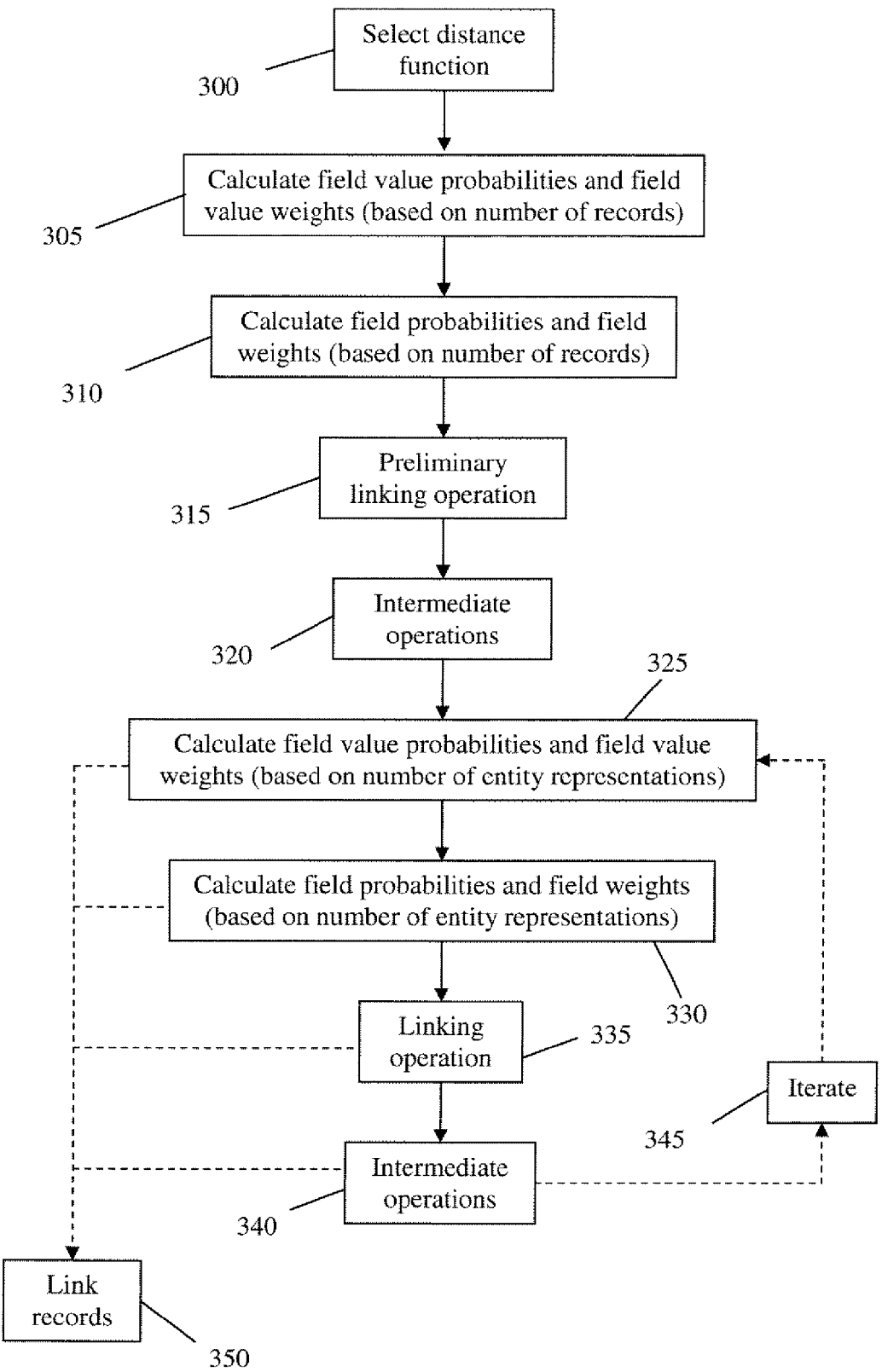
FIG. 3 is a flowchart depicting an embodiment of an invention of Section III.

FIG. 3 is a flowchart depicting an exemplary embodiment of an invention of Section III. An exemplary first iteration of the exemplary iterative match value match weight producing embodiment is discussed presently.

At block 300 a distance function is selected. Certain embodiments of the present invention allow for a variety of measures of what constitutes a near match of field values. In some embodiments, an edit distance function may be used. Such functions measure how many discrete edits would be required to change one field value into another field value. There are several types of edit distance metrics, including, by way of non-limiting example, Hamming distance, Levenshtein distance, Damerau-Levenshtein distance, Jaro-Winkler distance, Wagner-Fischer distance, Ukkonen distance and Hirshberg distance. By way of illustration, the Hamming distance between field values "disk" and "disc" is one (1), as one substitution would be required to transform one field value to the other. For purposes of illustration only, Hamming distance will be used to illustrate the relevant properties of edit distance functions.

Importantly, the present invention is not limited to edit distance functions. Indeed, any function that is symmetric and reflexive may suffice. The edit distance functions benefit from both properties. More particularly, a function is symmetric if reversing the order of arguments produces the same result. Edit distance has this property, because, for example, one substitution is required to transform "disk" to "disc", and one substitution is required to transform "disc" to "disk". Formally, if $D(\bullet, \bullet)$ is an edit distance function, then $D(v_1, v_2) = D(v_2, v_1)$. The edit distance functions are also reflexive. That is, these functions output a distance of zero when two identical field values are compared. Thus, for example, no substitutions are required to transform the field value "database" to the field value "database". Formally, if $D(\bullet, \bullet)$ is an edit distance function, then $D(v_1, v_1) = 0$. Thus, any symmetric and reflexive function that compares field values and outputs a distance between the field values or a probability that the field values match may be used. For the remainder of this section, the term D denotes a function, not limited to edit distance functions, with the appropriate properties. Note that unary functions or binary functions may be used with the present technique. Further, if the selected function is transitive in addition to being reflexive and symmetric, then the techniques of Section IV may be used instead of the techniques of the present section.

At block 305, exemplary first iteration continues by calculating field value probabilities and field value weights associated with a given distance function D. For every given non-null field value that appears in any field in any record in the database, the first iteration proceeds by determining the number of records in the database that include a field value in the associated field that is within a fixed distance of the given field value. This step may be performed for a number of different distances (e.g., for a edit distance function, the technique may be performed for distances of 1, 2, 3, etc.). That is, for each given field and associated given field value, the first iteration counts the number of records containing other field values that lie within a fixed distance of the given field value. This process may be performed for every field value.

At this point, every field value and distance has an associated record count. These counts may then be divided by the total number of records containing non-null field values in the associated field, yielding field value probabilities, each of which may be associated with a field value, the field in which the field value appears, and a distance. That is, at the end of the first iteration, each field value, the field in which it appears, and a given distance may be associated with a field value probability. Each field value probability may be calculated as the number of records containing fields with field values that lie within the given distance of the field value, divided by the number of records containing non-null field values that appear in the field. For a given field f, field value v, function D, and distance d, the associated field value probability may be calculated as, by way of non-limiting example:

$$p_{f,v,D,d}(1) = \frac{c_{f,v,D,d}}{c}.$$

Equation 19

In Equation 19, the term $p_{f,v,D,d}(1)$ represents the first iteration field value probability associated with field f, field value v appearing in field f, the distance d and the function D. The term $c_{f,v,D,d}$ denotes the number of records that contain a field value in field f that is within distance d from field value v as measured by the function D. That is, $c_{f,v,D,d}$ represents the number of records that contain a field value v' in field f such that $D(v,v') \leq d$. The term c represents the number of records that contain a non-null field value in field f. Thus, the quotient on the right hand side of Equation 19 reflects a proportion of records that include a field value that lies within distance d of the particular field value v. Accordingly, a given field value probability produced by the first iteration of this technique may be a probability that a record randomly chosen from the database contains a field value in its associated field that lies within the distance d of a given field value. To calculate $p_{f,v,D,d}(1)$, it suffices to calculate $D(v,v')$ for each distinct v' that appears in field f in any record in the database, and then, for values that lie within d of v, multiply by the number of occurrences of each (in records) and sum the results to get $c_{f,v,D,d}$. The field value probabilities may be converted to field value weights according to, by way of non-limiting example:

$$w_{f,v,D,d}(1) = -\log p_{f,v,D,d}(1).$$

Equation 20

Thus, at the end of the first iteration, for at least one distance d, each field value v and the field in which it appears may be associated with a field value weight, each of which may be calculated from a corresponding field value probability.

The field value probabilities and field value weights may be stored for later use. For example, these parameters may be stored in a lookup table, alone or together with other relevant parameters such as the associated distance(s). Alternately, or in addition, these parameters may be stored in one or more fields added to each record. By way of non-limiting example, field value weights may be stored in fields added to records in which the associated field values appear. The parameters may be updated with each iteration by replacing parameters from prior iterations or by adding newly generated parameters. In some embodiments, one or both of field value probabilities and field value weights may be stored in fields appended to records, while one or both of field probabilities and field weights may be stored in one or more lookup tables.

At block 310, the first iteration produces field probabilities and field weights for every field that appears in any record in the database and for at least one distance. The field probabilities may be calculated as weighted sums of field value probabilities. More particularly, for a given field f, the associated first iteration field probability may be calculated as, by way of non-limiting example:

$$p_{f,D,d}(1) = \sum_v (p_{f,v,D,d}(1))^2.$$

Equation 21

In the Equation 21, $p_{f,v,D,d}(1)$ represents the first iteration field probability associated with field f, distance d and function D. The sum may be over all field values v that appear in any record in field f. Note that Equation 21 may be considered as a weighted sum, where the sum may be over all field value probabilities and the weights themselves are also field value probabilities (hence the squared term). Note further that Equation 21 may be considered as a weighted average of field value probabilities. The field probabilities may be converted to field weights according to, by way of non-limiting example:

$$w_{f,D,d}(1) = -\log p_{f,D,d}(1).$$

Equation 22

Thus, the first iteration may calculate, according to Equations 21 and 22, field probabilities and field weights for every field in every record in the database, for at least one distance d, and with respect to a given reflexive and symmetric function D, concluding the first iteration. The field probabilities and field weights may be stored for later use as discussed above.

At block 315, between the first iteration and the second iteration, the database undergoes a preliminary linking operation, which may be based on the match weights generated by the first iteration. This linking operation may be essentially the same as the preliminary linking operation discussed above in Section I. The result of the preliminary linking operation may be that, after the first iteration, the database contains entity representations, that is, multiple sets of linked records, where each such linked set is meant to contain records that correspond to the same individual.

At block 320, intermediate operations may be performed. Exemplary such operations (e.g., transitional linking, propagation, delinking) are discussed presently.

The database may undergo a transition linking process between the first iteration and the second iteration. The transition linking process may be essentially the same as the transition linking process discussed above in Section II. The transitional linking process may occur at any stage between iterations, e.g., before or after preliminary linking operation 315.

The database may undergo a propagation operation between the first iteration and the second iteration. The propagation operation may be essentially the same as the propagation operation discussed above in Section II.

The database may undergo a delinking operation between the first iteration and the second iteration. The delinking operation may be essentially the same as the delinking operation discussed above in Section II.

Thus, blocks 305, 310 and 315 represent a first iteration of the exemplary embodiment under discussion. The exemplary embodiment may further include block 320 in the first iteration. Subsequent iterations, as explained below, may include blocks 325, 330, 335, and may also include block 340.

A technique for second, third and subsequent exemplary iterations of the exemplary process is discussed presently. Like the first iteration, the second iteration produces match probabilities and match weights. However, the match probabilities and match weights produced by the second iteration may generally be more accurate than those produced by the first iteration. After the first iteration, the database contains sets of linked records in the form of entity representations.

At block 325, the second (and subsequent) iteration begins by calculating field value probabilities and field value weights. The second (and subsequent) iteration may proceed by counting, for each given non-null field value that appears in an associated field in any record in the database, for at least one distance, and for a reflexive symmetric function, the number of entity representations that contain at least one record with a field value in the associated field that is within the distance of the given non-null field value as measured by the function. Thus, the second iteration begins by associating to each given field value the number of entity representations that include a record including a field value that is "near" the given field value as measured by the function. The function D and distance d define, by way of non-limiting example, what is meant by "near." Each of these counts may then be divided by the total number of entity representations in the database that contain a record with a non-null field value in the associated field, resulting in field value probabilities. Thus, for a given distance d, function D, and a given field f and field value v, the associated field value probability may be calculated as, by way of non-limiting example:

$$p_{f,v,D,d}(n) = \frac{k_{f,v,D,d}}{k}.$$

Equation 23

In Equation 23, the term $p_{f,v,D,d}(n)$ represents the n-th iteration field value probability associated with field f, field value v appearing in field f, the distance d and the function D. The term $k_{f,v,D,d}$ denotes the number of entity representations containing records that contain a field value in field f that is within distance d from field value v as measured by the function D. That is, $k_{f,v,D,d}$ represents the number of entity representations that contain records that contain a field value v' in field f such that $D(v,v') \leq d$. The term k represents the number of entity representations containing records that contain a non-null field value in field f. Thus, the quotient on the right hand side of Equation 23 reflects a proportion of entity representations that include a record containing a field value that lies within distance d of the particular field value v. Thus, the n-th iteration produces, for each field value v, an associated field value probability, which may be calculated as the ratio of (1) the number of entity representations containing a record containing a field value v' in field f that is within distance d of field value v to (2) the total number of entity representations containing records with non-null field values in field f in the database.

Accordingly, a field value probability associated with a given field value and produced by the n-th iteration may be a probability that an entity representation randomly chosen from the database contains a record with a field value in the associated field that lies within distance d of the given field value. To calculate $p_{f,v,D,d}(n)$, it suffices to calculate $D(v,v')$ for each distinct v' that appears in field f in any record in the database, and then, for values that lie within d of v, multiply by the number of occurrences of each (in entity representations) and sum the results to get $k_{f,v,D,d}$.

The n-th iteration field value probabilities may be converted to field value weights according to, by way of non-limiting example:

$$w_{f,v,D,d}(n) = -\log p_{f,v,D,d}(n).$$

Equation 24

Thus, at the end of the n-th iteration, each field value and the field in which it appears may be associated with a field value weight, each of which may be calculated from a corresponding field value probability. The field value probabilities and field value weights may be stored for later use as discussed above.

At block 330, the n-th iteration may produce field probabilities associated with each field appearing in any record in the database. These may be calculated as weighted sums of the field value probabilities produced by the n-th iteration. More particularly, for a given field f, function D and distance d, the associated field probability may be calculated as, by way of non-limiting example:

$$p_{f,D,d}(n) = \sum_v (p_{f,v,D,d}(n))^2.$$

Equation 25

In Equation 25, $p_{f,v,D,d}(n)$ represents the n-th iteration field probability associated with field f, distance d and function D. The sum may be over all field values v that appear in any record in field f. Note that Equation 25 may be considered as a weighted sum, where the sum may be over all field value probabilities and the weights themselves are also field value probabilities (hence the squared term). Note further that Equation 25 may be considered as a weighted average of field value probabilities. The field probabilities may be converted to field weights according to, by way of non-limiting example:

$$w_{f,D,d}(n) = -\log p_{f,D,d}(n).$$

Equation 26

Thus, the n-th iteration may calculate field probabilities and field weights for every field in every record in the database according to Equations 25 and 26, concluding the second iteration. The field probabilities and field weights may be stored for later use as discussed above.

Between the n-th iteration and the (n+1)-th iteration, the database undergoes a linking operation, which may be based on the match weights generated by the second iteration. The linking operation between the n-th iteration and the (n+1)-th iteration may be essentially identical to the linking operation between the first iteration and the second iteration. Thus, each record may be compared to every other record in the database, and each such comparison may result in a link between the compared records and, therefore, the corresponding pair of entity representations. Each such comparison may result in a link between the compared pair of records, depending on the results of the comparison. (In some embodiments, every record may be compared with a subset of other records in the database. Such a subset may be generated using blocking criteria as disclosed elsewhere herein.) In the exemplary linking operation, given records $r_1$ and $r_2$ and faced with a decision to link them, Equations 3, 4 or 5 may be used to calculate a score that the records reference the same individual. If the score exceeds a threshold, the records $r_1$ and $r_2$ may be linked. Such a threshold may be determined as discussed in relation to Equations 3-6. Linking these records links, in turn, the entity representations to which the records may be linked.

It is likely that once the linking operation occurs between the n-th iteration and the (n+1)-th iteration, the number of unique entity representations in the database may be reduced in comparison with the number that existed after the n-th iteration.

At block 340, intermediate operations may be performed. Exemplary such operations (e.g., transitional linking, propagation, delinking) are discussed presently.

The database may undergo a transition linking process between the n-th iteration and the (n+1)-th iteration. The transition linking process may be essentially the same as the transition linking process discussed above in Section II. The transitional linking process may occur at any stage between iterations, e.g., before or after linking operation 335.

The database may undergo a propagation operation between the n-th iteration and the (+1)-th iteration. The propagation operation may be essentially the same as the propagation operation that may occur between the first iteration and the second iteration. That is, null field values in a first record may be replaced by non-null field values taken from a second record to which the first record is linked. Likewise, null field values in the second record may be replaced by non-null field values taken from the first record.

The database may undergo a delinking operation between the n-th iteration and the (n+1)-th iteration. Such a delinking operation may delink records that were incorrectly linked by the linking operation that preceded the n-th iteration. Exemplary delinking operations are disclosed in the First Generation Patents And Applications.

Block 345 indicates that one or more of blocks 325, 330, 335 and 340 may be iterated. The third iteration and subsequent iterations each produce field value probabilities, field value weights, field probabilities, and field weights. Moreover, the match probabilities and match weights produced by each successive iteration may generally be more accurate than those produced by the prior iteration. The iteration may halt after any number of iterations after any of blocks 325, 330, 335 or 340. At block 350, the match weights and match probabilities may be used to link records as discussed elsewhere herein.

In sum, certain embodiments according to this section produce match weights that may be used as weights in linking formulas. In computing a match score for two records according to, for example, Equation 5, the contents of each field common to the records may be compared. In the event that the field values of a particular field do not exactly match, that field may be accounted for in the linking formula according to a technique as disclosed in this section. That is, for such a field (where the field values are not identical in the records under comparison), a determination may be made as to whether the field values are near matches as determined by the selected distance function D and for various distances d. If the field values do indeed lie within a distance d of each-other according to the distance function D, then the weight used in the matching formula for that particular field may be one of $w_{f,v,D,d}(n)$ or $w_{f,D,d}(n)$ for some n. Note that here, and in general, the match weight or match probability associated with the least distance d may be used. Note that the matching formula may utilize weights according to a technique disclosed in this section in one or more terms, and may utilize weights according to other techniques disclosed in other sections herein in other terms. Thus, weights according to certain embodiments of this section may be used in a matching formula for a particular field on a case-by-case basis, that is, depending on whether the field values in the records under comparison are identical or not.

According to an exemplary embodiment of a technique of this section, a method of utilizing a record matching formula weight, where the record matching formula weight is specific to a particular field value, is presented. The embodiment includes selecting a symmetric and reflexive function and at least one distance. The embodiment calculates a first probability that a record in the database includes a field value that lies within the selected distance of the particular field value as determined by the function. The embodiment links records in the database based at least in part on the first probability, whereby a plurality of entity representations are generated. The embodiment calculates a second probability that an entity representation in the database includes a field value that lies within the selected distance of the particular field value as determined by the function. The embodiment links entity representations in the database based at least in part on the second probability. And the embodiment allows a user to retrieve information from at least one record in the database.

Various optional features of the above exemplary embodiment include the following. The embodiment may include iterating the calculating a second probability and the linking entity representations at least once prior to the retrieving. The embodiment may include calculating a probability that two records match using the record matching formula, where the record matching formula includes a weighted sum of probabilities that two records match, where the weights include the second probability.

According to an exemplary embodiment of a technique of this section, a method of utilizing a record matching formula weight, the record matching formula weight is specific to a particular field and independent of any particular field value in the particular field, is presented. The embodiment includes selecting a symmetric and reflexive function and at least one distance. The embodiment includes calculating a plurality of first probabilities, each of the plurality of first probabilities reflecting a likelihood that a record in the database includes a field value that lies within the selected distance of a different field value as determined by the function The embodiment includes calculating a first weight comprising a weighted sum of the first probabilities. The embodiment includes linking records in the database based at least in part on the first weight, whereby a plurality of entity representations are generated. The embodiment includes calculating a second plurality of probabilities, each of the plurality of second probabilities reflecting a likelihood that an entity representation in the database includes a record comprising a field value that lies within the selected distance of a different field value as determined by the function. The embodiment includes calculating a second weight comprising a weighted sum of the second probabilities. The embodiment includes linking entity representations in the database based at least in part on the second weight. The embodiment allows a user to retrieve information from at least one record in the database.

The above described embodiments are exemplary only and are not intended to limit the scope of the inventions disclosed herein.

IV. Statistical Record Linkage Calibration for Reflexive, Symmetric and Transitive Distance Measures at the Field and Field Value Levels Without the Need for Human Interaction Embodiments of this technique may be implemented in their own iterative process or incorporated into an iterative process as described above in Section II.

In some embodiments, the techniques of this section provide one or more weights, which may be used in a record matching formula (e.g., Equations 3-5) to scale probabilities (e.g., $p_f$ or $p_i$) that two records contain nearly matching field values in a particular field. A near match in field values may be determined at least in part by a reflexive, symmetric and transitive function. In some embodiments, one or more additional fields may be added to each record. Each additional field may serve as a proxy for an original field. A near match in an original field may be determined by detecting an exact match in a corresponding proxy field. Moreover, each field value, whether occurring in an original or proxy field, may have associated to it a field value probability, which may be converted to a field value weight and used in making linking decisions as discussed above in Section II.

Thus, certain embodiments of the present invention associate to each of one or more select fields a field referred to herein as a "proxy field." Each proxy field may each contain a field value derived from the original field. A match between field values of two records in a proxy field may indicate a near match of field values in the original field. Moreover, each field value in each proxy field (and hence each associated original field) may have associated to it a field value probability, which indicates a probability that a record (respectively, entity representation) chosen at random contains (respectively, contains a record that contains) the same field value in its corresponding proxy field.

Thus, each proxy field (and hence each associated original field) may have associated to it a field value probability, which indicates a probability that a record (respectively, entity representation) chosen at random contains (respectively, contains a record that contains) a similar field value in the corresponding original field as determined by the chosen reflexive, symmetric and transitive distance function. Each field value probability may be converted to a field value weight associated with the relevant proxy field (and hence original field). Such field value weights may be used in making linking decisions as discussed above in Section II.

Certain embodiments associate a probability to each field (original and proxy), independent of any particular field value. For a given field, the associated probability may be computed as a weighted average of the probabilities associated with each individual proxy field value that may occur in the proxy field. (Such probabilities may also he associated with the field values appearing in the original field.) Moreover, the field probabilities calculated by certain embodiments may be converted to field weights and used in making record linking decisions. Such decisions may take into account some or all of the fields common to the records. In this technique, knowledge of the common field values may be not required. Further, this technique produces accurate results for any two records, regardless as to the contents of their fields.

The present technique may use various measures of similarity. That is, the present technique is not limited to a single measure of near matches between field values. Instead, any reflexive, symmetric and transitive function may be used to detect or measure similarity of field values. An example of such a function is SOUNDEX. The SOUNDEX function takes a string as an argument and outputs a code in standard format that provides an indication of the string's pronunciation. The output of the SOUNDEX function (or any other reflexive, symmetric and transitive function) may be referred to herein as a "code." Note that, in general, reflexive, symmetric and transitive functions define a partition of the domain over which the function operates, where the partition may be defined according to the codes assigned to elements of the domain by the function. That is, each part of the partition may be defined by a different code assigned only to the elements in that part by the function. The SOUNDEX function is reflexive because it produces the same code every time the same string is input. It is symmetric because if two strings produce the same code, they will produce the same code regardless as to the order of computation, i.e., regardless as to which string is fed into the SOUNDEX function first. The SOUNDEX function is transitive because if a first string and a second string produce the same code, and if the second string and a third string produce the same code, then the first string and the third string produce the same code. Note that the edit distance function is not transitive. For example, the edit distance between the strings "tape" and "tale" is one, and the edit distance between the strings "tale" and "tall" is one, but the edit distance between the string "tape" and "tall" is two, rather than one. For the remainder of this section, the term D will denote a function with the appropriate properties, not limited to SOUNDEX. Note that unary functions or binary functions may be used with the present technique.

Certain embodiments of the present technique add one or more fields to each record in order to associate codes with each of one or more existing field values in the record. Thus, by way of non-limiting example, each record may be appended with an additional field that contains as its field value the SOUNDEX code for that record's First Name field value. Continuing the example, each record may further be appended with another field that contains as its field value the SOUNDEX code of that record's Last Name field value. An arbitrary number of additional fields may be appended to the records in this manner. More particularly, the technique of this section may be applied to any field that is amenable to a near-match or similar field value analysis. By way of non-limiting example, for each record, the field value of any such field may be input in the selected distance function D, and the output may be included in an additional field appended to such record. Again, the technique is not limited to SOUNDEX. Rather, a code produced by any function D with the appropriate properties may be included in such additional field(s).

Thus, for each record, certain embodiments derive a code from the field value of an existing field and insert such code into a proxy field. Such embodiments may repeat this process for a plurality of fields. Accordingly, certain embodiments add one of more fields to each record. An iteration, such as that discussed above in Section II, may then be performed on the altered records in order to compute match probabilities and match weights for the field values in the proxy fields. The field values in such added fields may be used in making linking decisions.

Figure 4:
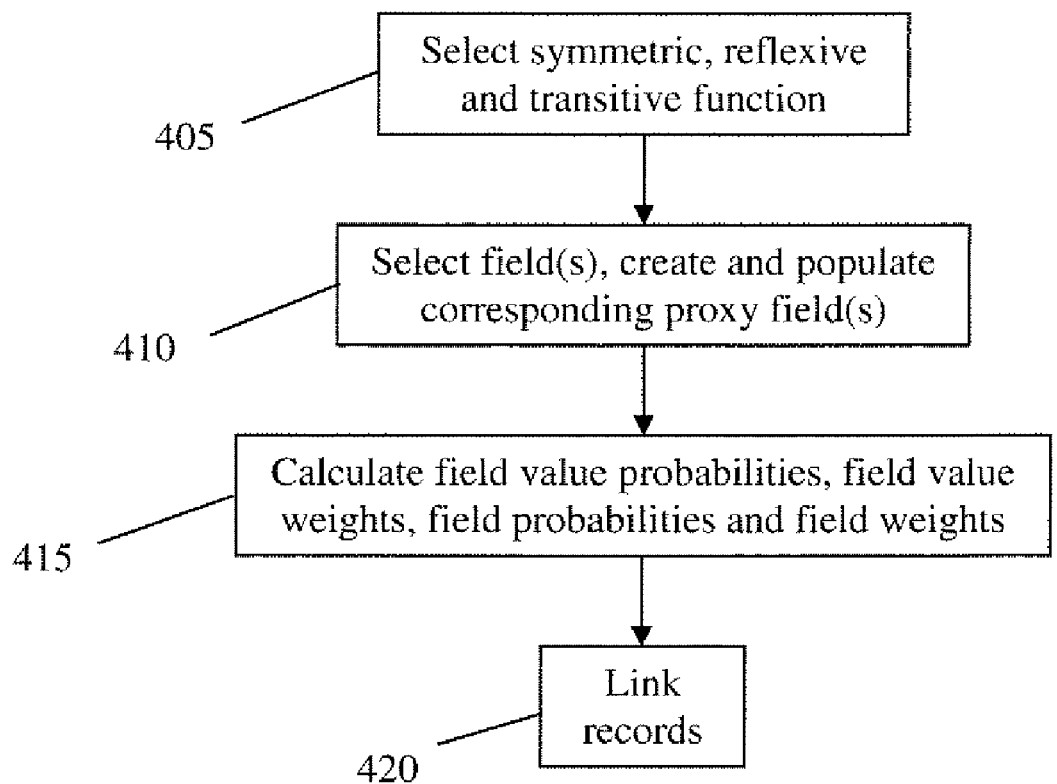
FIG. 4 is a flowchart depicting an embodiment of an invention of Section IV.

FIG. 4 is a flowchart depicting an exemplary embodiment of an invention of Section IV. The present embodiment may be implemented in conjunction with an embodiment of the techniques of Section II. For purposes of illustration rather than limitation, the present embodiment will be discussed in reference to records $r_1$ and $r_2$ reflected in the table below:

| Record | First Name | Last Name | SSN |
|---|---|---|---|
| $r_1$ | John | Smiff | 999-99-9999 |
| $r_2$ | Jon | Smith | 999-99-9999 |

At block 405, a transitive, symmetric and reflexive function is selected. For purposes of illustration rather than limitation, the SOUNDEX function will be used in the present embodiment.

At block 410, one or more fields are selected, and corresponding proxy field(s) are created and populated. Thus, one or more fields in which near matches will be analyzed are chosen. Examples of such fields include First Name, Last Name, Social Security Number, and others. For purposes of illustration rather than limitation, the present embodiment will be discussed in reference to the First Name and Last Name fields as the selected fields, with the understanding that the invention is not limited to such fields.

Once the fields are selected, the exemplary embodiment adds a proxy field to each record for each selected field (block 410). In the example under discussion, the records may appear as:

| Record | First Name | Last Name | SSN | Proxy First Name | Proxy Last Name |
|---|---|---|---|---|---|
| $r_1$ | John | Smiff | 999-99-9999 | | |
| $r_2$ | Jon | Smith | 999-99-9999 | | |

The exemplary embodiment proceeds by determining codes for each field value in each selected field and inserting such codes into the proxy fields. Now, the SOUNDEX code for "John" may be J500, the SOUNDEX code for "Smiff" may be S510, the SOUNDEX code for "Jon" may be J500, and the SOUNDEX code for "Smith" may be S530. Thus, the embodiment proceeds by entering such codes as field values in the appropriate proxy fields as follows:

| Record | First Name | Last Name | SSN | Proxy First Name | Proxy Last Name |
|---|---|---|---|---|---|
| $r_1$ | John | Smiff | 999-99-9999 | J500 | S510 |
| $r_2$ | Jon | Smith | 999-99-9999 | J500 | S530 |

At block 415, match probabilities and match weights are calculated. Thus, once the codes are entered in the associated proxy fields, the embodiment may proceed by implementing a technique of Section II to determine match probabilities and match weights for each field or field value. That is, once proxy fields and the appropriate field values are added to the records, the embodiment may proceed as discussed above in Section II in order to determine one or more of field value probabilities, field probabilities, match value weights and match weights. That is, an iteration such as that discussed in Section II may be performed on the altered records in order to compute match probabilities and match weights. For computing match weights and match probabilities, the iteration essentially treats the proxy fields and their included field values the same as if such fields and field values were originally in the records instead of having been added. The iteration may include one or more of the steps set forth in Section II, such as calculating field value probabilities and field value weights (based on a number of records), calculating field probabilities and field weights (based on a number of records), preliminary linking operations, initial intermediate operations, calculating field value probabilities and field value weights (based on a number of entity representations), calculating field probabilities and field weights (based on a number of entity representations), linking operations and intermediate operations. The computed match weights may be used in making linking decisions as discussed in Section I.

The field value probabilities and field value weights may be stored for later use. For example, these parameters may be stored in a lookup table, alone or together with other relevant parameters, such as the proxy field values. Alternately, or in addition, these parameters may be stored in one or more fields added to each record. By way of non-limiting example, field value weights may be stored in fields added to records in which the associated field values appear. The parameters may be updated with each iteration by replacing parameters from prior iterations or by adding newly generated parameters. In some embodiments, one or both of field value probabilities and field value weights may be stored in fields appended to records, while one or both of field probabilities and field weights may be stored in one or more lookup tables.

At block 420, the calculated match weights and match probabilities may be used to link records as discussed elsewhere herein. For example, the proxy fields may be accounted for in a matching formula as follows. Equations 3-5 provide match scores for two records as weighted sums. As discussed in Section I, if a match score exceeds a threshold, the records under consideration may be linked. The weighted sums in the matching formulas may generally weight probabilities of field value matches by field value or field weights associated with the field value or field, respectively. This process may be used for the proxy fields as disclosed in this section. That is, the proxy fields may be treated as any other field in determining a match between records.

Alternately, the proxy fields may be accounted for in a matching formula as follows. In comparing two records, the field values in the original fields may be compared prior to comparing the field values in the proxy fields. If the field values in an original field are identical between the records, then the proxy field values may not be compared, and a term for the proxy field may be omitted from the matching formula. That is, the matching formula may include a term $p_i w_i$ corresponding to the original field, and omit a term $p_j w_j$ that corresponds to the proxy field. On the other hand, in comparing the two records, if the field values in an original field are not identical, then the proxy field values may be compared. If the proxy field values match, then a term $w_j p_j$ for the proxy field may be included in the matching formula in place of the term for the original field. If the field values in the proxy field match, the associated probability $p_j$ may be set to one (1) and the weight we may be a field weight or field value weight corresponding to the proxy field or the field value therein, respectively. Alternate techniques for setting the value of $p_j$ are found in the First Generation Patents And Applications.

Another alternate technique for accounting for proxy fields in a matching formula is discussed presently. As above, this discussion is relative to two records for which a linking decision is to be made. Assume for purposes of illustration that the original field has index i and that the associated proxy field has index j. Then, instead of including one or both terms $p_i w_i$ and $p_j w_j$ in the matching formula, the following term may be used instead: $p_i w_i + p_j (1-p_i) w_j$. Note that this term is equal to $w_i p_i$ whenever $p_i$ equals one (e.g., whenever field values in the original field match). Note further that this term is equal to $w_j p_j$ whenever $p_i$ equals zero (e.g., if field values in the original field do not match and the embodiment in which the matching formula is implemented sets $p_i$ equal to zero in such instances). In embodiments where one or both terms $p_i$ and $p_j$ are allowed to have values between zero and one (e.g., as set forth in the First Generation Patents And Applications) the term essentially blends $w_i p_i$ with a portion of $w_j p_j$.

According to an exemplary embodiment of a technique of this section, a method of utilizing a record matching formula weight, where the record matching formula weight is specific to a particular field value associated with a particular field, the method for use with a database comprising a plurality of records, is presented. The embodiment includes selecting a symmetric, reflexive and transitive function, whereby applying the function to field values appearing in the particular field in the plurality of records defines a first partition of the plurality of records, where the first partition includes a first plurality of first parts, each of the first parts being associated with at least one field value appearing in the particular field. The embodiment includes calculating a first probability that a record in the database is in a first part associated with the particular field value. The embodiment includes linking records in the database based at least in part on the first probability, whereby a plurality of entity representations are generated, whereby applying the function to field values appearing in the particular field in the plurality of entity representations defines a second partition of the plurality of entity representations, where the second partition includes a second plurality of second parts, each of the second parts associated with at least one field value appearing in the particular field. The embodiment includes calculating a second probability that an entity representation in the database is in a second part associated with the particular field value. The embodiment includes linking entity representations in the database based at least in part on the second probability. The embodiment includes allowing a user to retrieve information from at least one record in the database.

According to an exemplary embodiment of a technique of this section, a method of utilizing a record matching formula weight, where the record matching formula weight is specific to a particular field and independent of any particular field value in the particular field, the method for use with a database comprising a plurality of records, is presented. The embodiment includes selecting a symmetric, reflexive and transitive function, whereby applying the function to field values appearing in the particular field in the plurality of records defines a first partition of the plurality of records, where the first partition includes a first plurality of first parts, where each of the first parts is associated with at least one field value appearing in the particular field. The embodiment includes calculating a plurality of first probabilities, each of the plurality of first probabilities reflecting a likelihood that a record in the database is in a different first part. The embodiment includes calculating a first weight comprising a weighted sum of the first probabilities and linking records in the database based at least in part on the first weight, whereby a plurality of entity representations are generated, whereby applying the function to field values appearing in the particular field in the plurality of entity representations defines a second partition of the plurality of entity representations, where the second partition includes a second plurality of second parts, each of the second parts associated with at least one field value appearing in the particular field. The embodiment includes calculating a second plurality of probabilities, each of the plurality of first probabilities reflecting a likelihood that a record in the database is in a different first part. The embodiment includes calculating a second weight comprising a weighted sum of the second probabilities. The embodiment includes linking entity representations in the database based at least in part on the second weight. The embodiment includes allowing a user to retrieve information from at least one record in the database.

The above described embodiments are exemplary only and are not intended to limit the scope of the inventions disclosed herein.

V. Statistical Record Linkage Calibration for Interdependent Fields Without the Need for Human Interaction Embodiments of this technique may be implemented in their own iterative process or incorporated into an iterative process as described above in Section II.

Some embodiments account for the phenomenon of interdependent fields. For example, certain field values are, at least to some extent, correlated with other field values. The correlation may be positive or negative. Thus, certain field values may tend to imply or suppress other field values. Thus, for example, a Gender field value of Male is likely to have a weak positive correlation with a First Name field value of "John"; whereas the same field value is likely to have a weak negative correlation with a First Name field value of "Mary". As another example, a City field value of "Boca Raton" may have essentially the same significance as a City field value of "Boca Raton" coupled with a State field value of "Florida," whereas a City field value of "Jacksonville" alone may be much less significant (e.g., by a factor of ten) in comparison with a City field value of "Jacksonville" coupled with a State field value of "Florida." Thus, certain fields (and field values) may be interdependent, and certain embodiments of the present technique account for such interdependence. Such embodiments may generally produce superior results in comparison with techniques that assume that fields are independent.

Certain embodiments of the present invention provide a separate, individual statistical significance to a combination of fields. The combination may be fields that are statistically correlated or anti-correlated.

In some embodiments, the techniques of this section provide one or more weights, which may be used in a record matching formula (e.g., Equations 3-5) to scale probabilities (e.g., $p_f$ or $p_i$) that two records contain a matching combination of particular field values in a plurality of fields.

In some embodiments, one or more supplemental fields may be added to each record. Each such supplemental field may account for the contents of a plurality of other fields. Each supplemental field allows certain embodiments of the present invention to accord a single statistical significance to a combination of fields. Moreover, each field value, whether occurring in an original or supplemental field, may have associated to it a field value probability, which may be converted to a field value weight and used in making linking decisions as discussed above in Section II. That is, an iteration, such as that discussed above in Section II, may be performed on the altered records in order to compute match probabilities and match weights for the field values in the supplemental fields. Thus, the significance of an improbable combination of field values may be determined to be high, whereas the significance of a probable combination of field values may be determined to be low.

Note that more than one such supplemental field may be added. Thus, by way of non-limiting example, each record may be appended with an additional field that contains as its field value an amalgamation of First Name, Middle Name and Last Name field values. Continuing the example, each record may further be appended with another field that contains as its field value an amalgamation of Last Name, City and Street Address field values. An arbitrary number of additional fields may be appended to the records in this manner. The amalgamation may be accomplished using any of a variety of techniques, such as, by way of non-limiting example, concatenation, linked list, use of a hash function, use of separator characters, etc.

Thus, certain embodiments of the present invention associate to each of a plurality of select fields a supplemental field. Each supplemental field may each contain a field value derived from a plurality of field values. Moreover, each supplemental field may have associated to it a field value probability, which indicates a probability that a record (respectively, entity representation) chosen at random contains (respectively, contains a record that contains) the associated field value in the associated field. Each field value probability may be converted to a field value weight associated with the relevant supplemental field. Such field value weights may be used in making linking decisions as discussed above in Section II.

Certain embodiments associate a probability to each supplemental field, independent of any particular field value. For a given supplemental field, the associated field probability may be computed as a weighted average of the probabilities associated with each individual field value that may occur in the given supplemental field. Moreover, the field probabilities calculated by certain embodiments may be converted to field weights and used in making record linking decisions. Such decisions may take into account some or all of the fields common to the records. In this technique, knowledge of the common field values may not be required. Further, this technique produces accurate results for any two records, regardless as to the contents of their fields.

The field value probabilities and field value weights may be stored for later use. For example, these parameters may be stored in a lookup table, alone or together with other relevant parameters. Alternately, or in addition, these parameters may be stored in one or more fields added to each record. By way of non-limiting example, field value weights may be stored in fields added to records in which the associated field values appear. The parameters may be updated with each iteration by replacing parameters from prior iterations or by adding newly generated parameters. In some embodiments, one or both of field value probabilities and field value weights may be stored in fields appended to records, while one or both of field probabilities and field weights may be stored in one or more lookup tables.

The supplemental fields may be accounted for in a matching formula as follows. Equations 3-5 provide match scores for two records as weighted sums. As discussed in Section I, if a match score exceeds a threshold (e.g., as computed using Equation 6), the records under consideration may be linked. The weighted sums in the matching formulas may generally weight probabilities of field value matches by field value or field weights associated with the field value or field, respectively. This process may be used for the supplemental fields as disclosed in this section. That is, the supplemental fields may be treated as any other field in determining a match between records.

Alternately, the supplemental fields may be accounted for in a matching formula as follows. In comparing two records, the field values in the supplemental fields may be compared prior to comparing the field values in the original fields. If, on the one hand, the field values in a supplemental field are identical between the records, then a term for the supplemental field may replace the terms for the constituent fields in the matching formula. That is, the matching formula may include a term $p_i w_i$ corresponding to the supplemental field, and omit terms $p_k w_k, \ldots, p_l w_l$ that correspond to the fields that make up the supplemental fields. If the field values in the supplemental field match, the term $p_i$ may be set to one (1) and the weight $w_i$ may be a field weight or field value weight corresponding to the supplemental field or the field value therein, respectively. If, on the other hand, in comparing the two records the field values in a supplemental field are not identical, then a term for the supplemental field may be omitted from the matching formula, and terms for the constituent field may be included instead. In that instance, the terms for the constituent fields (referred to here as $p_k w_k, \ldots, p_l w_l$) may each be scaled by multiplication by a supplemental weight as follows. Such a supplemental weight may be computed as a match weight for the supplemental field divided by the sum of match weights for the constituent fields. Such match weights may be field weights or field value weights. Thus, the supplemental weight may be computed as, by way of non-limiting example:

$$W = \frac{w_i}{w_k + \ldots + w_l}.$$ Equation 27

In Equation 27, the term $w_i$ represents a field value weight for the field value in the supplemental field, and the terms $w_k, \ldots, w_l$ represent the field value weights for the field values in the constituent fields. (Alternately, the term $w_i$ may represent a field weight for the supplemental field, and the terms $w_k, \ldots, w_l$ may represent the field weights for the constituent fields.) Note that W as set forth above may be a measure of interdependence of the constituent field values (respectively, fields). That is, if the significance of the supplemental field value (respectively, field) exceeds the sums of the significances of the individual constituent field values (respectively, fields), then W will be greater than one. This situation may be expected to happen for the example provided above of a combination of field values Gender=Male and First Name=Mary. Otherwise, W may be less than one, indicating that the constituent field values may be at least weakly correlated. The matching formula terms for the constituent fields may be modified in the instance where there is not an exact match in supplemental field values to appear as $Wp_k w_k, \ldots, Wp_l w_l$, where the terms may be as defined above in relation to Equation 27. That is, if there is no match in a supplemental field, the matching formula term for the supplemental field may be omitted in favor of terms for the constituent fields weighted by a term as set forth above in Equation 27, which may be a measure of correlation between the constituent field values or fields. Note that W may be specific to each record, and each W may be stored in one or both of a lookup table and in a field appended to the associated record.

An alternate technique for accounting for supplemental fields in a matching formula is discussed presently. As above, this discussion is relative to two records for which a linking decision is to be made. Assume for purposes of illustration that the supplemental field has index i and that the associated constituent fields has indexes j, . . . , l. Then instead of including some or all of terms $p_i w_i, p_k w_k, \ldots, p_l w_l$ in the matching formula, the following term may be substituted: $p_i w_i + (1-p_i)(Wp_k w_k + \ldots + Wp_l w_l)$. Note that this term is equal to $w_i p_i$ whenever $p_i$ equals one (e.g., whenever field values in the original field match). Note further that this term is equal to $Wp_k w_k + \ldots + Wp_l w_l$ whenever $p_i$ equals zero (e.g., if field values in the supplemental field do not match and the embodiment in which the matching formula is implemented sets $p_i$ equal to zero in such instances). In embodiments where some or all terms $p_i, p_k, \ldots, p_l$ may be allowed to have values between zero and one (e.g., as set forth in the First Generation Patents And Applications) the term essentially blends $w_i p_i$ with a portion of $Wp_k w_k + \ldots + Wp_l w_l$.

In some embodiments, in the event of a non-match in a supplemental field, techniques that handle near matches, for example, the techniques set forth in Sections III, IV or X, may be applied to the supplemental field.

Figure 5:
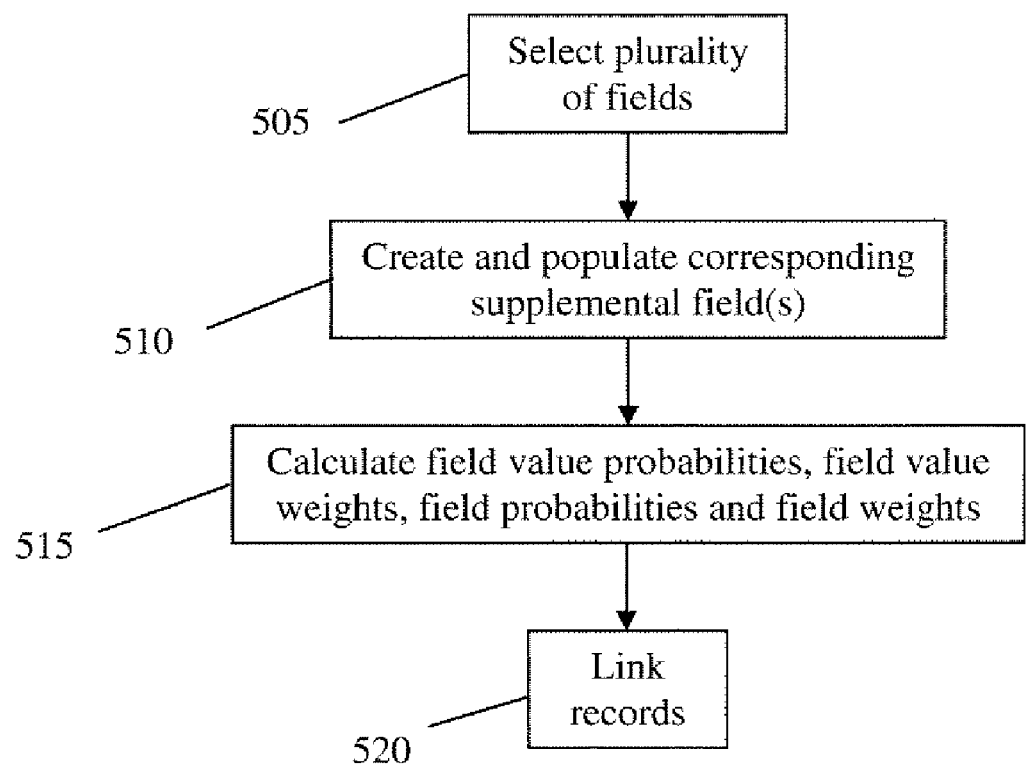
FIG. 5 is a flowchart depicting an embodiment of an invention of Section V.

FIG. 5 is a flowchart depicting an exemplary embodiment of an invention of Section V. In general, embodiments according to this section may be implemented in conjunction with an embodiment of the techniques of Section II.

For purposes of illustration rather than limitation, the present embodiment will be discussed in reference to the record reflected in the table below:

| First Name | Middle Name | Last Name | SSN | Street Address | City |
|---|---|---|---|---|---|
| John | Sue | Smith | 999-99-9999 | 321 Fake Street | Anytown |

At block 505, the exemplary embodiment commences by choosing a plurality of fields to amalgamate into a supplemental field. In this embodiment, this step may be done twice, however, this step may be performed any number of times, not limited to two.

At block 510, one or more corresponding supplemental fields are created and populated. For purposes of illustration rather than limitation, a first supplemental field will be added with the First Name, Middle Name and Last Name fields as the selected fields, and second supplement field will be added with the Last Name and Street Address fields as the selected fields. The resulting record with the two added supplemental fields may appear as follows:

| First Name | Middle Name | Last Name | SSN | Street Address | City | Supplemental Field 1 | Supplemental Field 2 |
|---|---|---|---|---|---|---|---|
| Jon | Sue | Smith | 999-99-9999 | 321 Fake Street | Anytown | Jon/Sue/Smith | Smith/321FakeStreet |

At block 515, match probabilities and match weights are calculated. The embodiment may proceed by implementing an iterative technique of Section II to determine match probabilities and match weights for each field or field value. That is, once supplemental fields and the appropriate field values are added to the records, the embodiment may proceed with an iteration as discussed above in Section II in order to determine one or more of field value probabilities, field probabilities, match value weights and match weights. For computing match weights and match probabilities, the iteration essentially treats the supplemental fields and their included field values the same as if such fields and field values were originally in the records instead of having been added. The iteration may include one or more of the steps set forth in Section II, such as calculating field value probabilities and field value weights (based on a number of records), calculating field probabilities and field weights (based on a number of records), preliminary linking operations, initial intermediate operations, calculating field value probabilities and field value weights (based on a number of entity representations), calculating field probabilities and field weights (based on a number of entity representations), linking operations and intermediate operations. The weights computed by the iteration may be used in making linking decisions as discussed in Section I.

More particularly, an iteration that includes a technique of this section may proceed as follows. The first iteration may take place once one or more additional fields are added to each record and populated with the appropriate field values as discussed above. After each iteration, a propagation process may occur as discussed in Section II, for example. After such propagation process, the field values of the one or more supplemental fields and their associated match weights may be updated. This supplemental field updating after a propagation process serves to ensure that the supplemental fields contain information that has been propagated. The propagation and supplemental field updating may occur after each iteration.

At block 520, the calculated match weights and match probabilities may be used to link records as discussed elsewhere herein or as discussed presently. For example, between each iteration, the linking process may be proceed as follows. Note that such linking process may utilize a technique of comparing field values between two records as discussed in detail above in Section I (e.g., in reference to Equations 3-6). The comparison of two records that have been modified as illustrated in the non-limiting example above by adding two supplemental fields may initially compare field values in the supplemental fields. If the field values in the supplemental fields of two records exactly match, then the comparison may omit comparing the individual field values that may be accounted for in the supplemental fields.

By way of non-limiting example, consider a comparison (for the purpose of determining whether to link records as discussed above in Section I) of the exemplary above record with another record that has also been modified with the addition of two supplemental fields. Such a comparison may proceed by comparing the field values of the supplemental fields prior to comparing the contents of the fields that make up the contents of the supplemental fields. Suppose that, in this exemplary comparison, there is an exact match in Supplemental Field 1, but not in Supplemental Field 2. In such an instance, the comparison may proceed by accounting for the match in Supplemental Field 1 in, for example, Equation 5. More particularly, because the contents of Supplemental Field 1 match, the associated probability $p_i$ may be set equal to one, and the field value weight $w_i$ associated with the Supplemental Field 1 field value may be utilized in the weighted sum of Equation 5, where the subscript i in this sentence is the index for Supplemental Field 1. (The field weight associated with Supplemental Field 1 may be used in the alternative.) That is, the term $p_i w_i$ for the supplemental field may be included in a matching formula, and the terms for the constituent fields may be omitted. With Supplemental Field 1 already accounting for the First Name, Middle Name and Last Name fields, terms for these fields may be omitted from the weighted sum of the matching formula. Thus, the weighted sum of, for example, Equation 5, may omit the indexes for the First Name, Middle Name and Last Name fields from the set of indexes over which to sum, as the field values in these fields have already been accounted for in Supplemental Field 1.

Turning now to Supplemental Field 2, because there is no exact match in Supplemental Field 2 in this example, a term for this field may be omitted from the weighted sum of the relevant matching formula (for example, Equation 5). Note that Supplemental Field 2 includes field values from the Last Name field and the Street Address field. As discussed above, in this example, while the Last Name field is accounted for in the matching formula by the term corresponding to Supplemental Field 1, the Street Address field is not. However, the Street Address field may be accounted for in a matching formula separately. That is, a term for the Street Address field may be included in, for example, Equation 5. The Street Address term may include a product of a probability $p_j$ of a match and a match weight $w_j$, where j is an index corresponding to the Street Address field. The match weight $w_j$ may be a field value weight or a field weight. The Street Address term may further include an additional weight W, which adjusts for the amount of interdependence among field values (respectively, fields).

In short, because the field values in Supplemental Field 1 are assumed to be identical in this example, a matching formula may omit terms for the constituent fields of Supplemental Field 1, while including a term for Supplemental Field 1 itself. The term for Supplemental Field 1 may include a probability $p_i$ of a match (which may be set equal to one because of the assumed exact match in this example) multiplied by the field or field value weight for Supplemental Field 1. Because the field values in Supplemental Field 2 are assumed not to be identical in this example, a matching formula may omit a term for Supplemental Field 2, while including terms for the constituent fields that have not otherwise been accounted for (e.g., in the term for Supplemental Field 1), weighted by a term that adjusts for the amount of correlation among the constituent fields.

According to an exemplary embodiment of a technique of this section, a method of utilizing a record matching formula weight, where the record matching formula weight is specific to a particular plurality of field values, is presented. The embodiment includes selecting a plurality of fields and adding a supplemental field to each of a plurality of records. The method includes populating the supplemental field, for each of the plurality of records, with a field value representative of field values from each of the plurality of fields in the record, whereby the supplemental field of at least one record contains a particular field value representative of the particular plurality of field values. The embodiment includes calculating a first probability that a record in the database includes the particular field value in a supplemental field of the record. The embodiment includes linking records in the database based at least in part on the first probability, whereby a plurality of entity representations are generated. The embodiment includes calculating a second probability that an entity representation in the database includes the particular field value in a supplemental field of a record linked to the entity representation. The embodiment includes linking entity representations in the database based at least in part on the second probability. The embodiment includes allowing a user to retrieve information from at least one record in the database.

According to an exemplary embodiment of a technique of this section, a method of utilizing a record matching formula weight, where the record matching formula weight is specific to a plurality of fields and independent of any particular field value in the particular plurality of fields, is presented. The embodiment includes selecting a plurality of fields and adding a supplemental field to each of a plurality of records. The embodiment includes populating the supplemental field, for each of the plurality of records, with a field value representative of field values from each of the plurality of fields in the record. The embodiment includes calculating a plurality of first probabilities, each of the plurality of first probabilities reflecting a likelihood that a record in the database includes a particular field value in a supplemental field. The embodiment includes calculating a first weight comprising a weighted sum of the first probabilities. The embodiment includes linking records in the database based at least in part on the first weight, whereby a plurality of entity representations are generated. The embodiment includes calculating a second plurality of probabilities, each of the second plurality of probabilities reflecting a likelihood that an entity representation in the database includes a particular field value in a supplemental field. The embodiment includes calculating a second weight comprising a weighted sum of the second probabilities. The embodiment includes linking entity representations in the database based at least in part on the second weight. The embodiment includes allowing a user to retrieve information from at least one record in the database.

The above described embodiments are exemplary only and are not intended to limit the scope of the inventions disclosed herein.

VI. Automated Detection of Null Field Values and Effectively Null Field Values

In some embodiments, the technique of this section provides a numerical critical frequency associated with a field that may be used to detect field values that may be treated as null. That is, for a field, certain embodiments provide a critical frequency such that a field value associated with the field that occurs more than (or, in some embodiments, equal to) the critical frequency may be treated as a null field value, and a field value associated with the field that occurs less than (or, in other embodiments equal to) the critical frequency may be treated as a non-null field value. In such embodiments, a separate critical frequency may be calculated for each field. For example, a critical frequency may be calculated for and/or associated with a Last Name field, while a separate critical frequency may be calculated for and/or associated with a Gender field.

Note that embodiments according to this section may be incorporated into any of the embodiments described in any section herein.

Figure 6A:
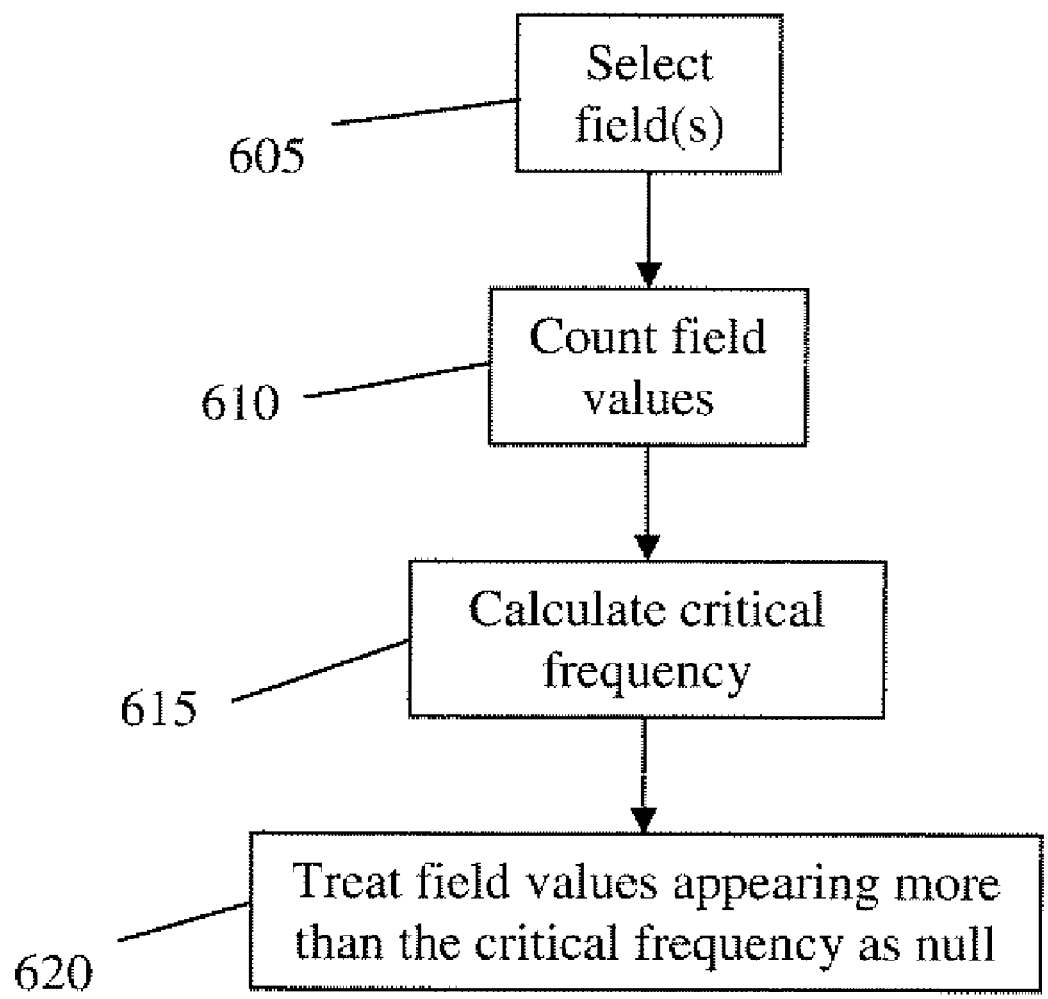
FIG. 6A is a flowchart depicting an embodiment of an invention of Section VI.

FIG. 6A is a flowchart depicting an exemplary embodiment according to this section. At block 605, fields to which the present technique are to be applied are selected.

At block 610, the number of different field values present in records in the database are counted for each selected field. In general, the technique of calculating a critical frequency for one or more fields may begin by counting, for each such field, the number of records that include each field value. That is, for every field value that appears in a given field in any record in the database, the technique of calculating a critical frequency may begin by determining the number of records in the database that include each field value in the associated field. These counts may be used to form a separate histogram for each field. As described further below, such histograms may then be used to determine the critical frequency.

At block 615, a critical frequency is calculated for each selected field. In general, a critical frequency may be calculated using data generated from a pre-processing, step (e.g., pre-linking step, etc.) that may be independent of the exemplary embodiment of the invention described in Section I. In some embodiments, a critical frequency may be calculated using data generated from a processing step (e.g., linking step, etc.) that may be associated with an embodiment of the invention described in Section II. In such embodiments, the technique of calculating a critical frequency for each field of a database may begin by accessing the counts determined in the first iteration of the technique described in Section II. These counts may be used to form a separate histogram for each field. As described further below, such histograms may then be used to determine the critical frequency.

Figure 6B:
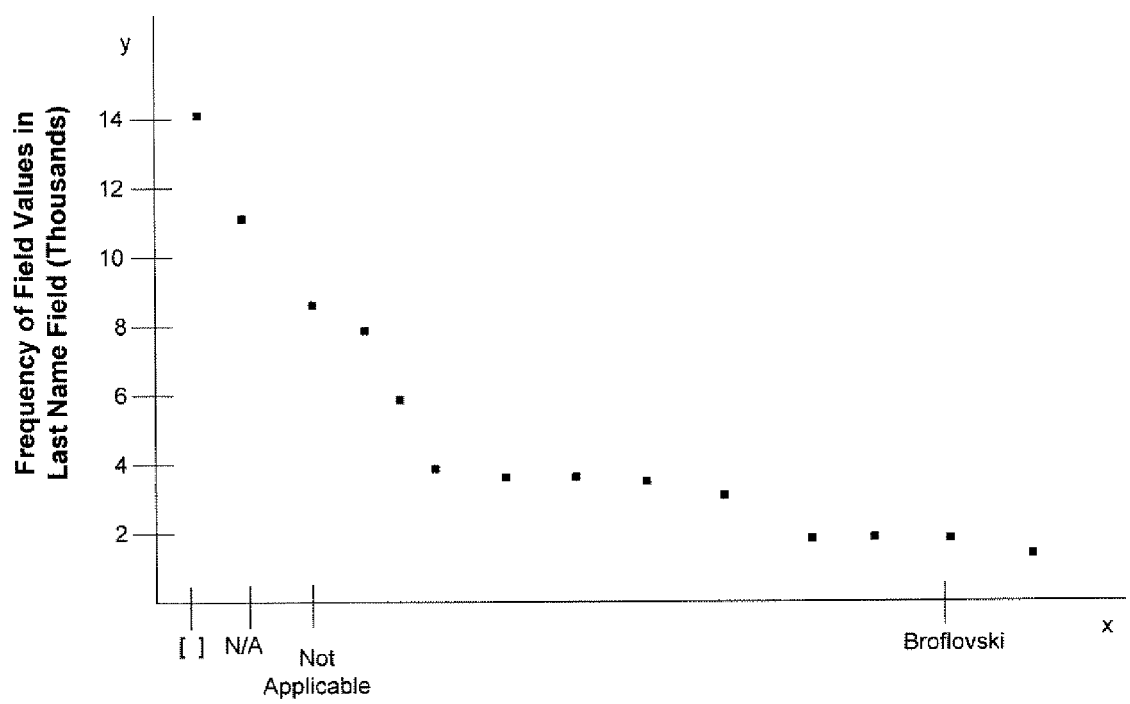
FIG. 6B is an exemplary histogram an embodiment of an invention of Section VI.

FIG. 6B is an exemplary histogram for a Last Name field. Note that the x-axis corresponds to the various different last names present in the Last Name field in any record in the database, whereas the y-axis corresponds to the count of such last names. Note further that the field value counts may be arranged in decreasing order. Thus, the field values having the highest frequencies appear toward the left, while the field values having the smallest frequencies appear toward the right. For example, for the Last Name field, the "blank" field value (denoted in the chart above as "[ ]"), "N/A" and "not applicable" have the highest frequency counts and therefore appear toward the left. Conversely, for the Last Name field, uncommon field values such as "Broflovski" may be associated with the smallest frequency values, and therefore may appear toward the right-hand side.

In some embodiments, the technique of calculating a critical frequency for each field of a database may continue by calculating the difference between adjacent frequencies. More particularly, if the function defined by the above histogram is denoted as g, then the difference in value between adjacent frequency values may be represented as, by way of non-limiting example:

$$f(x)=g(x)-g(x+1).$$ Equation 28

In the above frequency value difference formula, f represents a function of the frequency value differences calculated using the function g defined by the histogram, where g(v) represents a frequency value associated with the v-th field value. For example, f may be calculated using Equation 28 based on the exemplary Last Name field data displayed in the above histogram. More particularly, f may be calculated as, by way of non-limiting example:

In some embodiments, the critical frequency may be determined to be the point at which the derivative of f first equals zero. In some embodiments, the critical frequency may be determined to be the point at which the derivative of f decreases below a threshold. Such a threshold may be, by way of non-limiting example, 10, 20, 50, 100, 200, 500, 1000, 2000, 5000 or 10,000. In some embodiments, the critical frequency may be determined by transforming f into a continuous function using, e.g., a least-squares approach, and then calculating the derivative of the continuous function and detecting where it changes signs as explained above.

At block 620, field values that appear more than the critical frequency are considered to be null. Field values that have been determined to be null or equivalent to null may be replaced by a special character, a canonical null value, deleted from the field, or accounted for using another technique such as recordation of each instance of such a value in a lookup table. In some embodiments, the field values are left unchanged, but are treated as null in any technique presented herein that distinguishes between null values and non-null values.

The above described embodiments are exemplary only and are not intended to limit the scope of the inventions disclosed herein.

| | | | | | | | v | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| g(v) | 14 | 11 | 8.5 | 8.0 | 6.0 | 4.0 | 3.7 | 3.6 | 3.5 | 3.0 | 2.0 | 2.0 | 2.0 | 1.8 |
| g(v + 1) | 11 | 8.5 | 8.0 | 6.0 | 4.0 | 3.7 | 3.6 | 3.5 | 3.0 | 2.0 | 2.0 | 2.0 | 1.8 | 1.7 |
| f(v) | 3.0 | 2.5 | 0.5 | 2.0 | 2.0 | 0.30 | 0.10 | 0.10 | 0.50 | 1.0 | 0.00 | 0.00 | 0.20 | 0.10 |

Figure 6C:
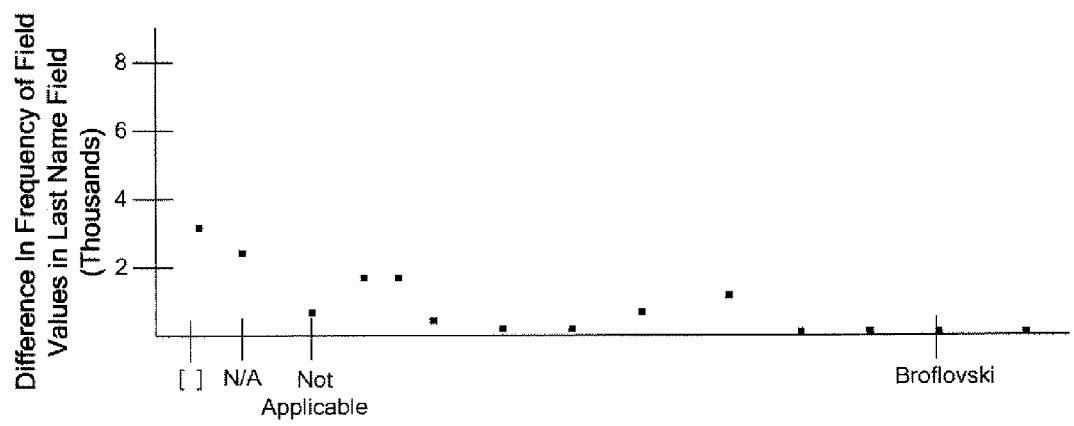
FIG. 6C is an exemplary graph according to an embodiment of an invention of Section VI.

FIG. 6C is an exemplary graph of f. The critical frequency above which field values may be considered as null may be calculated using f. In some embodiments, the critical frequency may be the first point at which the derivative (e.g., calculus derivative) of f changes from negative to positive. More generally, the critical frequency may be the point at which the derivative of f changes from a first sign (e.g., negative, positive) to a second sign (e.g., positive, negative), where the second sign is different from the first sign. As is known in the art, the point at which the derivative of f changes from a first sign to a second sign may be determined by observing the point at which f changes from an increasing function to a decreasing function or the point at which f changes from a decreasing function to an increasing function. By way of non-limiting, example, the point at which f changes from a decreasing function to an increasing function is illustrated in FIG. 6D.

Figure 6D:
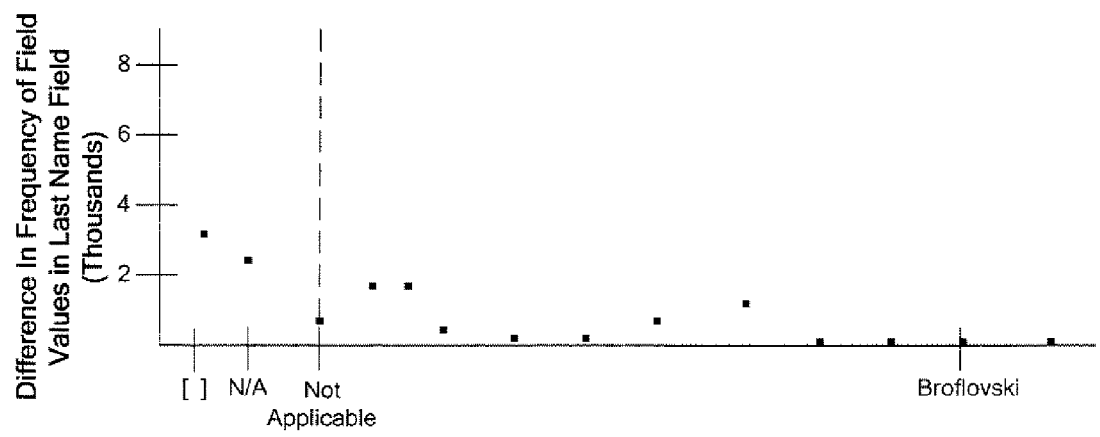
FIG. 6D is an exemplary graph according to an embodiment of an invention of Section VI.

In FIG. 6D, the dotted line depicts the point at which the f first changes from a decreasing function to an increasing function (accordingly, the point at which the derivative of f changes sign from negative to positive). Any field value whose frequency is greater than or equal to the frequency corresponding to that point may be considered as a null field value. Any field value occurring less often than the critical frequency may be treated as a non-null field value. Note that, as revealed by an inspection of the graph of g far above, the critical frequency associated with the Last Name field values is approximately 8,200. Accordingly, for this embodiment, all field values appearing 8,200 times or more may be treated as null field values. All field values appearing less than 8,200 times in any record in a database may be treated as non-null field values.

VII. Adaptive Clustering of Records and Entity Representations

Embodiments of this technique may be implemented in their own iterative process, incorporated into a non-iterative process, or incorporated into an iterative process such as described above in Section II.

Figure 7:
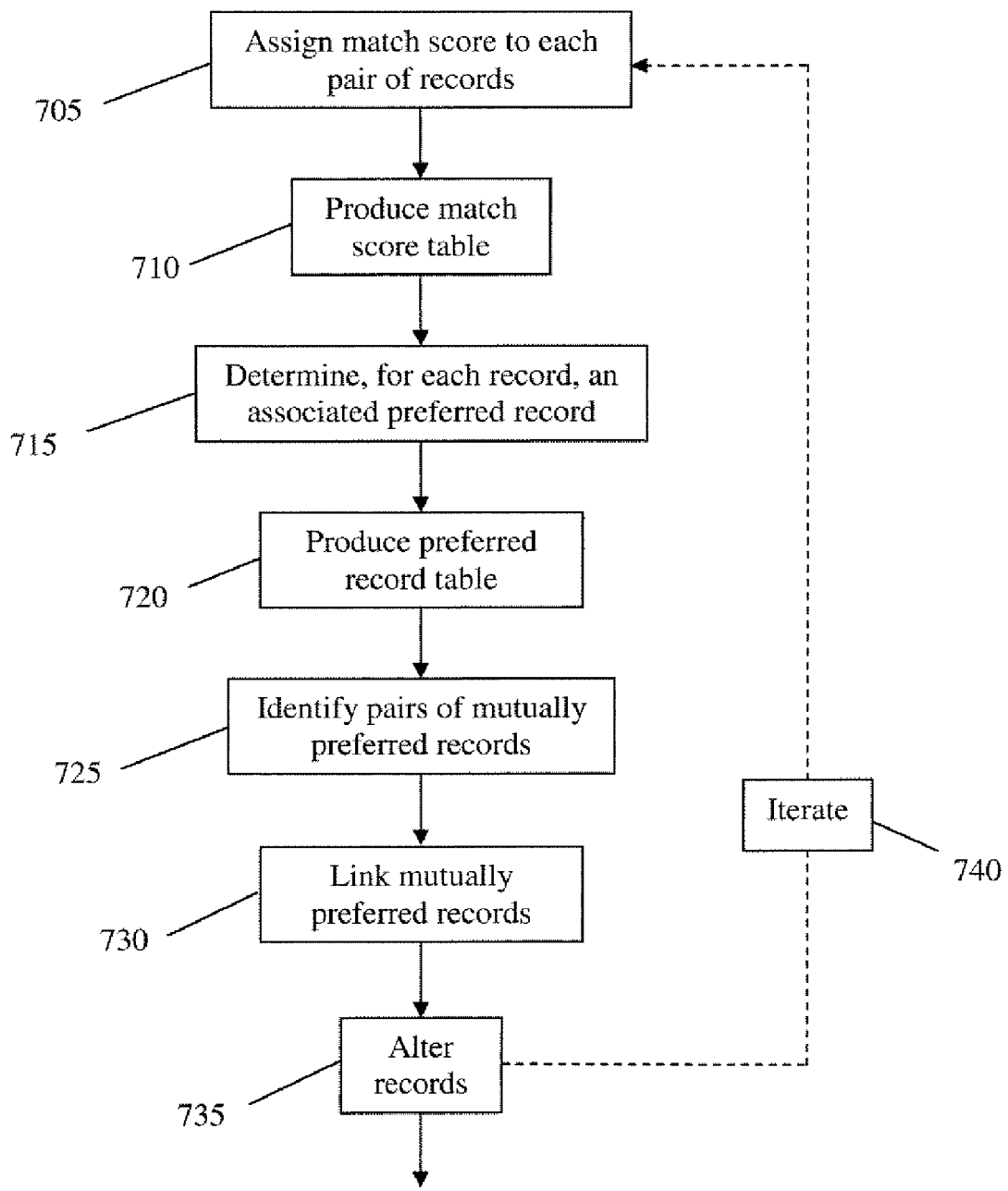
FIG. 7 is a flowchart depicting an embodiment of an invention of Section VII.

FIG. 7 is a flow diagram depicting an exemplary technique for identifying and linking related records in accordance with at least one embodiment of the invention of this section. The technique of FIG. 7 may be used as a transition process, which may be implemented at, for example, step 412 of FIG. 4 in the First Generation Patents And Applications or any of blocks 130, 215, 220, 235, 240, 250, 315, 320, 335, 340, 350, 420 and 520 of the present disclosure. More generally, the technique of FIG. 7 may be utilized during a link phase to identify indirect links between records. Once identified, such indirect links may be implemented by linking together the identified records (e.g., linking a record to an entity representation) as described elsewhere herein. In general, an embodiment of the invention of this section may be implemented as a transitional linking process or a record linking process in any of the iterative techniques presented in this document. The techniques of this section may be used to pick the best records to link from among a pool of records generated by any of the techniques disclosed or incorporated by reference herein. The technique of FIG. 7 may be implemented in addition to, or instead of, one or more of the techniques described above in reference to FIGS. 8-10 in the First Generation Patents And Applications.

The technique of FIG. 7 may be applied as part of an iterative process, for example, a process as described in Section II. By way of non-limiting example, a first iteration in such a process may include processing each record in the database, as at this stage, the records may not be linked at all. Thus, for the first iteration, each record may be compared with every other record for the purpose of calculating a match score for every pair of records and detecting related records. Subsequent iterations may only calculate match scores for, and link, pairs of records that are themselves linked to different entity representations. That is, iterations after the first iteration may only compare pairs of records where each record is linked to a different entity representation (or where at least one record is unlinked). Accordingly, the techniques of this section may be applied to all, or less than all, of the records present in the database. Thus, for a first iteration, every pair of records taken from the entire universe of records may be processed. In subsequent iterations, only a subset of pairs of records may be assigned match scores. By way of non-limiting example, in some embodiments, subsequent iterations may process each entity representation separately. That is, for a given entity representation, only pairs of records that include at least one record already linked to the given entity representation may be processed.

Table VII.1 below illustrates an exemplary database prior to any linking of records, where only a selected subset of data fields is represented. A first exemplary iteration is discussed presently. The term "DID" means "definitive identifier" as that term finds meaning in the First Generation Patents And Applications, however, embodiments of the present invention are not limited to utilizing DIDs for linking or identifying records or entity representations. The term "RID" means "entity reference identifier" as that term finds meaning in the First Generation Patents And Applications; however, the term "RID" may alternately mean "record identifier," an identifier associated with each record. In this example, the data fields include the first name (Fname) data field, the last name (Lname) data field, the date-of-birth (DOB) data field, the street address (Stad) data field and the SSN data field.

TABLE VII.1

| Row No. | DID | RID | Fname | Lname | DOB | Stad | SSN |
|---|---|---|---|---|---|---|---|
| 1 | 1 | 1 | Mary | James | | 7 Main St. | 123456789 |
| 2 | 2 | 2 | Mary | James | 19970606 | 7 Main St. | |
| 3 | 3 | 3 | Mary | James | 19670923 | 7 Main St. | |
| 4 | 4 | 4 | Mary | James | 19970606 | 7 Main St. | 987654321 |
| 5 | 5 | 5 | Mary | James | 19670923 | 7 Main St. | 123456789 |
| 6 | 6 | 6 | Mary | James | | 7 Main St. | |

At block 705, pairs of records may be assigned a match score. The match scores may be stored in a match table, an example of which is presented below as Table VII.2. For simplicity of discussion, the match score assigned to two records is computed here as the number of identically matching DOB, Stad and SSN field values minus the number of mismatched DOB, Stad and SSN fields, where if one record field value is blank, then the corresponding field is not taken into consideration for the match score, and where only match scores of at least one are considered. Alternately, a match score may be assigned according to any of the techniques discussed in Section I above (e.g., in relation to Equations 3-6) or in reference to FIGS. 5-7 of the First generation Patents And Applications, or according to another technique. The match score may be a probability or a different measure of likelihood that the two records are related. Table VII.2 below is a non-limiting example of a match table (e.g., as produced at block 710) containing the match scores assigned to each pair of records taken from Table VII.1. In the present exemplary embodiment, only those record pairings with an assigned match score of at least one and where the left DID is greater than the right DID may be further processed.

TABLE VII.2

| Row Number | Left DID | Right DID | Match Score | Match Type |
|---|---|---|---|---|
| 1 | 2 | 1 | 1 | Stad |
| 2 | 3 | 1 | 1 | Stad |
| 3 | 4 | 2 | 2 | Stad, DOB |
| 4 | 5 | 1 | 2 | Stad, SSN |
| 5 | 5 | 3 | 2 | Stad, DOB |
| 6 | 6 | 1 | 1 | Stad |
| 7 | 6 | 2 | 1 | Stad |
| 8 | 6 | 3 | 1 | Stad |
| 9 | 6 | 4 | 1 | Stad |
| 10 | 6 | 5 | 1 | Stad |

Row number 1 of Table VII.2 reflects that entries corresponding to DIDs of 1 and 2 in Table VII.1 share a common street address (Stad) only. Note that the entry corresponding to DID 1 in Table VII.1 has a blank DOB, while the entry corresponding to DID 2 in Table VII.1 has a blank SSN. Accordingly, for this embodiment, those fields do not count into the match score assigned to the pair of records having DIDs of 1 and 2. Row number 3 in Table VII.2 reflects that records corresponding to DIDs 4 and 2 in VII.1 share common street addresses (Stad) and DOBs.

At block 715, each record may be associated with a preferred record. Here, a preferred record associated with a given record is a record, which, when paired with the given record, has an assigned match score that is at least as great as any match score assigned to any record pair that includes the given record. That is, an associated preferred record of a given record is a record that, when paired with the given record, has a maximal assigned match score in comparison to a match score assigned to any other record pair comprising the given record. Table VII.3 below is a non-limiting example of a preferred record table (e.g., as produced at block 720). That is, Table VII.3 contains preferred records associated with each record in Table VII.1, as determined according to the matches of Table VII.2.

TABLE VII.3

| Row No. | DID | RID | DID Of Preferred Record |
|---|---|---|---|
| 1 | 1 | 1 | 5 |
| 2 | 2 | 2 | 4 |
| 3 | 3 | 3 | 5 |
| 4 | 4 | 4 | 2 |
| 5 | 5 | 5 | 1, 3 |
| 6 | 6 | 6 | 1, 2, 3, 4, 5 |

By way of example, row number 1 of Table VII.3 reflects that the record having RID 1 in Table VII.1 has as its associated preferred record the record that appears in Table VII.1 with RID 5. This is because the match score assigned to any pair of records that includes the record with RID 1 of Table VII.1 is no greater than 5. That is, 5 is the maximal match score assigned to any pair of records that includes the record with RID 1 of Table VII.1. Note that it is possible for a record to have more than one preferred record. Examples of such a situation appear in rows 5 and 6 in Table VII.3. Row 5, for example, reflects that the match score assigned to the record pair consisting of the records with RIDs of 5 and 1 is maximal, as is the match score assigned to the record pair consisting of the records with RIDs of 5 and 3. Both match scores are 2, which is greater than any other match score assigned to a record pair that includes the record with RID 5.

At least two relevant properties of records and their associated preferred records are apparent from an inspection of Table VII.3. First, as noted above, preferred records associated with a given record may not be unique. This is the case for records with RIDs of 5 and 6.

Second, if A is a preferred record for record B, it is not necessarily the case that B is a preferred record for record A. In mathematical terms, the "preferred record" relation is not symmetric. For example, as seen above, the record with RID 6 has as one of its preferred records the record with RID 2. However, the record with RID 2 does not have as its preferred record the record with RID 6. Thus, although the record with RID 6 has a preferred record with RID 2, the record with RID 2 does not have a preferred record with RID 6. In that sense, a "preferred record" may be an asymmetric, or one-way relationship.

At block 725, mutually preferred record pairs may be identified. Here, a mutually preferred record pair is a pair of records, denoted A and B, such that A is a preferred record associated with B, and B is a preferred record associated with A. Note that, as discussed above, if A is a preferred record associated with record B, then it is not necessarily the case that B is a preferred record for A. However, the mutually-preferred relationship is symmetric; that is, if A is a mutually preferred record of B, then B is a mutually preferred record of A. Table VII.4 below illustrates the mutually preferred record pairs derived from Table VII.3. Such a table may be generated by a method that implements block 720.

TABLE VII.4

| Left DID | Right DID |
|---|---|
| 4 | 2 |
| 5 | 1 |
| 5 | 3 |

As seen in Table VII.4 and by way of example, records with DIDs of 4 and 2 are mutually preferred records. This is because the record with DID 4 has as its associated preferred record the record with DID 2, and the record with DID 2 has as its associated preferred record the record with DID 4. Note further that the record with DID 6 does not appear in Table VII.4. This is because, although that record has several associated preferred records, no record has the record with DID 6 as its associated preferred record.

In some embodiments, when there are two mutually preferred pairs of records, the pair with the highest match score may be retained for further processing. Note that the record pair with DIDs of 5 and 1 have associated with them a match score of two (2), as does the record pair with DIDs of 5 and 3. In some embodiments, only mutually preferred record pairs with a left DID that is greater than the right DID and whose right DID is the least possible may be considered. This technique serves to break such ties and avoid comparison between records that are already linked. Table VII.5 illustrates this concept applied to Table VII.4.

TABLE VII.5

| Left DID | Right DID |
|---|---|
| 4 | 2 |
| 5 | 1 |

Thus, Table VII.5 omits the DID pair 5, 3 because DID 5 is already paired with DID 1, and 1 is less than 3.

At block 730, the mutually preferred record pairs may be linked together. This may be done, by way of non-limiting example, by associating the same DID with both mutually preferred records of the pair. Table VII.6 below illustrates how Table VII.1 may be altered to reflect the computations reflected in Tables 2-5.

TABLE VII.6

| Row No. | DID | RID | Fname | Lname | DOB | Stad | SSN |
|---|---|---|---|---|---|---|---|
| 1 | 1 | 1 | Mary | James |  | 7 Main St. | 123456789 |
| 2 | 2 | 2 | Mary | James | 19970606 | 7 Main St. |  |
| 3 | 3 | 3 | Mary | James | 19670923 | 7 Main St. |  |
| 4 | 2 | 4 | Mary | James | 19970606 | 7 Main St. | 987654321 |
| 5 | 1 | 5 | Mary | James | 19670923 | 7 Main St. | 123456789 |
| 6 | 6 | 6 | Mary | James |  | 7 Main St. |  |

Note that Table VII.6 reflects that the least DID may be inserted when applicable. For example, the record with RID 2 is linked to the record with RID 4. However, the least linking DID is 2; therefore, the DID associated with the record with RID 4 may be changed to the least linking DID, namely, 2. In alternate embodiments, the least DID may not be used.

At block 735, the records undergo a propagation operation. This operation may be essentially identical to the propagation operation that may occur between iterations of the techniques presented in Section II. That is, the records may be altered to include field values from mutually preferred records. Table VII.7 below illustrates such alteration applied to Table VII.6. Note that the altered field values are italicized for illustrative purposes.

TABLE VII.7

| Row No. | DID | RID | Fname | Lname | DOB | Stad | SSN |
|---|---|---|---|---|---|---|---|
| 1 | 1 | 1 | Mary | James | *19670923* | 7 Main St. | 123456789 |
| 2 | 2 | 2 | Mary | James | 19970606 | 7 Main St. | *987654321* |
| 3 | 3 | 3 | Mary | James | 19670923 | 7 Main St. | |
| 4 | 2 | 4 | Mary | James | 19970606 | 7 Main St. | 987654321 |
| 5 | 1 | 5 | Mary | James | 19670923 | 7 Main St. | 123456789 |
| 6 | 6 | 6 | Mary | James | | 7 Main St. | |

As seen in Table VII.7, field values that were absent in records that were linked at block 730 are inserted. Table VII.7 illustrates the results of a first iteration of an exemplary technique for identifying and linking related records.

At block 740, blocks 705-735 may be iterated once more so as to further identify and link related records. Iterations after the first iteration may operate only on pairs of records that are not in the same entity representation. Thus, block 705 may be repeated to assign match scores to pairs of records that are not already in the same entity representation. Table VII.8 illustrates a result of assigning match scores to the records that appear in Table VII.7. The match scores are assigned as discussed above in reference to Table VII.1, and only those record pairings with an assigned match score of at least one and where the left DID is greater than the right DID are illustrated.

TABLE VII.8

| Row Number | Left DID | Right DID | Match Score | Match Type |
|---|---|---|---|---|
| 1 | 3 | 1 | 2 | Stad, DOB |
| 2 | 6 | 1 | 1 | Stad |
| 3 | 6 | 2 | 1 | Stad |
| 4 | 6 | 3 | 1 | Stad |

Next, in repeating block 715, preferred records for each entity representation (blocks 705-730) may be calculated. The results are depicted in Table VII.9 below.

TABLE VII.9

| Row No. | DID | RID | DID Of Preferred Record |
|---|---|---|---|
| 1 | 1 | 1 | 3 |
| 2 | 2 | 2 | 6 |
| 3 | 3 | 3 | 1 |
| 4 | 6 | 6 | 1, 2, 3 |

Note that associated preferred records for records with RID of 4 and 5 have previously been calculated when these records were linked to entities with DIDs 2 and 1, respectively.

Block 725 may be repeated to identify pairs of mutually preferred records. Table VII.10 below illustrates the application of this step to the records reflected in Table VII.9.

TABLE VII.10

| Left DID | Right DID |
|---|---|
| 3 | 1 |
| 6 | 2 |

Block 735 may then be repeated to alter the records by migrating data field values between linked records. Note that the altered field values are italicized for illustrative purposes.

TABLE VII.11

| Row No. | DID | RID | Fname | Lname | DOB | Stad | SSN |
|---|---|---|---|---|---|---|---|
| 1 | 1 | 1 | Mary | James | 19670923 | 7 Main St. | 123456789 |
| 2 | 2 | 2 | Mary | James | 19970606 | 7 Main St. | 987654321 |
| 3 | 1 | 3 | Mary | James | 19670923 | 7 Main St. | *123456789* |
| 4 | 2 | 4 | Mary | James | 19970606 | 7 Main St. | 987654321 |
| 5 | 1 | 5 | Mary | James | 19670923 | 7 Main St. | 123456789 |
| 6 | 2 | 6 | Mary | James | *19970606* | 7 Main St. | *987654321* |

At this point, the previously un-linked records depicted in Table VII.1 are linked to two entity representations with respective DIDs of 1 and 2. Iterating blocks 705-735 again will not result in further links. This can be seen, for example, in attempting to repeat block 705 with the records as they appear in Table VII.11. Upon such an attempt, it will be seen that no record pairs that are not already assigned to the same DID have non-zero match scores. That is, every record pair taken from Table VII.11 is either already linked or has an assigned match score that indicates a low likelihood of being related. Accordingly, at this stage, the identification and linking process of FIG. 7 is complete.

According to an exemplary embodiment of a technique of this section, in an electronic database comprising a first plurality of records, each of the first plurality of records comprising a plurality of data fields, each of the data fields capable of containing a field value, a method of identifying and linking related records is presented. The embodiment includes assigning to each pair of records from the first plurality of records a match score, the match score reflecting a probability that the pair of records is related. The embodiment includes determining, for each record from a second plurality of records, at least one associated preferred record, where the first plurality of records includes the second plurality of records, where a match score assigned to a given record together with its associated preferred record is at least as great as a match score assigned to the record together with any other record in the first plurality of records. The embodiment includes identifying mutually preferred pairs of records from the second plurality of records, each mutually preferred pair of records consisting of a first record and a second record, the first record consisting of a preferred record associated with the second record and the second record consisting of a preferred record associated with the first record. The embodiment includes, for at least one mutually preferred pair of records consisting of a third record and a fourth record, linking the third record to the fourth record. The embodiment includes allowing a user to retrieve information from at least one of the third record and the fourth record.

Various optional features of the above exemplary embodiment include the following. The embodiment may include that each preferred record associated with a given record includes a record that, when paired with the given record, has a maximal assigned match score in comparison to match scores assigned to other record pairs comprising the given record. The embodiment may include, for at least one mutually preferred pair of records consisting of a fifth record and a sixth record, altering at least one field value from the fifth record based on at least one field value from the sixth record. The embodiment may include that the match score reflects a number of data field entries common to the pair of records.

Another optional feature of the above exemplary embodiment includes the following. The embodiment may include, prior to the step of linking, assigning to each pair of records from a third plurality of records a match score, the match score reflecting a probability that the pair of records is related, where the second plurality of records includes the third plurality of records, determining, for each record from a fourth plurality of records, at least one associated preferred record, where the third plurality of records includes the fourth plurality of records, where a match score assigned to a given record together with its associated preferred record is at least as great as a match score assigned to the record together with any other record in the third plurality of records, and identifying mutually preferred pairs of records from the fourth plurality of records, each mutually preferred pair of records consisting of a fifth record and a sixth record, the fifth record consisting of a preferred record associated with the sixth record and the sixth record consisting of a preferred record associated with the fifth record.

Various optional features of the above exemplary embodiment include the following. The embodiment may assign a match score assigned to a pair of records as determined by comparing data field entries of the pair of records. The embodiment may include comparing data field entries includes comparing only a portion of data fields common to the pair of records. The embodiment may assign a match score assigned to a pair of records as calculated based at least on entries in at least one data field common to each record of the pair. The embodiment may include that the database includes a fifth record and a sixth record, where the fifth record is an associated preferred record of the sixth record and where the sixth record is not an associated preferred record of the fifth record.

The above described embodiments are exemplary only and are not intended to limit the scope of the inventions disclosed herein.

VIII. Automated Selection of Generic Blocking Criteria

Embodiments of this technique may be implemented in their own iterative process, incorporated into a non-iterative process, or incorporated into an iterative process such as described above in Section II. More particularly, embodiments of the technique of this section may be used to generate blocking criteria for use in a linking process between iterations.

In certain embodiments of the technique of this section, field probabilities associated with the fields (which may be calculated according to an embodiment shown above) may be used to create one or more blocking criteria. A blocking criteria may use a first algorithm or algorithms on a universe of records to create a potential candidate list for linking records. The potential candidate list created by the first algorithm or algorithms may be a subset of the universe of records. A second algorithm or algorithms may then be used on the records associated with the potential candidate list to search for links between two or more records. The first algorithm or algorithms may be computationally faster and/or relatively more inaccurate than the second algorithm or algorithms, so that a faster, yet relatively less accurate, algorithm may be used to create a subset of the universe of records, and then a slower and more accurate algorithm may be used to link associated records from the subset. An example of one type of blocking may be found in U.S. Pat. No. 7,152,060 to Borthwick, et al. ("Borthwick '060").

One possible input into the embodiment may be a maximum number of records to be returned in a blocking operation, or a maximum block size. The maximum block size may be an absolute number, for example a maximum block size may be 100 records, or the maximum block size may be a relative number, for example ten percent of the records in a database table.

One possible output from the embodiment may be one or more blocking criteria. Each blocking criteria may be a list of fields that should be equal among two or more records so that, for example, a search of the universe of records specifying that the blocking criteria fields are equal returns a subset of the universe of records of approximately the maximum block size. In an embodiment, the blocking criteria fields may be equal and non-null (e.g., the field must contain data). The subset of the universe of records may be smaller than the specified maximum block size. If the embodiment cannot create a blocking criteria that would return a subset of the universe of records equal to or smaller than the specified maximum block size, the embodiment may return an error message for processing, or may return a blocking criteria yielding a block size as close to the maximum block size as possible. The blocking criteria may be generated using an exhaustive search of all of the fields and field probabilities that may yield a number of records at or below the maximum block size, or by using a faster but non-exhaustive search of the various combinations of fields and associated field probabilities.

As discussed above, fields in the database may have field probabilities $p_f$ associated with them, so that, for example, more significance may be shown to records that match on a field with a small or low probability (e.g., the probability that two records denoting the same person may have identical social security numbers may be high, and the probability that two records denoting different persons, where both records have the same social security number, may be low) than may be shown to records that match on a field with a large or high probability (e.g., there may be a higher probability that several people all have the identical first name, and the fact that two records may not have identical first name fields may not be a definitive indicator that the records are not associated with the same person). Discussed above, on average, $p_f$ times the number of records in the database provides the average cohort size for field values in field f. That is, $p_f$ times the number of records in the database (respectively, the number of entity representations in the database) gives the average number of records (respectively, the average number of entity representations containing records) containing the same field value in field f. In other words, $p_f$ times the number of records under consideration provides the average size of each field value cohort in field f. Moreover, $p_f$ may be independent of field value. A $p_f$ value produced by any iteration of a Section II embodiment may be used, and for the purposes of this embodiment, any field probability by any iteration of a Section II embodiment may be referred to as $p_f$.

Note that certain embodiments of the technique of this section may include multiplication of a number of probabilities (e.g., multiple values of $p_f$). As discussed in Section I, for computational convenience, the probabilities may be converted to weights and operated upon in the log domain. More particularly, as discussed in Section I, products of probabilities may be essentially isomorphic to sums of logarithms of such probabilities. Accordingly, although this section is discussed in terms of multiplication within the probability domain, the calculations may be implemented in the log domain with addition in place of multiplication where appropriate. Conversion between logs and probabilities and back may occur at various points in certain embodiments of the present technique.

The algorithm used to find the blocking criteria may use as an input the field probabilities associated with one or more of the fields in the database. The algorithm may also use other inputs to determine blocking criteria. In one embodiment, the knapsack algorithm may be used to determine blocking criteria, the operation and implementation of which is known to ordinary skill in the art. The knapsack algorithm may be used to determine one or more possible blocking criteria, given the field probabilities associated with one or more of the fields in the database. A "greedy" algorithm may be used to choose fields with the highest $w_f$ (accordingly, the lowest $p_f$) values first. Other algorithms may be used to create one or more blocking criteria, for example an exhaustive search of the fields and associated field probabilities may be conducted to determine blocking criteria.

In one embodiment, the identification algorithm used to find the blocking criteria may include creating a list of the fields and the field probabilities associated with each field, and sorting the fields lowest to highest according to the field probabilities. The identification algorithm may then choose the first field in ordered probability list, and may add that field to the blocking criteria. The identification algorithm may then move down the list of fields, adding subsequent fields to the blocking criteria until the number of matching records (respectively, entity representations) associated with the blocking criteria is equal to or less than the maximum block size input. The number of associated records (respectively, entity representations) may be computed as a product of the relevant $p_f$ values and the total number of records (respectively, entity representations). The identification algorithm may then re-create the list of the fields and the field probabilities, and choose another starting point on the list to create another blocking criterion.

Consider a database having 100 records with $p_f$ values for the fields reflected in the table below.

| Field Name | $p_f$ |
|---|---|
| First Name | 0.4 |
| Last Name | 0.3 |
| Address | 0.2 |
| City | 0.5 |
| State | 0.6 |
| Zip Code | 0.4 |
| SSN | 0.1 |

Also consider that the embodiment is given a maximum block size of six. From the above table, none of the individual field probabilities may be applied to the database to return only six records that may be associated with one record in the database. However, insisting that two or more fields match generally reduces the size of the block. Thus, two or more fields may be used to narrow the total number of records returned in batch operation on each record, so that six or fewer records are identified for each of the records in the database. For example, the {SSN, Address} combination of fields may be used, so that given a record in the database, the blocking operation of the embodiment may return a number of records equal to or less than the maximum block size that have identical or similar fields.

Figure 8A:
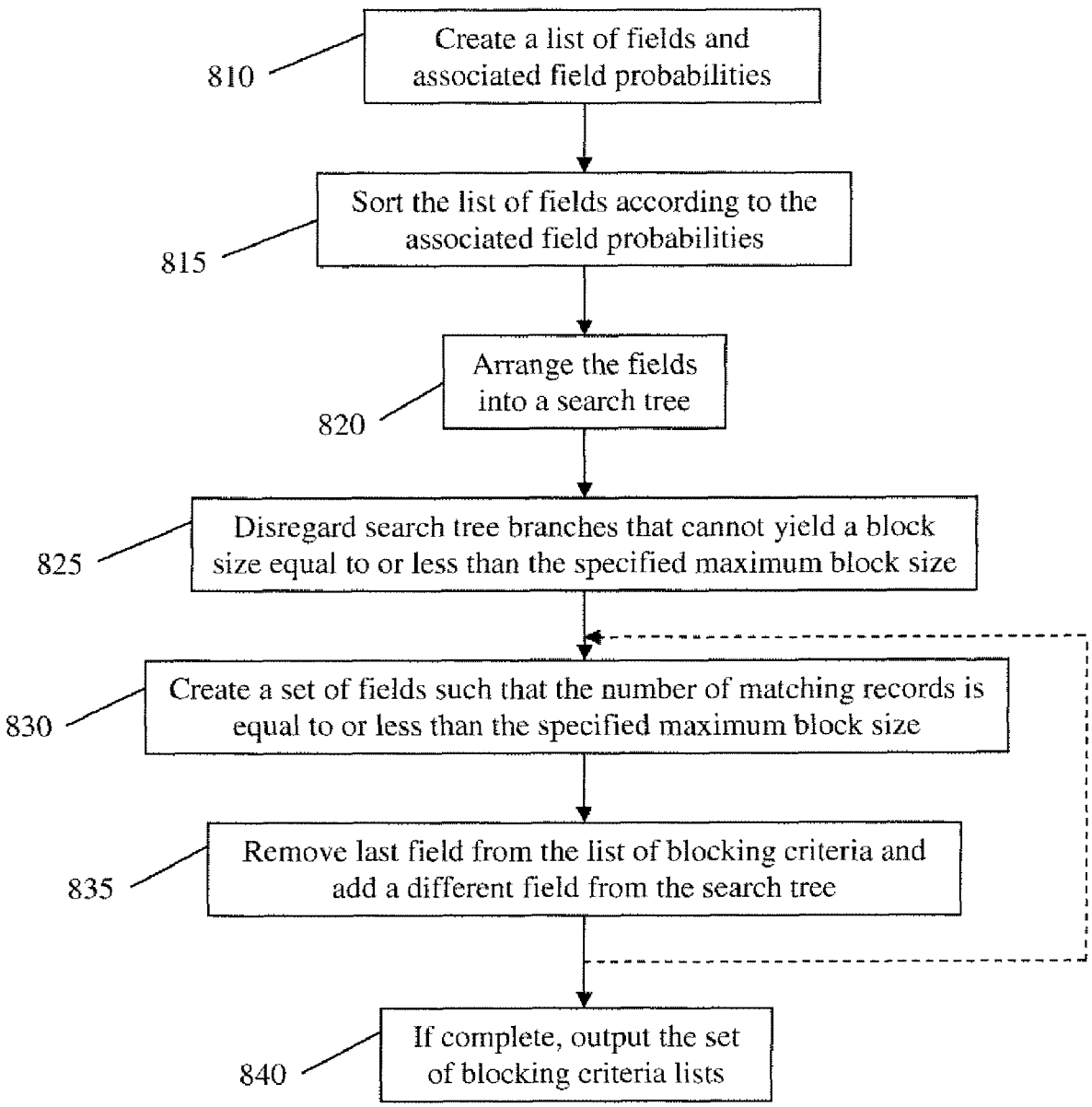
FIG. 8A is a flowchart depicting an embodiment of an invention of Section VIII.
Figure 8B:
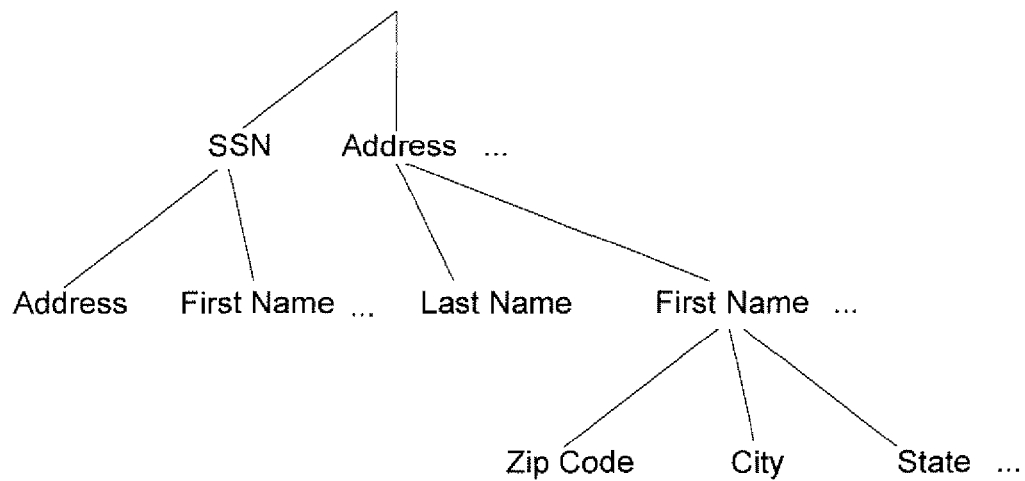
FIG. 8B depicts an exemplary portion of a search tree according to an embodiment of an invention of Section VIII.

Turning to FIG. 8A, in block 810, the embodiment may create or use an existing list of fields and associated field probabilities. In block 815, the embodiment may sort the table of fields and $p_f$ values so that fields with low $p_f$ values are listed first. The embodiment may also calculate a combined probability total up the list, that is, a potential remaining probability ("PRP"). For example:

| Field Name | $p_f$ | PRP |
|---|---|---|
| SSN | 0.1 | 0.00288 |
| Address | 0.2 | 0.0144 |
| Last Name | 0.3 | 0.048 |
| First Name | 0.4 | 0.12 |
| Zip Code | 0.4 | 0.3 |
| City | 0.5 | 0.6 |
| State | 0.6 | |

The PRP field for the City row may be the $p_f$ value of the State field, the PRP field for the Zip Code row may be the PRP value of the City row multiplied by the $p_f$ value of the City field, the PRP field for the First Name row may be the PRP value of the Zip Code row multiplied by the $p_f$ value of the Zip Code field. This process may iterate until the PRP values have been calculated for the ordered probability list.

The identification algorithm of the embodiment may order the fields so that the fields with the lowest probabilities are listed first, and may start with the SSN field, since that field has the lowest $p_f$ value. Shown in block 820, the identification algorithm may then construct a search tree according to the data provided in the present example, which is partially shown in FIG. 8b.

Turning again to FIG. 8A, in block 825, the search tree may be used to determine if any of the search tree "branches" may be disregarded because, for example, they cannot yield a maximum block size at or below the specified maximum block size. In some embodiments, alpha-beta pruning on the search tree may be performed to remove one or more "branches" that are not able to meet the specified maximum block size. The PRP values in the table, shown above, may be the product of $p_f$ values of all of the fields that are lower on the ordered probability list, and may be used to calculate an estimated overall probability. For example, if the embodiment attempted to calculate the estimated probability of records in a {SSN, Last Name, First Name, Zip Code, City, State} combination, the embodiment may find the $p_f$ value of the SSN field and multiply that probability by the PRP value for the Address field, yielding an estimated probability of (0.1*0.0144=0.00144), within a maximum block size value of 6 records in 100 overall records, or 0.06. The embodiment may also attempt to calculate the estimated probability of records in a {Zip Code, City, State} combination. In this example, the embodiment may take the $p_f$ value of the Zip Code field and multiply that probability by the PRP value for the Zip Code field, yielding an estimated probability of (0.4*0.3=0.12), outside of a maximum block size value of 0.06. Since the estimated probability is greater than the maximum block size value, all of the sub-combinations of those fields also cannot be less than the maximum block size value. The embodiment may then "prune" all of the combinations of {Zip Code, City}, {Zip Code, State}, and {Zip Code, City, State} from the search tree.

In one example, the embodiment may begin with the SSN field ($p_f$=0.1). Since the SSN field may not, by itself, yield a block size equal to or less than the six block maximum block size, the embodiment may choose the field with the next highest probability value (Address, $p_f$=0.2), which when combined with the State value may yield a percentage of records of 0.02, which may yield a block size less than the specified maximum block size of six in a 100 record database table.

In block 830, the embodiment may add a set of fields to the list of blocking criteria. In the present example, the embodiment may add the combination of {SSN, Address} to the list of blocking criteria. In block 835, the embodiment may then remove the last field added to the combination (in the present example, the Address field), and may then attempt to add the next field in the ordered probability list (Last Name, $p_f$=0.3). The union of the SSN and Last Name fields may yield a percentage of records of 0.03, which would yield a block size less than the specified maximum block size of six. The embodiment may add the combination of {SSN, Last Name} to the list of blocking criteria, and may then remove the last field added to the combination (in this case, the Last Name field), and may then attempt to add the next field in the ordered probability list (First Name, $p_f$=0.4). The union of the SSN and First Name fields may yield a percentage of records of 0.04, which would yield a block size less than the specified maximum block size of six. The embodiment may add the combination of {SSN, First Name} to the blocking criteria list, and may then remove the last field added to the combination (in this case, the First Name field).

The embodiment may then attempt to iterate through the remaining fields in a similar way, and if the union of the remaining fields with the SSN fields combination yields a percentage of records equal to or less than 0.06 (6 records in 100 total records), the embodiment may add the new combination to the blocking criteria list. When the remaining fields have been checked, the embodiment may remove the SSN field from the combination, and may add the next field in the ordered probability list (in this case, the Address field).

The embodiment may choose to add the Last Name field to the {Address} combination. The union of {Address, Last Name} may yield a percentage of records of 0.06, equal to the maximum block size. The embodiment may add the {Address, Last Name} combination to the blocking criteria list, and may disregard further combinations with the {Address, Last Name} combination, since the minimum block size is met with the {Address, Last Name} combination. The embodiment may remove the Last Name field from the combination, and may add the next field in the ordered probability list (First Name, $p_f$=0.4).

The combination of the Address and First Name fields may not combine to yield a block size equal to or less than the six block maximum block size. The embodiment may choose the field with the next highest probability value (Zip Code, $p_f$=0.4). If two or more embodiments share the same $p_f$ value, the embodiment may choose one of the fields based on other criteria. The combination of the Address, First Name, and Zip Code fields may have a percentage of records of 0.03, which may yield a block size less than the specified maximum block size of six in a 100 record database table. The embodiment may then add the {Address, First Name, Zip Code} combination to the blocking criteria list, and may remove the last field added (in this case, the Zip Code field).

Note that is some embodiments, the actions of block 825 may occur concurrently with the actions of blocks 830 and 835. That is, in such embodiments, the search tree may be traversed by either pruning (block 825) or adding to the blocking criteria (blocks 830 and 835), depending on the individual status of a node in the tree.

In block 840, the embodiment may iterate through the list of fields, attempting to create combinations of fields that yield a percentage of records equal to or less than the maximum block size. The embodiment may also attempt to create combinations of fields that yield a percentage of records that are approximately equal to the maximum block size. For example, the embodiment may create combinations of fields that are not more than one percent more than the desired block size, or not more than five percent more than the desired block size.

The data within the fields specified above may be equal in the target record and each of the records returned in the block, and the number of records in the block may be equal to or less than the specified maximum block size.

The creation of blocking criteria may be applicable to the entire database, so that the blocking criteria may be used to create blocks of records for any query in the database. In other words, the blocking criteria generated may be a "generic" blocking criteria. The generic blocking criteria may be applicable to create blocks of records that may be associated with each of the records in the database. The embodiment may be used to create blocking criteria for a batch comparison of all or substantially all of the records in the database. The blocking criteria may thus be used to associate the records into one or more blocks, so that a query on any target record in the database may begin with the blocking criteria to narrow the universe of records in the database to a more manageable block of records that may be more carefully scrutinized for potential links to the target record. Assuming a universe of one hundred billion records, a batch comparison operation attempting to match all records to all other records may be prohibitive. If the embodiment can use a blocking criteria to narrow the universe of records to one hundred or one thousand records that may be potentially associated with each record in the database, the time and computation required for a batch comparison operation may be reduced.

The embodiment of the invention may create a generic blocking criteria which may be used to associate each of the records in the database to other records in the database. The generic blocking criteria may be used to complete a batch comparison or a batch linking operation within records in the database. The embodiment may be used to generate a generic blocking criteria, applicable to all of the records of the database regardless as to specific field values. Blocks of records having the same field value(s) in the field(s) of the blocking criteria will generally be the appropriate size irrespective of the specific field value(s). Thus, the blocking criteria may be used to generate blocks of suitable size without regard to any particular field value(s), and so the embodiment may produce an optimal or near-optimal set of criteria to compare all records within the database to all other records that may be matched. This feature, for example, distinguishes the embodiment from Borthwick '060. Borthwick '060, in contrast, generates blocking criteria that are specific and suited only for individual, user-defined queries against a database. Many other features distinguish this embodiment from Borthwick '060. For example, and without limitation, Borthwick '060 creates blocking criteria only in response to a user-defined query against a database. Some of the present embodiments may create generic blocking criteria that may be used to narrow the records that may be associated with each of the fields in the database. Other features of the embodiment also distinguish the embodiment from Borthwick '060.

According to an exemplary embodiment of a technique of this section, a method of creating blocking criteria based on a maximum block size is presented. The embodiment includes calculating one or more field probabilities for the one or more fields in the database. The embodiment includes determining one or more fields which must be equal to create a block size equal to or less than the maximum block size. The embodiment includes grouping records in the database into one or more blocks by applying the blocking criteria.

Various optional features of the above embodiment include the following. The embodiment may include that the blocking criteria generated each create a partition for each of the records in the database. Each such partition may be different. The embodiment may include the additional step of applying the blocking criteria to each record in the database.

The above described embodiments are exemplary only and are not intended to limit the scope of the inventions disclosed herein.

IX. Automated Calibration of Negative Field Weighting Without the Need for Human Interaction A technique for calculating and calibrating negative field weights is presented here. This technique may be implemented in an iteration according to an embodiment of the technique of Section II. Further, this technique may be utilized in matching formulas such as those discussed in the context of Equations 3-6 in Section I.

An exemplary, non-limiting embodiment of the present technique may be implemented as follows. In particular, the exemplary embodiment is discussed in the context of the matching formulas discussed in Section I and the exemplary iteration discussed in Section II. In general, the exemplary embodiment proceeds according to an embodiment of Sections I and II, but with certain terms given particular negative values. Thus, the following discussion should be viewed as a discussion of how to modify the techniques presented in Sections I and II. Except as indicated otherwise, either explicitly or implicitly, the present embodiment may proceed as an embodiment of the techniques of Sections I and II.

Figure 9:
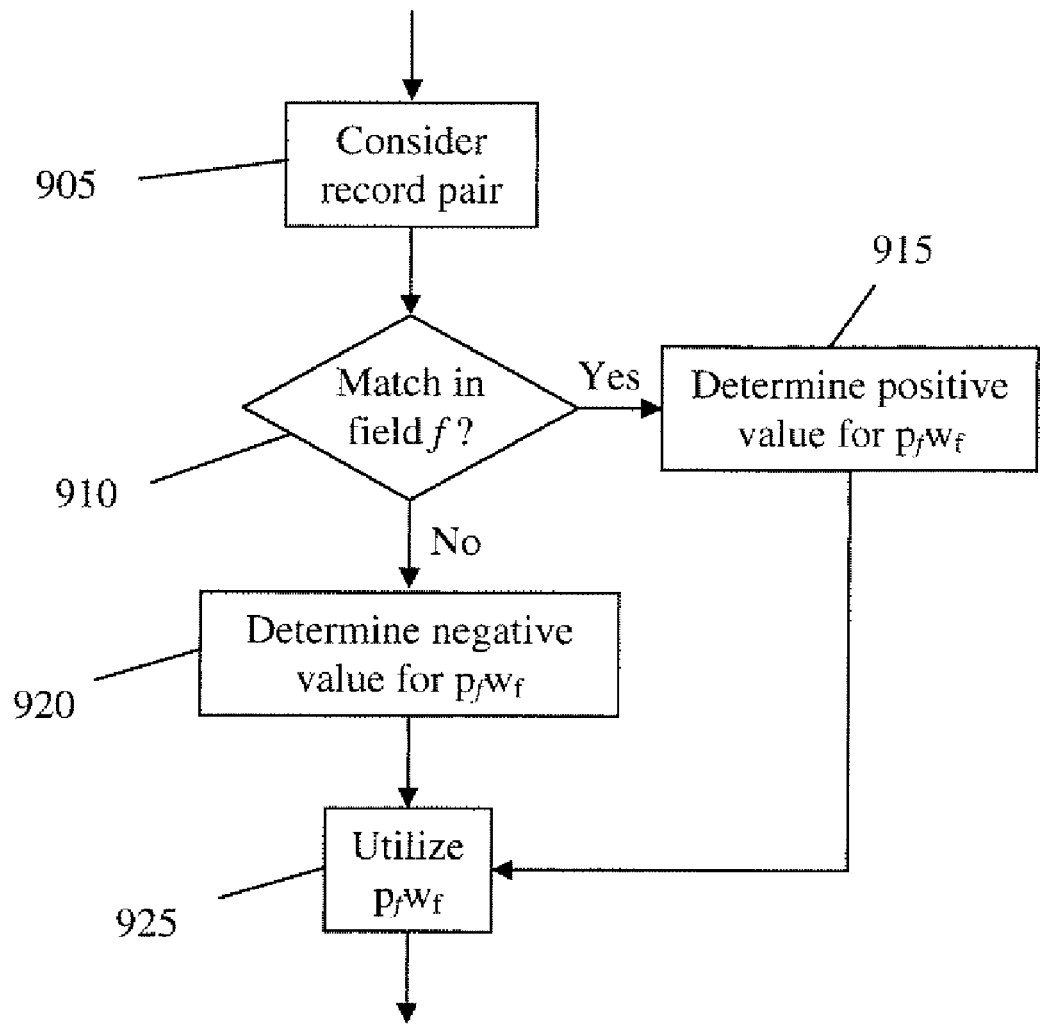
FIG. 9 is a flowchart depicting an embodiment of an invention of Section IX.

FIG. 9 is a flowchart depicting an exemplary embodiment according to this section. The embodiment may begin in a preliminary linking operation that occurs after the first iteration. As discussed there, the preliminary linking operation may utilize a matching formula, such as those discussed in Section I in reference to Equations 3-6. The embodiment modifies Equations 3-5 by allowing certain terms in such matching formulas to be negative in the event of a non-match in one or more given fields. The technique is discussed in the context of Equation 3, however, it may be applied in the context of Equations 4 or 5. For convenience, Equation 3 is reproduced below:

$$S(r_1, r_2) = \sum_f p_f w_f.$$

At block 905, a pair of records $r_1$, $r_2$ are considered. At block 910, it is determined whether there is a match between the records in field f. If the field values match between records $r_1$ and $r_2$ in field f, then the term $p_f w_f$ in Equation 3 may be determined as discussed above in Sections I and II at block 915. For non-matches, according to the exemplary embodiment under discussion, the term $p_f w_f$ may be handled differently at block 920. Specifically, for a non-match in field f of records $r_1$ and $r_2$ as calculated during the preliminary linking operation after the first iteration, the term $p_f w_f$ may be set to the negative of $w_f$ (i.e., $-w_f$). The sum may otherwise be computed as discussed in Section I, and the records $r_1$ and $r_2$ may be linked based on whether $S(r_1, r_2)$ exceeds a threshold, which may be determined according to Equation 6. At block 925, the iteration may proceed by utilizing $p_f w_f$.

For iterations after the first iteration, the exemplary embodiment may proceed as follows. Specifically, the embodiment may continue by modifying the linking operation that occur after the second and subsequent operations. Note that after the first iteration, the database generally contains entity representations instead of solely unlinked records. As with the first iteration, the present embodiment affects the terms in the matching formula used to determine links between records. Specifically, for two records $r_1$ and $r_2$ provided at block 905 and for a given field f, if the field values in the given records match as determined at block 910, then the term $p_f w_f$ may be calculated as discussed above in Sections I and II at block 915. If the field values do not match, the term $p_f w_f$ may be modified as follows at block 920. First, a count may be made of entity representations that have the property that they include two linked records that have different field values in field f. That count may be divided by the total number of entity representations. The resulting ratio may be subtracted from one (1), negated, and multiplied by $w_f$. The resulting term may be used in place of $p_f w_f$. These operations may be conducted relative to the entity representations that exist during the relevant linking operation (after the relevant iteration). A calculation of one or more of the count, the ratio, the ratio subtracted from one, and the ratio subtracted from one and negated may be made at the time of the first iteration (e.g., before, during or after calculating the weights $w_f$) and, for later use, stored in, for example, a lookup table or in an extra field added to one or more records. Thus, for two given records $r_1$ and $r_2$ and for a given field f, if the field values in the given records do not match, then the term $p_f w_f$ may be calculated as, by way of non-limiting example:

$$p_f w_f = -w_f \left(1 - \frac{K_f}{K}\right). \qquad \text{Equation 29}$$

In Equation 29, $K_f$ represents the number of entity representations that include two records with different field values in field f, and K represents the total number of entity representations. In some embodiments, the term K is determined as the number of entity representations that include at least two different records. Note that K and $K_f$ may be computed during an iteration according to the techniques set forth in, for example, Section II. More particularly, these terms may be computed as part of such an iteration and stored for use according to a technique of this section. Equation 29 provides a formula for terms in the event of a non-match in field f. At block 925, the terms provided by Equation 29 may be included in any of Equations 3-5 in order to determine, in conjunction with Equation 6, whether records should be linked.

An alternate formula to that provided by Equation 29 is discussed presently. Equation 30, presented below, may be used in exactly the same circumstances as those discussed above in relation to Equation 29. In the case of a non-match in field f, the term $p_f w_f$ may be calculated as, by way of non-limiting example:

$$p_f w_f = -\log \frac{K_f}{K}. \qquad \text{Equation 30}$$

In Equation 30, the terms $K_f$ and $K$ represent the quantities discussed above in reference to Equation 29. Thus, in the case of a non-match between records in field f, the term $p_f w_f$ in any of Equations 3-5 may be set as provided by Equation 30.

The above described embodiments are exemplary only and are not intended to limit the scope of the inventions disclosed herein.

X. Statistical Record Linkage Calibration for Multi Token Fields Without the Need for Human Interaction Embodiments of this technique may be implemented in their own iterative process or incorporated into an iterative process as described above in Section II.

In some embodiments, the techniques of this section provide one or more weights ("blended weights"), which may be used in a record matching formula (e.g., Equations 3-5) to scale probabilities (e.g., $p_f$ or $p_i$) that two records contain nearly matching field values in a field that typically contains multiple tokens. Examples of such fields, referred to as "multi token fields," include business name fields, street name fields, free text fields, etc. (The term "token" encompasses any part of a field value.) A near match of field values containing multiple tokens may be indicated by exact matches between some or all tokens, near matches between some or all tokens, or a combination of both. A near match between a pair of individual tokens may be determined according to any of the various near match metrics disclosed herein or otherwise, including SOUNDEX, edit distance, etc. Some embodiments determine a probability (referred to as a "token probability") associated with each separate token that makes up a field value, and convert such probabilities to weights (referred to as "token weights"). Further, the entirety of each multi token field value in each multi token field may have an associated to it a field value weight according to the techniques discussed in Section II.

Accordingly, an entire field value may have an associated field value weight, and the tokens that make up the entire field value may each have associated token weights. These and other weights may be mathematically blended to arrive at a "blended field value weight." Thus, in some embodiments, a weight associated with a multi token field value for use in a matching formula (e.g., Equations 3-5) may be determined by mathematically blending the weight associated with the entire field value and the weights associated with each constituent token. More generally, a "blended weight" used in a matching formula to determine whether to link two records, where the blended weight is associated with a multi token field, may determined by mathematically blending two or more of the following: any of the weights associated with the entire field values in the multi token fields in each of the records under comparison, and any of the weights associated with each token that appears in the field values in the multi token fields in each of the records under comparison. Thus, each multi token field value may have associated to it a blended weight, each pair of multi token field values may have an associated blended weight, and each of these blended weights may be used in making linking decisions as discussed above in Section I.

Certain embodiments associate a probability to each multi token field, independent of any particular field value. For a given multi token field, the associated probability may be computed as a weighted average of the probabilities associated with each individual token that may occur in the multi token field. These field probabilities calculated by certain embodiments may be converted to field weights and used in making record linking decisions. Such decisions may take into account some or all of the fields common to the records. In this technique, knowledge of the common field values may be not required. Further, this technique produces accurate results for any two records, regardless as to the contents of their fields.

In some embodiments, the field probabilities may be used for quality assurance purposes. For example, the field probabilities may be used to quantitatively monitor the diversity of tokens that appear in a particular multi token field. A relatively large field value associated with a multi token field can indicate that the multi token field contains a large number tokens with relatively large associated field value weights. (A relatively large field value weight may indicate that the associated field value is relatively rare.) Such a relatively large field value weight may indicate that a number of records with junk entries in the multi token field have entered the database.

Figure 10:
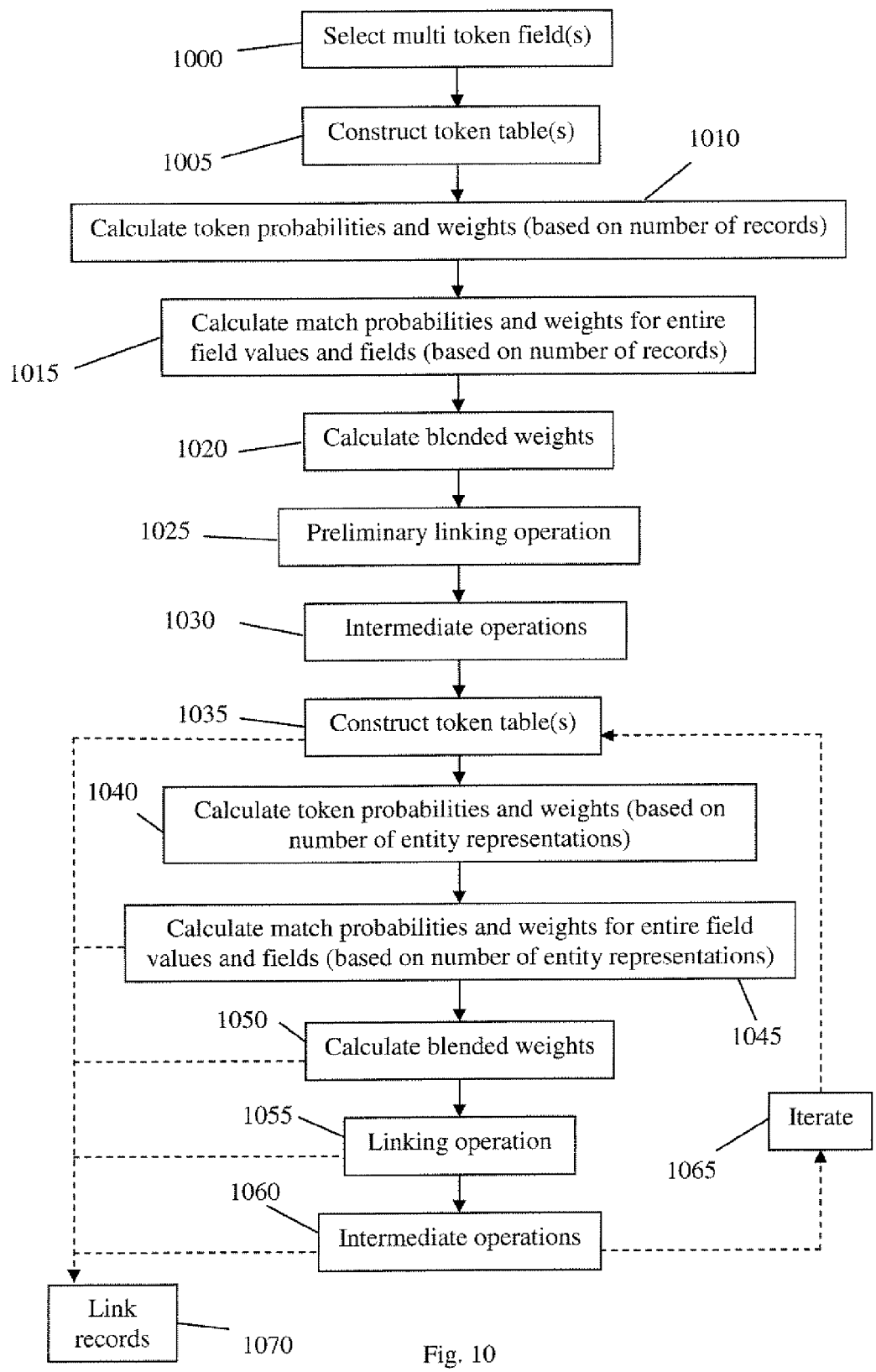
FIG. 10 is a flowchart depicting an embodiment of an invention of Section X.

FIG. 10 is a flowchart depicting an exemplary embodiment according to this section. The present embodiment may be implemented in conjunction with an embodiment of the techniques of Section II. For purposes of illustration rather than limitation, the present embodiment will be discussed in reference to exemplary records $r_1$, $r_2$ and $r_3$ reflected in the table below. Thus, Table X.1 below reflects a portion of a database.

TABLE X.1

| Record | DID | Business Name | Zip Code | Phone Number |
|---|---|---|---|---|
| $r_1$ | 1 | Joe's Lawn Furniture Corporation | 22222 | (703) 555-1000 |
| $r_2$ | 2 | Abe's Lawn Furniture Corporation | 33487 | (561) 555-1234 |
| $r_3$ | 3 | Joe's Furniture Corporation | 22222 | |

A visual inspection of these three records reveals that records $r_1$ and $r_3$ are likely for the same individual, in this case, a company that apparently deals in lawn furniture. However, naïvely using an edit distance metric, for example, to compare the Business Name field values would indicate a closer match between $r_1$ and $r_2$ than between $r_1$ and $r_3$. That is, the field value "Joe's Lawn Furniture Corporation" is closer to "Abe's Lawn Furniture Corporation" than it is to "Joe's Furniture Corporation" when using, for example, an edit distance metric to gauge closeness. However, the field values "Joe's Lawn Furniture Corporation" and "Joe's Furniture Corporation" are more likely to correspond to the same individual than the field values "Joe's Lawn Furniture Corporation" and "Abe's Lawn Furniture Corporation". Certain embodiments of the techniques discussed in this section provide a way to compare multi token field values in a way that provides better field value weights for field values in multi token fields than those that might be available from naïvely using edit distance. Note, however, that certain embodiments of the technique of this section may utilize edit distance metrics in a way that improves upon the prior art.

At block 1000, the exemplary embodiment begins a first iteration by selecting one or more multi token fields and then, for each such field, constructing a table at block 1005 that contains a record for each token that appears in any record in the selected field. Such a table will be referred to as a "token table." Token tables may include duplicates, for example, if the same token appears more than once in the same record or in different records. The token table may further contain definitive identifiers associated with each token. That is, the token table may associate to each token the DID of the original record in which the token appeared. A first iteration token table corresponding to Business Name field of the records in Table X.1 appears below; however, the present technique may be applied to any number of multi token fields.

TABLE X.2

| DID | Token |
|-----|-------|
| 1 | Joe's |
| 1 | Lawn |
| 1 | Furniture |
| 1 | Corporation |
| 2 | Abe's |
| 2 | Lawn |
| 2 | Furniture |
| 2 | Corporation |
| 3 | Joe's |
| 3 | Furniture |
| 3 | Corporation |

Note that, as Table X.1 depicts a portion of a database, so too does Table X.2.

At block 1010, the first iteration may proceed to compute token field value probabilities and token field value weights for the records in the token table (Table X.2). That is, the first iteration may proceed by calculating token probabilities and token weights. These may be computed using any of the techniques disclosed herein. For purposes of illustration, the techniques of Section II may be applied to a token table, such as Table X.2.

Thus, for each token, the first iteration may proceed by determining the number of tokens with unique DIDs that are present in the token table. That is, the first iteration counts the number of records in the token table that include a particular token, counting multiple tokens that appear in the same original field as one. At this point, every token has an associated count. These counts may be then divided by the total number of different DIDs in the token table, yielding token probabilities. (In the first iteration, the number of different DIDs may be the number of records in the original database, a portion of which is reflected in Table X.1.) Thus, at the end of the first iteration, each token together with the field in which it originally appeared may be associated with a token probability, which may be calculated as the number of records with unique DIDs in the token table that include the token, divided by the total number of unique DIDs in the token table. In formal terms, the token probability may be calculated as, by way of non-limiting example:

$$p_{f,t}(1) = \frac{c_{f,t}}{c}.$$  Equation 31

In Equation 31, the term $p_{f,t}(1)$ represents the first iteration token probability associated with original field f and token t. The term $c_{f,t}$ represents the number of records with unique DIDs that appear in the token table that include token t, and the term c represents the total number of different DIDs that appear in the token table. Accordingly, a given token probability produced by the first iteration may be a probability that a record randomly chosen from the (original) database contains the given token in the associated field. The field value probabilities may be converted to field value weights according to, by way of non-limiting example:

$$w_{f,t}(1) = -\log p_{f,t}(1).$$  Equation 32

Thus, at the end of the first iteration, each token and the original field in which it appears may be associated with a token weight, each of which may be calculated from a corresponding token probability.

Once the first-iteration token probabilities and token weights are calculated, the token table may be modified by adding columns for one or both of field value probabilities and field value weights. An exemplary such token table, based on Table X.2, appears below.

TABLE X.3

| DID | Token | Token Weight |
|-----|-------|--------------|
| 1 | Joe's | 15 |
| 1 | Lawn | 10 |
| 1 | Furniture | 12 |
| 1 | Corporation | 4 |
| 2 | Abe's | 20 |
| 2 | Lawn | 10 |
| 2 | Furniture | 12 |
| 2 | Corporation | 4 |
| 3 | Joe's | 15 |
| 3 | Furniture | 12 |
| 3 | Corporation | 4 |

Various techniques may be used to store the field value probabilities and field value weights for later use. Such parameters may be stored in a table, such as one as represented by Table X.3. By way of non-limiting example, field value weights may be stored in fields added to records in which the associated field values appear. In some embodiments, one or both of token probabilities and token weights may be stored in fields appended to records, while one or both of associated field probabilities and field weights may be stored in one or more lookup tables. As another non-limiting example, the token weights may be stored by modifying the original field values in the original records in which the tokens appear. More particularly, the token weights may be inserted before or after their associated token in the original field in which the token appears. The table below illustrates an application of this technique to the original records $r_2$, $r_2$ and $r_3$, appending the token weights to the associated token:

TABLE X.4

| Record | DID | Business Name | Zip Code | Phone Number |
|--------|-----|---------------|----------|--------------|
| $r_1$ | 1 | Joe's 15 Lawn 10 Furniture 12 Corporation 4 | 22222 | (703) 555-1000 |
| $r_2$ | 2 | Abe's 20 Lawn 10 Furniture 12 Corporation 4 | 33487 | (561) 555-1234 |
| $r_3$ | 3 | Joe's 15 Furniture 12 Corporation 4 | 22222 | |

At block 1015, also during the first iteration, the records of the entire database (or portion thereof) may undergo a separate first iteration to generate match weights and probabilities. That is, the database at large (or portion thereof) may undergo a first iteration according to, for example, the techniques of Section II (e.g., using Equations 7 and 8). Such an iteration may generate field value probabilities and field value weights for the entirety of each multi token field value. Thus, subjecting the database to a first iteration may generate field value weights for each of the entire multi token field values.

The first iteration may proceed to generate field probabilities and field weights associated with each multi token field.

Such parameters may be generated using the techniques described in Section II (e.g., Equations 9 and 10) and stored for later use according to any of the storage techniques disclosed herein.

Thus, the first iteration applied to the database may generate field value weights for each field value that appears in the Business Name field, as well as a field weight for that field (e.g., using Equations 7-10). These weights may be stored as discussed in Section II. Alternately, or in additional, the weights may be stored in the original records as part of the field value itself. By way of non-limiting example, suppose the weight given to the field value "Joe's Lawn Furniture Corporation" is 35, the weight for field value "Abe's Lawn Furniture Corporation" is 38, and the weight given to field value "Joe's Furniture Corporation" is 27. These weights may be stored, by way of non-limiting example, as prefixes to the field values that appear in the Business Name field. A table illustrating this technique appears below.

TABLE X.5

| Record | DID | Business Name | Zip Code | Phone Number |
|---|---|---|---|---|
| $r_1$ | 1 | 35 Joe's 15 Lawn 10 Furniture 12 Corporation 4 | 22222 | (703) 555-1000 |
| $r_2$ | 2 | 38 Abe's 20 Lawn 10 Furniture 12 Corporation 4 | 33487 | (561) 555-1234 |
| $r_3$ | 3 | 27 Joe's 15 Furniture 12 Corporation 4 | 22222 | |

At block 1020, the exemplary embodiment under discussion may proceed to generate blended field value weights from the token weights and the field value weights for the entire field values that appear in the multi token field. These blended field value weights may be calculated with respect to pairs of records. That is, given a pair of records, a blended field value weight may be generated on the token weights, the field value weights for the entire multi token field, the number of matching tokens between the pair of records in the given multi token field, and the number of non-matching tokens between the pair of records in the given multi token field. Thus, a blended field value weight may be associated with a pair of field values that appear in a multi token field in two records. The blended field value weights may be used to make linking decisions between pairs of records according to, for example, Equations 3-6. The blended field weights may be generated and stored, or generated on the fly as part of the linking decision process.

Blended field value weights may be computed according to a variety of techniques. The following provides exemplary techniques for blending the token weights and field value weights. For a pair of records $r_i$ and $r_j$ that share a multi token field, where i and j represent indexes for any two records, any of the following equations may be used to calculate a blended weight associated with the multi token field values in the two records in the shared multi token field.

$$w_{i,j} = \max(w_i, w_j) \times \frac{2M}{2M+N} \qquad \text{Equation 33}$$

$$w_{i,j} = \min(w_i, w_j) \times \frac{2M-N}{2M+N} \qquad \text{Equation 34}$$

$$w_{i,j} = \max(w_i, w_j) \times \frac{2M-N}{2M+N} \qquad \text{Equation 35}$$

$$w_{i,j} = \min(w_i, w_j, M) \qquad \text{Equation 36}$$

In the Equations 33-36, the term $w_{i,j}$ denotes the blended field value weight associated with records $r_i$ and $r_j$ and a selected shared multi token field (and, of course, the multi token field values that appear in such field in the two records), $w_i$ denotes the field value weight associated with the entire multi token field value in the selected multi token field of $r_i$, $w_j$ denotes the field value weight associated with the entire multi token field value in the selected multi token field of $r_j$, the terms min( ) and max( ) denote the minimum and maximum operators, respectively, the term M denotes the sum of the token weights for tokens that match between records $r_i$ and $r_j$, and the term N denotes the sum of the token weights for tokens that do not match between records $r_i$ and $r_j$.

Equations 33-36 may be suitable for generating blended weights with a variety of different properties. Equation 33 may be suitable for general multi token fields, such as business names. Equation 34 may be suitable for multi word descriptions of complex entities, such as departments in businesses or hospitals. Equation 35 may be viewed as a scaled and biased version of Equation 33 that may be used to handle multi token fields in which it is unlikely that two or more field values may be used to describe the same thing. Equation 36 may be used for multi token fields that contain lists, such as names of co-inventors on patents. Although certain properties and suitabilities are discussed in this paragraph, any of Equations 33-36 ay be used to generate blended field value weights for any multi token fields, not limited to those discussed in this paragraph.

The following provides calculations according to Equations 33-36 with respect to the pair of records $r_1$ and $r_2$ taken from Table X.1 and the shared multi token Business Name field. Note that, in this example for records $r_1$ and $r_2$, the terms $w_1$ and $w_2$ were calculated according to the techniques of Section II as 35 and 38, respectively. For records $r_1$ and $r_2$, the term M may be calculated by noting that the common tokens to the Business Name field for these records are "Lawn", "Furniture" and "Corporation", which have token weights of 10, 12 and 4, respectively. The sum of these weights, M, is equal to 10+12+4, or 26. For records $r_1$ and $r_2$, the term N may be calculated by noting that the tokens in the Business Name field for these records that do not match are "Joe's" (in $r_1$) and "Abe's" (in $r_2$). These tokens have token weights 15 and 20, respectively. The sum of these weights, N, is equal to 15+20, or 25. Accordingly, applying these numbers to Equations 33-36 yields, respectively:

$$\begin{aligned} w_{1,2} &= \max(w_1, w_2) \times \frac{2M}{2M+N} \\ &= \max(35, 38) \times \frac{2 \times 26}{2 \times 26 + 25} \\ &= 25.7 \end{aligned} \qquad \text{Equation 37}$$

$$\begin{aligned} w_{1,2} &= \min(w_1, w_2) \times \frac{2M-N}{2M+N} \\ &= \min(35, 38) \times \frac{2 \times 26 - 25}{2 \times 26 + 25} \\ &= 12.3 \end{aligned} \qquad \text{Equation 38}$$

$$\begin{aligned} w_{1,2} &= \max(w_1, w_2) \times \frac{2M-N}{2M+N} \\ &= \max(35, 38) \times \frac{2 \times 26 - 25}{2 \times 26 + 25} \\ &= 13.3 \end{aligned} \qquad \text{Equation 39}$$

-continued $$w_{1,2} = \min(w_1, w_2, M)$$
$$= \min(35, 38, 26)$$
$$= 26$$

Equation 40

Next, calculations are presented according to Equations 33-36 with respect to the pair of records $r_1$ and $r_3$ taken from Table X.1 and the shared multi token Business Name field. Note that, in this example for records $r_1$ and $r_3$, the terms $w_1$ and $w_3$ were calculated according to the techniques of Section II as 35 and 27, respectively. For records $r_1$ and $r_3$, the term M may be calculated by noting that the common tokens to the Business Name field for these records are "Joe's", "Furniture" and "Corporation", which have token weights of 15, 12 and 4, respectively. The sum of these weights, M, is equal to 15+12+4, or 31. For records $r_1$ and $r_3$, the term N may be calculated by noting that the only token in the Business Name field for these records that does not match is "Lawn" (which appears in $r_1$ but not in $r_2$). This token has a token weight of 10; accordingly, N is equal to 10 for records $r_1$ and $r_3$. Thus, applying these numbers to Equations 33-36 yields, respectively:

$$w_{1,3} = \max(w_1, w_3) \times \frac{2M}{2M+N}$$
$$= \max(35, 27) \times \frac{2 \times 31}{2 \times 31 + 10}$$
$$= 30.1$$

Equation 41

$$w_{1,3} = \min(w_1, w_3) \times \frac{2M-N}{2M+N}$$
$$= \min(35, 27) \times \frac{2 \times 31 - 10}{2 \times 31 + 10}$$
$$= 19.5$$

Equation 42

$$w_{1,3} = \max(w_1, w_3) \times \frac{2M-N}{2M+N}$$
$$= \max(35, 27) \times \frac{2 \times 31 - 10}{2 \times 31 + 10}$$
$$= 25.3$$

Equation 43

$$w_{1,3} = \min(w_1, w_3, M)$$
$$= \min(35, 27, 31)$$
$$= 27$$

Equation 44

Note that in this example, the blended weights associated with records $r_1$ and $r_3$ (provided in Equations 41-44) exceed the blended weights associated with records $r_1$ and $r_2$ (provided in Equations 37-40). Thus, based on the Business Name field contents alone, it is more likely that record $r_1$ would be linked to record $r_3$ than to record $r_2$. Note further that the Business Name field values of records $r_1$ and $r_2$ are closer together than the Business Name field values of records $r_1$ and $r_3$ when compared by naïvely using an edit distance measure. Thus, this example illustrates that the blended field weights may provide a better measure of match significance between multi token field values than a naive application of edit distance, for example.

At block 1025, after the first iterations (for the token table and the database at large), the exemplary technique may undergo a linking process that generates a plurality of entity representations. The link process may generally proceed as set forth in Sections I and II. More particularly, Equations 3-6 may be used to compare pairs of records and decide whether to link them. Each record may be compared to every other record in the database, or to a set of records generated using blocking criteria, such as the blocking criteria presented in Section VIII. As discussed in Section I, comparing two records using, e.g., Equations 3-5, may involve comparing individual field values to generate a probability and then weighting such probability using a weight. In comparing a multi token field as part of computing a match score, the process may proceed as follows. If the field values in the multi token field are identical, then the associated probability may be set to one (1) and weighted using the field value weight for the entire multi token field value, or, alternately, the field weight associated with the multi token field. It on the other hand, the field values in the multi token field are not identical, then the comparison of the multi token field may proceed as follows. The process may generate a probability that the field values match according to techniques for generating such probabilities discussed herein and in the First Generation Patents And Applications. As a particular non-limiting example, the probability may be set to one (1), even though the field values are not exactly identical. The probability may be weighted by any of the blended weights as disclosed in this section. The comparison may proceed to the remaining field values, a match score may be generated, the score may be used to determined whether to link the records as discussed in Section I, and the records may be linked depending on the determination.

At block 1030, intermediate operations may be performed. Exemplary such operations (e.g., transitional linking, propagation, delinking) are discussed in Section II.

Subsequent iterations (i.e., iterations subsequent to the first iteration) may proceed in a manner similar to the first iteration. In particular, for each subsequent iteration, a token table may be generated at block 1035 for each selected multi token field. Such a token table may include DIDs or other indicia of linkage between records. The token table may be generated from scratch or by revising the token table from the prior iteration. That is, the token table from the prior iteration may be updated by altering the DIDs of records that were linked after the prior iteration. Continuing the example presented in this section, and assuming for purposes of illustration that the linking process that followed the first iteration linked records $r_1$ and $r_3$, (a portion of) the token table for a second iteration may appear as presented below:

TABLE X.6

| DID | Token |
|-----|-------|
| 1 | Joe's |
| 1 | Lawn |
| 1 | Furniture |
| 1 | Corporation |
| 2 | Abe's |
| 2 | Lawn |
| 2 | Furniture |
| 2 | Corporation |
| 1 | Joe's |
| 1 | Furniture |
| 1 | Corporation |

At block 1040, and in general, iterations subsequent to the first may proceed to compute token field value probabilities and token field value weights for the records in the token table (e.g., Table X.6). That is, the subsequent iterations may proceed by calculating token probabilities and token weights. These may be computed using any of the techniques disclosed herein. Thus, subsequent iterations may count the number of records in the token table that include a particular token, counting multiple tokens that appear in the same original field as one, and these counts may be then divided by the total number of different DIDs in the token table, yielding token probabilities. Thus, at the end of each subsequent iteration, each token together with the field in which it originally appeared may be associated with a token probability, which may be calculated as the number of records with unique DIDs in the token table that include the token, divided by the total number of unique DIDs in the token table. In formal terms, the token probability may be calculated as, by way of non-limiting example:

$$p_{f,t}(n) = \frac{c_{f,t}}{c}.\quad\text{Equation 45}$$

In Equation 45, the term $p_{f,t}(n)$ represents the n-th iteration token probability associated with original field f and token t. The remaining terms in Equation 45 may be as described in reference to Equation 31, and may be determined at the time of the subsequent iteration. Accordingly, a given token probability produced by a subsequent iteration may be a probability that a record randomly chosen from the (original) database, after the prior iteration, contains the given token in the associated field. The field value probabilities may be converted to field value weights according to, by way of non-limiting example:

$$w_{f,t}(n) = -\log p_{f,t}(1).\quad\text{Equation 46}$$

Thus, at the end of each iteration, each token and the original field in which it appears may be associated with a token weight, each of which may be calculated from a corresponding token probability.

Each iteration may include separately subjecting the database at large (or a portion thereof) to an iteration according to, for example, the techniques of Section II (e.g., using Equations 15-18). Such an iteration may generate revised field value probabilities and revised field value weights for the entirety of each multi token field value at block 1045. Such parameters may be generated using the techniques described in Section II (e.g., Equations 15 and 16) and stored for later use according to any of the storage techniques disclosed herein. Each subsequent iteration may proceed to generate revised field probabilities and revised field weights associated with each multi token field. Such parameters may be generated using the techniques described in Section II (e.g., Equations 17 and 18) and stored for later use according to any of the storage techniques disclosed herein. Thus, subjecting the database to each subsequent iteration may generate match weights for entire multi token fields and multi token field values.

In each iteration, the token weights and multi token field value weights may be stored as discussed in this section above in reference to the first iteration, e.g., in tables or in the multi token fields of the original records themselves.

At block 1050, each iteration may proceed to generate blended weights as described in this section above in reference to the first iteration, e.g., according to Equations 33-36.

At block 1055, each iteration may be followed by a linking process. Such a linking process may proceed as described in this section above.

At block 1060, intermediate operations may be performed. Exemplary such operations (e.g., transitional linking, propagation, delinking) are discussed in Section II.

Block 1065 indicates that one or more of blocks 1035, 1040, 1045, 1050, 1055 and 1060 may be iterated.

Thus, each iteration may generate more accurate blended weights, which may be used to link together records that correspond to the same entity. That is, each iteration may consolidate entity representations. It is expected that at some point, the process stabilizes such that further iterations do not result in further linkages.

The iteration may halt after any number of iterations after any of blocks 1035, 1040, 1045, 1050, 1055 or 1060. At block 1070, the blended weights may be used to link records as discussed elsewhere herein.

Modifications and alterations to the process described in this section above are discussed presently. Instead of, or in addition to, calculating token weights and multi token field value weights based on exact matches using e.g., the techniques of Section II, some embodiments may calculate token weights and multi token field value weights based on other techniques discussed herein. Such techniques include, e.g., those disclosed in Sections III and IV. Once token weights and multi token field value weights are so calculated, such embodiments may use such parameters to calculate blended weights according to, e.g., Equations 33-36. Such token weights and multi token field weights may be stored in, by way of non-limiting example, separate tables, in one or more fields added to the original records or token tables, or embedded within the multi token fields themselves.

An example of using the techniques of Sections III and IV within the techniques disclosed in this section is presented. (Note that Equations 33-35 include terms N, which reflect a technique of Section IX.) This example is presented in view of Tables X.1 and X.2. Further, this example is presented in the context of a first iteration; however, this example may be extended to subsequent iterations using the techniques disclosed herein. That is, this example is meant to illustrate one way of incorporating the techniques of Sections III and IV into a first iteration of an embodiment of a technique of the present section, but additional configurations and further iterations fall within the scope of the present disclosure. In order to utilize a technique according to Section IV, an additional proxy field may be added to the token table, resulting in a table such as presented below.

TABLE X.7

| DID | Token | Proxy Token |
|---|---|---|
| 1 | Joe's | J200 |
| 1 | Lawn | L500 |
| 1 | Furniture | F653 |
| 1 | Corporation | C616 |
| 2 | Abe's | A120 |
| 2 | Lawn | L500 |
| 2 | Furniture | F653 |
| 2 | Corporation | C616 |
| 3 | Joe's | J200 |
| 3 | Furniture | F653 |
| 3 | Corporation | C616 |

As illustrated in Table X.7, the proxy fields may be populated with a SOUNDEX code, or any other suitable code as discussed in Section IV. Additional columns may be added to accommodate one or more of: token weights produced according to the techniques of Section II (e.g., as disclosed in relation to Table X.3, above), weights for the proxy tokens (e.g., as disclosed in Section IV), and weights for one or more reflexive symmetric distance measure and associated one or more distances (e.g., as disclosed in Section III). An example of such a table appears below.

TABLE X.8

| DID | Token | Token Weight | Proxy Token | Proxy Token Weight | $w_{f,v,D_1,d_1}$ | $w_{f,D_2,d_2}$ |
| --- | --- | --- | --- | --- | --- | --- |
| 1 | Joe's | 15 | J200 | 12 | 4 | 7 |
| 1 | Lawn | 10 | L500 | 6 | 5 | 7 |
| 1 | Furniture | 12 | F653 | 11 | 11 | 7 |
| 1 | Corporation | 4 | C616 | 4 | 3 | 7 |
| 2 | Abe's | 20 | A120 | 16 | 18 | 7 |
| 2 | Lawn | 10 | L500 | 6 | 5 | 7 |
| 2 | Furniture | 12 | F653 | 11 | 11 | 7 |
| 2 | Corporation | 4 | C616 | 4 | 3 | 7 |
| 3 | Joe's | 15 | J200 | 12 | 4 | 7 |
| 3 | Furniture | 12 | F653 | 11 | 11 | 7 |
| 3 | Corporation | 4 | C616 | 4 | 3 | 7 |

In Table X.8, the Token Weight column contains the token weights computed in a first iteration according to a technique of Section II. Populating this column is discussed above in detail in this section above. The Proxy Token field is, in this example, populated with SOUNDEX codes for each corresponding token. As discussed in Section IV, other codes instead of or in addition to SOUNDEX may be used. The Proxy Token weight column in Table X.8 is populated with weights for the proxy field values according to the techniques of Section IV. The $w_{f,v,D_1,d_1}$ field contains field value weights for the tokens as computed according to the techniques of Section III. More particularly, these weights may be computed using, for example, Equations 20 or 24. The parameter f in this instance is the token field in the token table (column two in Table X.8), and the parameter v is the associated token itself. The term $D_1$ represents a selected reflexive and symmetric distance function, which may be any such function consistent with the disclosure of Section III. The $w_{f,D_2,d_2}$ field contains field weights for the tokens as computed according to the techniques of Section III. More particularly, these weights may be computed using, for example, Equations 22 or 26. The parameter f in this instance is the token field in the token table (column two in Table X.8), and the term $D_2$ represents a selected reflexive and symmetric distance function, which may be any such function consistent with the disclosure of Section III. In the example presented above in reference to Tables X.7 and X.8, the weights that appear in Table X.8 may be computed as part of a first iteration of an iterative process. Thus, each weight that appears in Table X.8 may be computed as part of a single iteration, rather than requiring separate iterations. However, in some embodiments, separate iterations may be employed.

Continuing the above example, the exemplary first iteration may be accompanied by a first iteration of the entire original database (or portion thereof) in order to generate field value probabilities and field value weights for each of the entire multi token field values according to the techniques of Section II are discussed above. Field probabilities and field weights may also be generated. Processes for generating such parameters according to the techniques of Section II are discussed above.

In addition, field value probabilities and field value weights may be generated for each of the entire multi token field values according to the same techniques that were applied to the token table (e.g., Table X.8). That is, a proxy token field may be added to the original records and populated with codes for the entirety of the selected Business Name field values according to the same technique used to populate the Proxy Token field of Table X.8. Field value weights for these proxy field values maybe generated according to the techniques discussed in Section IV, and these weights may be stored in a field added to the original records or elsewhere, e.g., in a separate table or according to any of the storage techniques disclosed herein. Additionally, weights for the entire multi token field values may be computed according to the same techniques used to compute the weights that appear in the last two columns of Table X.8, and the weights so generated may be stored in fields added to the original records or elsewhere as discussed herein. Thus, at this point, each multi token field, in its entirety, each of the proxy field values for the selected multi token field, each of the constituent tokens present in the multi token fields, and each token proxy field value may have multiple associated weights according to the techniques used to populate the third, fifth, sixth and seventh columns of Table X.8.

These parameters may be combined according to the techniques disused above in relation to Equations 33-36 in order to generate blended weights. In some embodiments, only like weights are combined with like weights in generating blended weights. For example, proxy token weights may be blended with weights for the entirety of the proxy field values appearing in the multi token fields according to the techniques discussed above in relation to Equations 33-36. Likewise, token weights computed according to the formula for $w_{f,v,D_1,d_1}$ may be blended with weights for the entire multi token field values according to the same technique (e.g., using Equations 20 or 24). Also token field weights computed according to the formula for $w_{f,D_2,d_2}$ may be combined with weights for the entire multi token field, or field values, according to the same technique (e.g., using Equations 22 or 26). In some embodiments, one or more token weights may be combined with one or more weight for the entire multi token field or field value in order to generate blended weights, regardless as to the techniques used to generate these parameters. These blended weights may be computed and stored or computed on the fly as part of a linking process.

Once the blended weights are generated, they may be used in a linking process in a manner similar to that as discussed above in this section. The linking process may be followed by a transition linking process, a propagation operation, and a delinking operation. Exemplary such procedures are discussed above in Section II.

Additional iteration may follow. Each iteration may use the same or different parameters and blended weights. Each iteration is expected to further consolidate entity representations until a stable point is reached.

Although DIDs are discussed above in an exemplary embodiment, alternate techniques for linking records may be used with the appropriate modifications to the techniques discussed in this section.

According to an embodiment of the invention, a method of generating a record matching formula weight, where the record matching formula weight is specific to a particular field value associated with a particular field, the particular field value comprising a plurality of tokens, is presented. The method includes calculating, for each token comprising the particular field value, a probability that a record includes the token in the particular field, where a first plurality of probabilities are calculated. The method also includes calculating a first probability including the first plurality of probabilities. The method further includes linking records in the database based at least in part on the first probability, where a plurality of entity representations are generated. The method further includes calculating, for each token including the particular field value, a probability that an entity representation includes a record including the token in the particular field, where a second plurality of probabilities are calculated. The method further includes calculating a second probability including the second plurality of probabilities. The method further includes linking entity representations in the database based at least in part on the second probability. The method further includes retrieving information from at least one record in the database.

Optional features of the above embodiment include the following. The method may further include iterating (1) the calculating, for each token comprising the particular field value, a probability, (2) the calculating a second probability and (3) the linking entity representations at least once prior to the retrieving. The method may further include calculating a probability that two records match using the record matching formula, where the record matching formula includes a plurality of probabilities that two records match, where the weights include the second probability.

According to an embodiment of the invention, a method of generating a record matching formula weight, where the record matching formula weight is specific to a particular field and independent of any particular field value in the particular field, where the particular field is configured to contain field values each comprising a plurality of tokens, is presented. The method includes calculating a plurality of first probabilities, each of the plurality of first probabilities reflecting a likelihood that a record includes a particular token in the particular field. The method also includes calculating a second plurality of probabilities, each of the second plurality of probabilities including first probabilities associated with a field value associated with the particular field. The method further includes calculating a first weight including a weighted sum of the second probabilities. The method further includes linking records in the database based at least in part on the first weight, where a plurality of entity representations are generated. The method further includes calculating a third plurality of probabilities, each of the third plurality of probabilities reflecting a likelihood that an entity representation includes a particular token in the particular field. The method further includes calculating a fourth plurality of probabilities, each of the fourth plurality of probabilities including third probabilities associated with a field value associated with the particular field. The method further includes calculating a second weight including a weighted sum of the fourth probabilities. The method further includes linking entity representations in the database based at least in part on the second weight. The method further includes retrieving information from at least one record in the database.

XI. Exemplary Embodiments

A discussion of exemplary non-limiting embodiments follows.

The embodiment begins by assembling a database or "master file." (Throughout this disclosure, the terms "master file" and "database" are synonymous.) Creating the database may include a process, such as process 200 of the First Generation Patents And Applications. Such a process typically initiates at a preparation phase, where incoming data may be received from one or more data source and formatted to be compatible with the format of the master file, where the master file represents the database upon which queries may be performed. The incoming data can include data from any of a variety of sources and have any of a variety of heterogeneous formats. To illustrate, the incoming data could include a data set from a motor vehicle registration database, where the information in the data set may be formatted and arranged in a proprietary way. Prior to inserting the motor vehicle registration information into the master file, the information may need to be converted to a homogenous format consistent with the information already present in the master file. Accordingly, the preparation phase includes various processes to translate the incoming data into entity references for inclusion in the master file.

These processes may include, for example, deduplication ("dedup") of incoming data records, filtering of the incoming data to remove unrelated information, converting data fields from one format to another, and the like. For example, the incoming data could include a name data field having a first name followed by a surname for each record, whereas the master file could include separate first name and surname data fields. The preparation phase, in this example, therefore may include the step of separating the name data field of each record of the incoming data to a separate first name data field and surname data field. After formatting the data of each record, the information in the data fields of each record may be used to populate a corresponding proposed database record. Additional features of an exemplary preparation phase are disclosed in the First Generation Patents And Applications.

Once the database is set up, a linking phase may occur. The linking phases may include features as disclosed in the First Generation Patents And Applications, as disclosed in the present document, or a combination of both.

A non-limiting, exemplary link phase is discussed presently. The process may begin by implementing a technique according to Section VI. That is, for some or all records, field values that qualify as null values according to a technique of Section VI may be replaced with a single field value, for example, the empty field value. The process may continue by adding additional fields to the records as discussed in Sections IV and V. The process may further continue by selecting a multi token field from the records in the database and building a token table as discussed in Section X.

The process may proceed to implement an iteration as disclosed in Section II. Note that the iteration of Section II may be viewed as a framework from within which other inventive techniques may be implemented. Thus, an iterative process as discussed in Section II may calculate match weights for one or more distance functions and one or more distances according to a technique of Section III. Such weights may be added to additional fields in each record. Each iteration may therefore calculate a variety of field weights for a variety of fields. The process may further include, in the same or a separate iteration, calculating token weights for the token table as discussed in Section X.

Between each iteration, the database may undergo a linking operation. The linking operation may utilize one or more matching formulas as discussed in Section I in combination with a threshold set according to an administrator's determination of a suitable confidence level (e.g., according to Equation 6 and the table in Section I). Such a linking operation may compare every record to every other record to which it is not already linked. Alternately, the linking operation may compare every record to every record generated according to a blocking criteria of Section VIII to which it is not already linked. As discussed in Section II and elsewhere, the matching formulas may utilize a variety of weights. For example, the matching formulas may utilize negative match weights according to a technique discussed in Section IX. It may utilize any of the weights as generated according to techniques of Sections II-V and X. It may utilize one or both of proxy fields and supplemental fields as disclosed in Sections IV and V respectively. Those additional fields may be accounted for in the matching formula as discussed herein. Also between each iteration, the database may undergo several types of processing. For example, between iterations, the database may undergo a transitional linking process, such as one or more of those discussed in the First Generation Patents And Patent Applications or a technique presented in Section VII. Also between iterations, the database may undergo a propagation operation, such as discussed in Sections II or VII. The database may further undergo a delinking operation such as one or more that are disclosed in the First Generation Patents And Applications.

After a suitable number of iterations, the database may be provided to a user for retrieval of information.

When additional information is added to the database, the processes described herein may be iterated one or more additional times in order to fully assimilate and link the additional information.

XII. Conclusion

Any of the techniques disclosed herein may be applied to a portion of a database as opposed to the entirety of a database.

The techniques discussed herein may be combined with any of the techniques disclosed in the First Generation Patents And Applications. The inventors explicitly consider such combinations at the time of filing the present disclosure.

The equations, formulas and relations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

Certain embodiments of the inventions disclosed herein may output a more thoroughly linked database. Certain embodiments of the inventions disclosed herein may output any information contained in any record in a database.

Embodiments, or portions of embodiments, disclosed herein may be in the form of "processing machines," such as general purpose computers, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. In particular, the hardware described in the First Generation Patents And Applications may be used for any embodiment disclosed herein. A cluster of personal computers or blades connected via a backplane (network switch) may be used to implement some embodiments.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated, for example, that the processor may be two ore more pieces of equipment in two different physical locations. The two ore more distinct pieces of equipment may be connected in any suitable manner. Additionally, the memory may include two or more portions of memory in two or more physical locations.

To explain further, processing as described above is performed by various components and various memories. However, it is appreciated that the processing performed by two or more distinct components as described above may, in accordance with a further embodiment of the invention, be performed by a single component. Further, the processing performed by one distinct component as described above may be performed by two or more distinct components. In a similar manner, the memory storage performed by two or more distinct memory portions as described above may, in accordance with a further embodiment of the invention, be performed by a single memory portion. Further, the memory storage performed by one distinct memory portion as described above may be performed by two or more memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include Enterprise Control Language ("ECL," available from LexisNexis), assembly language, Ada, APL, C, C++, dBase, Fortran, Java, Modula-2, Pascal, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements an embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In some embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements.

What is claimed is:

1. A computer implemented iterative process for generating entity representations in a computer implemented database using a record matching formula and for generating parameters for the record matching formula, each entity representation comprising at least one record, the database comprising a plurality of records, each record comprising a plurality of fields, each field capable of containing a field value, wherein at least a portion of parameters for the record matching formula are configured for a particular field value associated with a selected field, and wherein the process provides for linking records or entity representations with non-identical field values, the process comprising:

applying a symmetric, reflexive and transitive function to each field value in the selected field of each of a plurality of records in the database, whereby applying the symmetric, reflexive and transitive function to each field value in the selected field of each of a plurality of records in the database defines a partition of the plurality of records, wherein the partition of the plurality of records comprises a plurality of parts, each of the parts associated with at least one field value appearing in the selected field;

calculating a first logarithm of a first probability that an arbitrary record in the database is in a part associated with the particular field value, wherein the first probability comprises a ratio of records in the part associated with the particular field value to a total number of records in the database;

forming a plurality of entity representations in the database, each entity representation comprising at least two records linked using a first instance of the record matching formula, at least one entity representation comprising at least two records linked using a first instance of the record matching formula that comprises the first logarithm of the first probability;

calculating a second logarithm of a second probability that an arbitrary entity representation in the database comprises a record that is in the part associated with the particular field value, wherein the second probability comprises a ratio of entity representations in the part associated with the particular field value to a total number of entity representations in the database;

linking at least two entity representations in the database based on a second instance of the record matching formula, wherein the second instance of the record matching formula comprises the second logarithm of the second probability, whereby a number of entity representations in the database is reduced by the linking entity representations relative to a number of entity representations in the database prior to the linking at least two entity representations; and retrieving information from at least one record in the database.

2. The process of claim 1 further comprising repeating the calculating a second logarithm of a second probability and the linking at least two entity representations at least once prior to the retrieving.

3. The process of claim 1, wherein the record matching formula comprises a weighted sum of probabilities that two records match.

4. A computer implemented iterative process for generating entity representations in a computer implemented database using a record matching formula and for generating parameters for the record matching formula, each entity representation comprising at least one record, the database comprising a plurality of records, each record comprising a plurality of fields, each field capable of containing a field value, wherein at least a portion of parameters for the record matching formula are configured for a selected field and independent of any particular field value in the selected field, and wherein the process provides for linking records and entity representations with non-identical field values, the process comprising:

applying a symmetric, reflexive and transitive function to each field value in the selected field of each of a plurality of records in the database, whereby applying the symmetric, reflexive and transitive function to each field value in the selected field of each of a plurality of records in the database defines a partition of the plurality of records, wherein the partition of the plurality of records comprises a plurality of parts, each of the parts associated with at least one field value appearing in the particular field;

calculating a first plurality of logarithms of first probabilities that an arbitrary record in the database is in a different first part, wherein each first probability comprises a ratio of records in a particular part to a total number of records in the database;

calculating a first parameter derived from a weighted sum of the first plurality of logarithms of first probabilities;

forming a plurality of entity representations in the database, each entity representation comprising at least two records linked using a first instance of the record matching formula, at least one entity representation comprising at least two records linked using a first instance of the record matching formula that comprises the first parameter;

calculating a second plurality of logarithms of second probabilities that an arbitrary entity representation in the database comprises a record that is in a different part, wherein each second probability comprises a ratio of entity representations comprising a record in a particular part to a total number of entity representations in the database;

calculating a second parameter derived from a weighted sum of the second plurality of logarithms of second probabilities;

linking at least two entity representations in the database based on a second instance of the record matching formula, wherein the second instance of the record matching formula comprises the second parameter, whereby a number of entity representations in the database is reduced by the linking entity representations relative to a number of entity representations in the database prior to the linking at least two entity representations; and retrieving information from at least one record in the database.

5. The process of claim 4 further comprising repeating the calculating a second plurality of logarithms of second probabilities, the calculating a second parameter, and the linking at least two entity representations at least once prior to the retrieving.

6. The process of claim 4, wherein the record matching formula comprises a weighted sum of probabilities that two records match.

7. A computer system for iteratively generating entity representations in a computer implemented database using a record matching formula and for generating parameters for the record matching formula, each entity representation comprising at least one record, the database comprising a plurality of records, each record comprising a plurality of fields, each field capable of containing a field value, wherein at least a portion of parameters for the record matching formula are configured for a particular field value associated with a selected field, and wherein the process provides for linking records or entity representations with non-identical field values, the system comprising:

a database comprising a plurality of records, each record comprising a plurality of fields, each field capable of containing a field value;

a processor programmed to apply a symmetric, reflexive and transitive function to each field value in the selected field of each of a plurality of records in the database, whereby applying the symmetric, reflexive and transitive function to each field value in the selected field of each of a plurality of records in the database defines a partition of the plurality of records, wherein the partition of the plurality of records comprises a plurality of parts, each of the parts associated with at least one field value appearing in the selected field;

a processor programmed to calculate a first logarithm of a first probability that an arbitrary record in the database is in a part associated with the particular field value, wherein the first probability comprises a ratio of records in the part associated with the particular field value to a total number of records in the database;

a processor programmed to form and store a plurality of entity representations in the database, each entity representation comprising at least two records linked using a first instance of the record matching formula, at least one entity representation comprising at least two records linked using a first instance of the record matching formula that comprises the first logarithm of the first probability;

a processor programmed to calculate a second logarithm of a second probability that an arbitrary entity representation in the database comprises a record that is in the part associated with the particular field value, wherein the second probability comprises a ratio of entity representations in the part associated with the particular field value to a total number of entity representations in the database; and a processor programmed to link and store at least two entity representations in the database based on a second instance of the record matching formula, wherein the second instance of the record matching formula comprises a second parameter derived from the second probability, whereby a number of entity representations in the database is reduced by the linking entity representations relative to a number of entity representations in the database prior to the linking at least two entity representations.

8. The system of claim 7 further comprising program logic configured to repeat calculating a second logarithm of a second probability and linking and storing at least two entity representations at least once.

9. The system of claim 7, wherein the record matching formula comprises a weighted sum of probabilities that two records match.

10. A computer system for iteratively generating entity representations in a computer implemented database using a record matching formula and for generating parameters for the record matching formula, each entity representation comprising at least one record, the database comprising a plurality of records, each record comprising a plurality of fields, each field capable of containing a field value, wherein at least a portion of parameters for the record matching formula are configured for a selected field and independent of any particular field value in the selected field, and wherein the process provides for linking records and entity representations with non-identical field values, the system comprising:

a database comprising a plurality of records, each record comprising a plurality of fields, each field capable of containing a field value;

a processor programmed to apply a symmetric, reflexive and transitive function to each field value in the selected field of each of a plurality of records in the database, whereby applying the symmetric, reflexive and transitive function to each field value in the selected field of each of a plurality of records in the database defines a partition of the plurality of records, wherein the partition of the plurality of records comprises a plurality of parts, each of the parts associated with at least one field value appearing in the particular field;

a processor programmed to calculate a first plurality of logarithms of first probabilities that an arbitrary record in the database is in a different first part, wherein each first probability comprises a ratio of records in a particular part to a total number of records in the database;

a processor programmed to calculate a first parameter derived from a weighted sum of the first plurality of logarithms of first probabilities;

a processor programmed to form and store a plurality of entity representations in the database, each entity representation comprising at least two records linked using a first instance of the record matching formula, at least one entity representation comprising at least two records linked using a first instance of the record matching formula that comprises the first parameter;

a processor programmed to calculate a second plurality of logarithms of second probabilities that an arbitrary entity representation in the database comprises a record that is in a different part, wherein each second probability comprises a ratio of entity representations comprising a record in a particular part to a total number of entity representations in the database;

a processor programmed to calculate a second parameter derived from a weighted sum of the second plurality of logarithms of second probabilities; and a processor programmed to link and store at least two entity representations in the database based on a second instance of the record matching formula, wherein the second instance of the record matching formula comprises the second parameter, whereby a number of entity representations in the database is reduced by the linking entity representations relative to a number of entity representations in the database prior to the linking at least two entity representations.

11. The system of claim 10 further comprising program logic configured to repeat calculating a second plurality of logarithms of second probabilities, calculating a second parameter, and linking and storing at least two entity representations at least once.

12. The system of claim 10, wherein the record matching formula comprises a weighted sum of probabilities that two records match.

* * * * *